(12) United States Patent
Kent et al.

(10) Patent No.: US 11,474,016 B1
(45) Date of Patent: Oct. 18, 2022

(54) HYPER-SPECTRAL IMAGING OF AIRBORNE BIOLOGICAL PARTICLES

(71) Applicant: Scanit Technologies, Inc., Fremont, CA (US)

(72) Inventors: Joel Kent, Fremont, CA (US); Christopher F. Bevis, Los Gatos, CA (US)

(73) Assignee: SCANIT TECHNOLOGIES, INC., Fremont, CA (US)

( * ) Notice: Subject to any disclaimer, the term of this patent is extended or adjusted under 35 U.S.C. 154(b) by 92 days.

(21) Appl. No.: 17/028,086

(22) Filed: Sep. 22, 2020

Related U.S. Application Data

(60) Provisional application No. 62/904,804, filed on Sep. 24, 2019.

(51) Int. Cl.
| | |
|---|---|
| *G01N 15/02* | (2006.01) |
| *G01J 3/28* | (2006.01) |
| *G01J 3/02* | (2006.01) |
| *H04N 5/33* | (2006.01) |
| *G01J 3/12* | (2006.01) |

(52) U.S. Cl.
CPC ........ *G01N 15/0227* (2013.01); *G01J 3/0218* (2013.01); *G01J 3/0294* (2013.01); *G01J 3/2803* (2013.01); *G01N 15/0211* (2013.01); *G01J 2003/1204* (2013.01); *G01J 2003/1208* (2013.01); *G01N 2015/0233* (2013.01); *H04N 5/332* (2013.01)

(58) Field of Classification Search
CPC ...... G01J 3/0215; G01J 3/0294; G01J 3/2803; G01N 15/0227; G01N 15/0211
See application file for complete search history.

(56) References Cited

U.S. PATENT DOCUMENTS

| | | | |
|---|---|---|---|
| 10,983,131 B1 * | 4/2021 | Manautou | A61B 5/150213 |
| 2016/0290912 A1 * | 10/2016 | Kent | G01N 15/0612 |
| 2018/0120555 A1 * | 5/2018 | Ikuta | A61B 5/0075 |
| 2020/0103328 A1 | 4/2020 | Ozcan | |
| 2020/0268252 A1 * | 8/2020 | Litvinova | A61B 1/307 |
| 2020/0340901 A1 | 10/2020 | Ozcan | |

FOREIGN PATENT DOCUMENTS

WO WO2018165590 9/2018

* cited by examiner

*Primary Examiner* — Rebecca C Bryant
(74) *Attorney, Agent, or Firm* — Staniford Tomita LLP

(57) ABSTRACT

A particle monitoring device includes a camera sensor for imaging particles, a set of light sources, and an optical component. A first light source provides light of a first color component. A second light source provides light of a second color component. The optical component receives light of the first color component in a first direction from the first light source, and redirects the light of the first color component in an output direction towards the particles to illuminate the particles using light of the first color component. The optical component receives light of a second color component in a second direction, different from the first direction, from the second light source, and redirects the light of the second color component in the output direction towards the particles to illuminate the particles using light of the second color component.

20 Claims, 27 Drawing Sheets
(1 of 27 Drawing Sheet(s) Filed in Color)

$$RGB_i(x,y) = \sum_j p_i(\lambda_j) \cdot S_j(x,y)$$

i = RED, GREEN or BLUE j = 1, 2   or   j = 1, 2, 3

$RGB_i(x,y)$ = Strength of RGB color "i" at pixel location (x,y).

$p_i(\lambda_j)$ = Sensitivity of pixel color "i" at illumination at wavelength "j"

$S_j(x,y)$ = Spectral component "j" of reflected light at pixel location (x,y)

Figure 19

$$RED(x,y) = RGB_{RED}(x,y) = p_{RED}(\lambda_1) \cdot S_1(x,y) + p_{RED}(\lambda_2) \cdot S_2(x,y) + p_{RED}(\lambda_3) \cdot S_3(x,y)$$

$$GREEN(x,y) = RGB_{GREEN}(x,y) = p_{GREEN}(\lambda_1) \cdot S_1(x,y) + p_{GREEN}(\lambda_2) \cdot S_2(x,y) + p_{GREEN}(\lambda_3) \cdot S_3(x,y)$$

$$BLUE(x,y) = RGB_{BLUE}(x,y) = p_{BLUE}(\lambda_1) \cdot S_1(x,y) + p_{BLUE}(\lambda_2) \cdot S_2(x,y) + p_{BLUE}(\lambda_3) \cdot S_3(x,y)$$

Figure 20

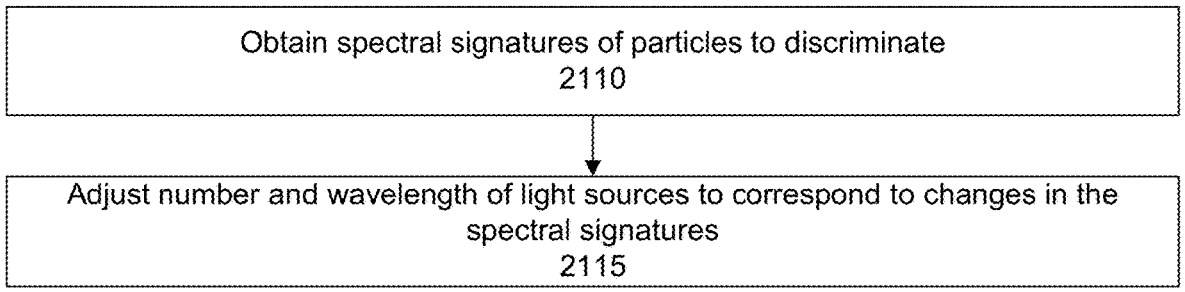

Figure 21

Normalized responsivity spectra of human cone cells, S, M, and L types

Different wavelengths λ differing from the representative wavelength $λ_0$ will diffract with angles θ differing from the nominal angle $θ_0$. It is desired that the diffracted beam direction be independent of the incident beam wavelength λ. To make this possible with a fixed grating, the incident beam direction must vary. This is desirable as it allows physical separation between the QD LEDs. The "Offset" column of the table gives relative locations of the QD LEDs on a printed circuit board (PCB) placed a distance L = 35mm away from the grating. Preferably the PCB is thin and can be bent to a curvature of radius L so that beams from surface mount QD LEDs are aimed in the optimal directions.

| Wavelength λ | Angle θ | Offset |
|---|---|---|
| 450nm | 72.5° | -7.6mm |
| 500nm | 68.3° | -5.1mm |
| 550nm | 64.2° | -2.5mm |
| 580nm | 61.7° | -1.0mm |
| 600nm = $λ_0$ | 60.0° | 0 |
| 620nm | 58.3° | +1.0mm |
| 640nm | 56.7° | +2.0mm |
| 660nm | 55.0° | +3.0mm |
| 700nm | 51.7° | +5.1mm |
| 750nm | 47.5° | +7.6mm |

Figure 35

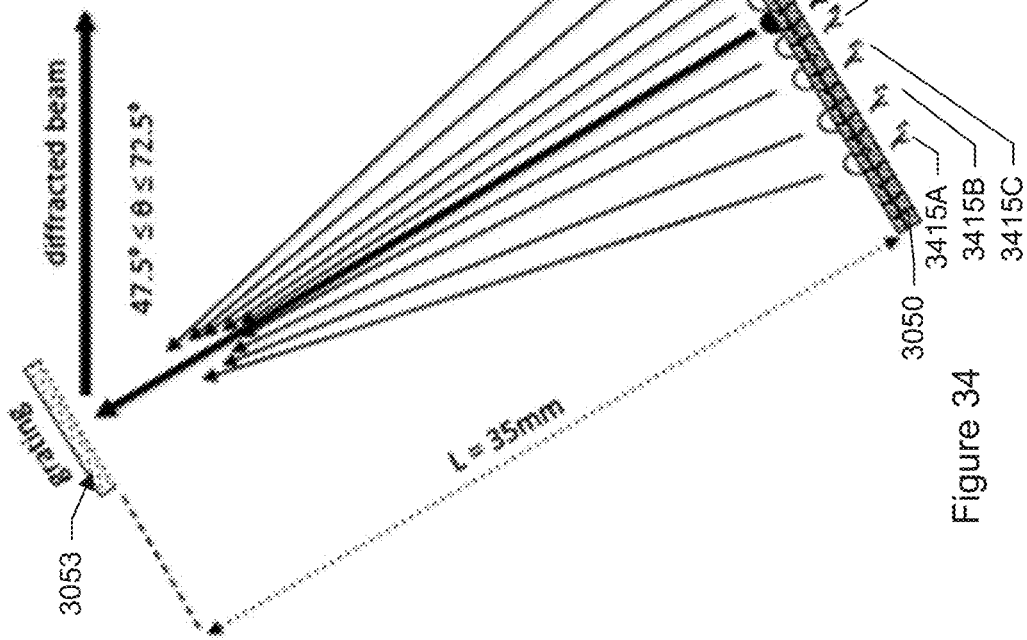

Figure 34

HYPER-SPECTRAL IMAGING OF AIRBORNE BIOLOGICAL PARTICLES

CROSS-REFERENCE TO RELATED APPLICATIONS

This application claims priority to U.S. provisional patent application 62/904,804, filed Sep. 24, 2019, which is incorporated by reference along with other cited references in this application.

BACKGROUND

The present invention relates to the field of hyper-spectral imaging and analysis, and more specifically, to systems and techniques for monitoring of particles including bacteria with hyper-spectral illumination sources.

Hyper-spectral imaging is a technique to classify objects based on their spectral properties. Hyper-spectral imaging and analysis typically requires the purchase of highly specialized and expensive equipment. Such equipment can also require highly trained technicians to operate.

Consumers and many small organizations (e.g., farms) are thus unable to afford such equipment. There is a need to provide improved systems and techniques that can accurately and cost-effectively classify objects based on their spectral properties.

BRIEF SUMMARY OF THE INVENTION

In a specific embodiment, a particle monitoring device includes a camera sensor for imaging particles, a set of light sources, and an optical component. A first light source provides light of a first color component. A second light source provides light of a second color component. The optical component receives light of the first color component in a first direction from the first light source, and redirects the light of the first color component in an output direction towards the particles to illuminate the particles using light of the first color component. The optical component receives light of a second color component in a second direction, different from the first direction, from the second light source, and redirects the light of the second color component in the output direction towards the particles to illuminate the particles using light of the second color component. In an embodiment, the light sources may be remote from an inspection zone at which the particles are imaged. Optical wave guides or optical fibers may be connected to the light sources to transmit light from the light sources to the inspection zone.

Other objects, features, and advantages will become apparent upon consideration of the following detailed description and the accompanying drawings, in which like reference designations represent like features throughout the figures.

BRIEF DESCRIPTION OF THE FIGURES

The patent or application file contains at least one drawing executed in color. Copies of this patent or patent application with color drawing(s) will be provided by the Office upon request and payment of the necessary fee.

FIG. 19 shows a formula for relating measured pixel values "$RGB_i(x,y)$" to the biomolecule distributions "$C_j(x, y)$."

FIG. 20 shows the application of the formula shown in FIG. 19.

FIG. 21 shows a flow for determining a number of light sources and their corresponding wavelengths, according to one or more embodiments.

FIG. 34 shows a schematic top view of an arrangement of diffraction grating and associated printed circuit board with quantum dot light emitting diodes, according to one or more embodiments.

FIG. 35 shows a table of color fan-out for the quantum dot LED array shown in FIG. 34, according to one or more embodiments.

DETAILED DESCRIPTION

Figure 1:
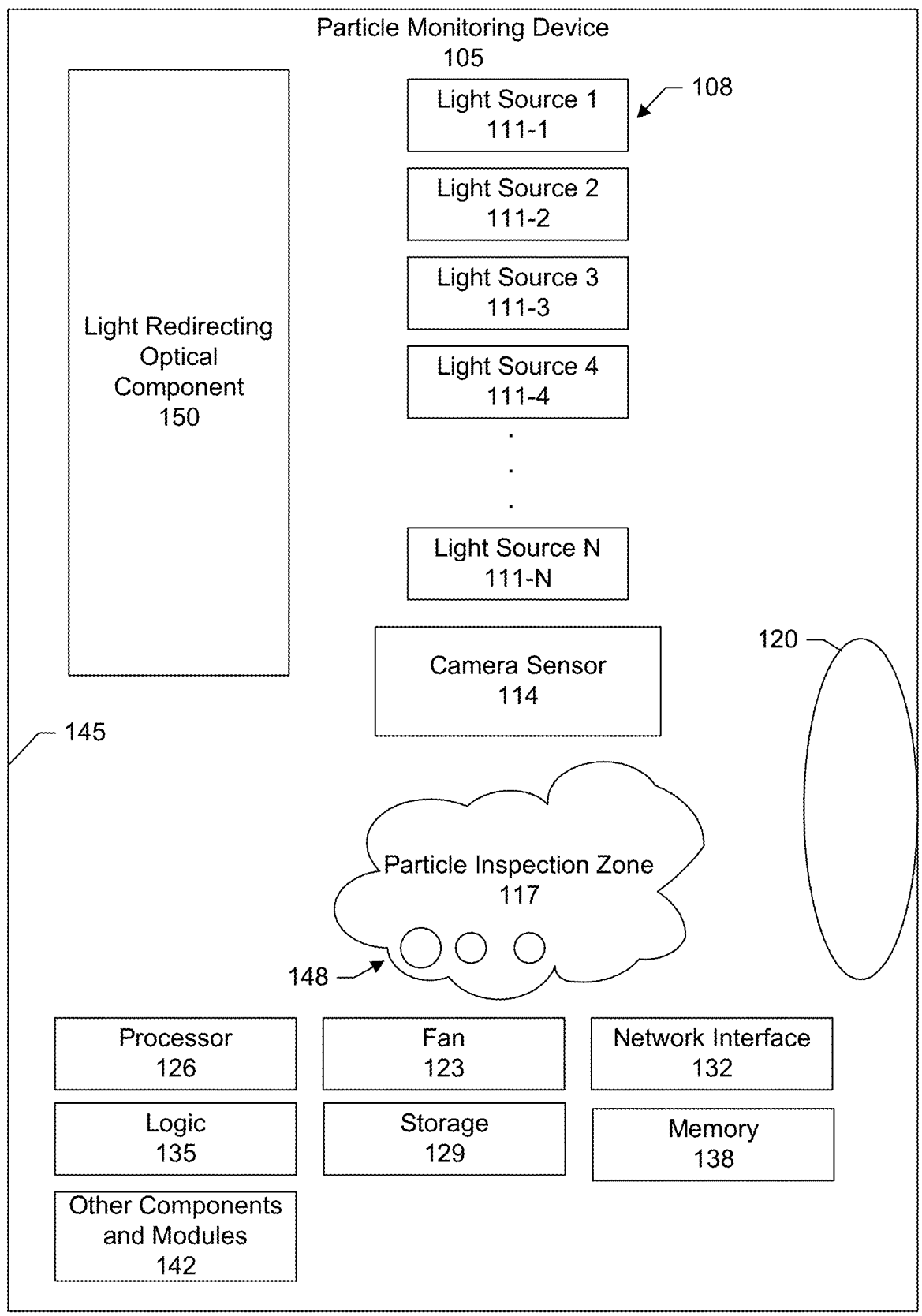
FIG. 1 shows a block diagram of a particle monitoring device, according to one or more embodiments.

FIG. 1 shows a block diagram of a particle monitoring device 105. This particle monitoring device is designed to collect, analyze, classify, and identify or discriminate airborne particles of interest. Airborne particles of interest may include biological particles including bacteria, mold, pollen, and so forth. Certain types of bacteria and mold, for example, can be very harmful to agriculture including plants, crops, and vineyards. As another example, certain types of pollen can cause severe allergic reactions in humans. Therefore, it is desirable to be able to identify such airborne particles so that actions can be taken to help mitigate their effects. In a specific embodiment, the particle monitoring device hardware generates images for captured particles. Based on the images, associated software and processing techniques classify particles of interest.

In a specific embodiment, the particle monitoring device is designed as a small, portable, lightweight, and relatively inexpensive device. This allows the particle monitor to be easily placed in any number of locations where monitoring is desirable. Such locations may include, for example, an indoor location, such as an indoor farming facility, home, clean room, factory, office, or building, an outdoor location such as a vineyard or traditional outdoor farm, or mounted to a drone.

As shown in the example of FIG. 1, this particle monitoring device includes a set of light sources 108 (e.g., first light source 111-1, second light source 111-2, third light source 111-3, fourth light source 111-4 . . . 111-N), a camera sensor 114, a particle inspection zone 117, an opening 120, a fan 123, a processor 126, storage 129, a network interface 132, logic 135, memory 138, and other components and modules 142 that are contained within a housing 145 of the particle monitoring device. In this disclosure, the variable N and other similar index variables are assumed to be arbitrary positive integers greater than or equal to two.

The fan generates a vacuum to draw airborne particles in a local environment into the opening so that collected particles 148 can be imaged by the camera sensor at the particle inspection zone. The collected particles may be referred to as a sample.

The particle monitoring device applies imaging techniques in order to discriminate, classify, or identify particles that have been collected. These imaging techniques involve examining how different wavelengths or colors of light interact with the particles. In a specific embodiment, the particle monitoring device recognizes particles based on their spectral signatures, e.g., how the particles emit, reflect, transmit, or absorb different wavelengths or colors of light. In a specific embodiment, the camera sensor includes an RGB sensor such as may be found in a low cost, consumer grade camera. Despite the lack of sophistication of an RGB camera sensor as compared to a hyperspectral camera, the systems and techniques described herein allow for accurate identification and discrimination of particles.

In a specific embodiment, the light sources are configured to generate different wavelengths of light. In a specific embodiment, the light sources include quasi-monochromatic light sources as will be discussed. As will be discussed in more detail later below, "quasi-monochromatic" describes a light source with a finite wavelength spread, but nevertheless approximates a monochromatic light source for the purpose of classifying biological particles. Quasi-monochromatic light sources may, but not necessarily, make use of quantum dots. A quasi-monochromatic light source may include a monochromatic light source such as a laser.

The first light source may emit light of a first color component, such as red light. Red light is typically light having a predominate wavelength of about 640 nanometers (nm), but may range from about 620 nanometers to about 750 nanometers.

The second light source may emit light of a second color component, different from the first color component, such as green light. Green light is typically light having a predominate wavelength of about 510 nanometers, but may range from about 510 nanometers to about 570 nanometers.

The third light source may emit light of a third color component, different from the first and second color components, such as blue light. Blue light is typically light having a predominate wavelength of about 470 nanometers, but may range from about 450 nanometers to about 495 nanometers.

The fourth light source may emit light of a fourth color component, different from the first, second, and third color components, such as yellow light. Yellow light is typically light having a predominate wavelength of about 590 nanometers, but may range from about 570 nanometers to about 590 nanometers. It should be appreciated, however, that the light sources can be designed to emit any wavelength (e.g., 450, 500, 550, 580, 600, 620, 640, 660, 700, or 750 nanometers, or other wavelength).

FIG. 1 shows four light sources, but other embodiments can have a different number of light sources. For example, depending on factors such as the type of particles of interest and their corresponding spectral signatures, there can be three, five, six, seven, eight, nine, ten, or more than ten light sources emitting different colors of light. There can be less than three light sources emitting different colors of light.

In a specific embodiment, the light sources illuminate the particles with various wavelengths or colors of light while the camera sensor captures images of the particles under different illumination conditions.

The images can be stored in storage and analyzed using the processor. The logic includes the appropriate algorithms and instructions to control the operation of the monitoring device. Such operations may include activating and deactivating one or more particular light sources, capturing one or more images, and analyzing the one or more images. The network interface allows the particle monitoring device to receive and send information over a network. The network interface may be a wireless network interface, wired network interface, or both. The particle monitoring device may be powered by a battery, solar cells, via a wall outlet, or combinations of these.

In a specific embodiment, the particle monitoring device includes a light redirecting optical component 150. The light redirecting optical component is positioned in the particle monitoring device to face the light sources. The light redirecting optical component is responsible for receiving beams of light from the light sources—which may come to the optical component from different directions—and redirecting each beam of light along a same output direction or optical path towards the particles at the particle inspection zone. This helps to ensure that the particles are illuminated at a consistent illumination angle across all the different wavelengths or colors. The light sources may be positioned to face away from particle inspection zone or otherwise be shielded or blocked from the particle inspection zone in order to prevent light from the light sources from reaching the particle inspection zone without having been redirected by the light redirecting optical component.

Figure 2:
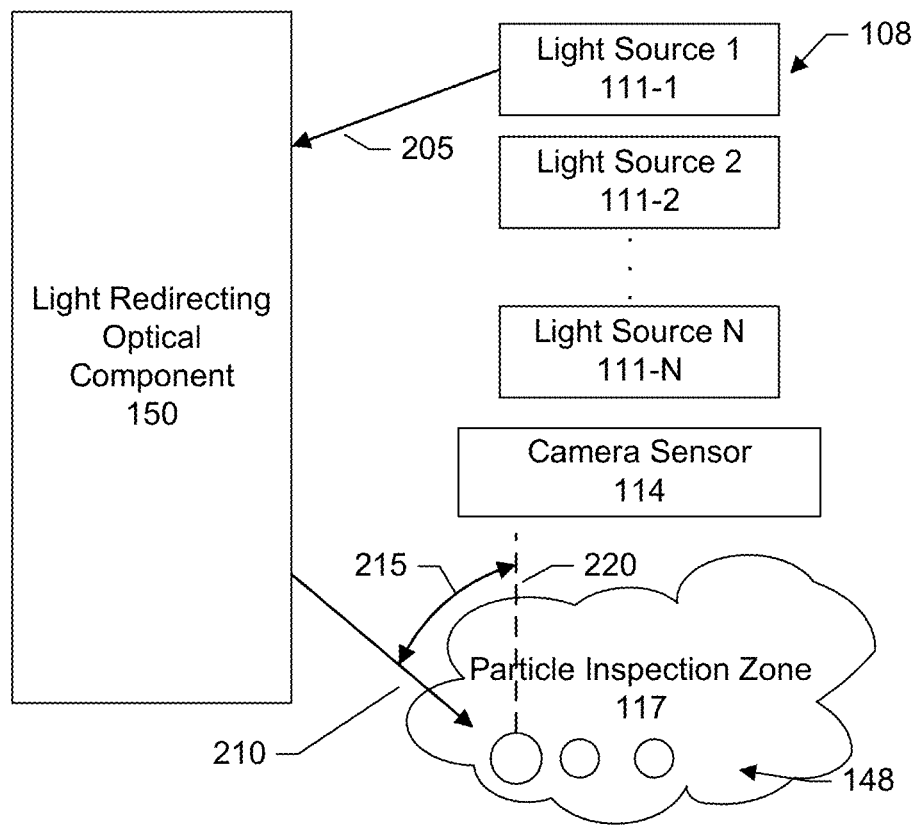
FIG. 2 shows a schematic view of an operation of a particle monitoring device, according to one or more embodiments.

More particularly, FIG. 2 shows an operation of the particle monitoring device shown in FIG. 1 in which the particles are illuminated using light emitted from the first light source. The light redirecting optical component receives a first beam of light of a first color component in a first direction 205 from the first light source. The light redirecting optical component redirects the first beam of light of the first color component along an output direction or optical path 210 towards the particles, thereby illuminating the particles using light of the first color component for the camera sensor. The particles are illuminated from an illumination angle 215. The illumination angle may be an angle between a line 220 normal to the particles (or surface on which the particles sit) and output direction or optical path 210.

There are physical constraints with the addition of multiple light sources. Each light source occupies a physical area and is thus spaced apart from another light source. As a result, without the light redirecting optical component, each beam of light from each light source to a target may come from a different direction and thus illuminates the target from a different illumination angle. In other words, when the illumination wavelength changes, so does the illumination angle. This is undesirable.

The different illumination angles for different wavelengths or colors can complicate and compromise analysis of the resulting images. This is particularly true when a significant fraction of the image intensity is from specular reflection, as is often the case with biological particles. At a pixel level, illumination angle varying with color can give a distorted impression of the color characteristics of the object at a surface position corresponding to the pixel. As an analogy, consider a close-up photo of a face in which one sees on the whites of the eyeballs a glint of reflection from the illumination source. Imagine that the illumination source is a red light to the right, resulting in red glints in the digitized camera image on the right sides of the whites of the eyeballs. If the red light is replaced by a green light blub, there will be green glints at the same pixel positions within the whites of the eyeball images as the red glints. This would correctly imply that the whites of the eyeball are neither red nor green, but rather neutral in color. However, if the red light to the right is replaced by a green light to the left, the red glints to the right will be replaced by green glints to the left. The pixels that previously contained the bright red glints do not become bright green, but rather a much dimmer green, the pixels that now contain bright green glints were not previously bright red, but rather much dimmer red. However, a naïve pixel-by-pixel color analysis would suggest that eyeball is red where the bright red glints were seen and that the eyeball is green where the bright green glints where seen. Such complications would be avoided if the red and green light bulbs illuminate the face from the same direction. Similar comments apply to color illumination and the spectral analysis of particles in a particle detection device.

Figure 3:
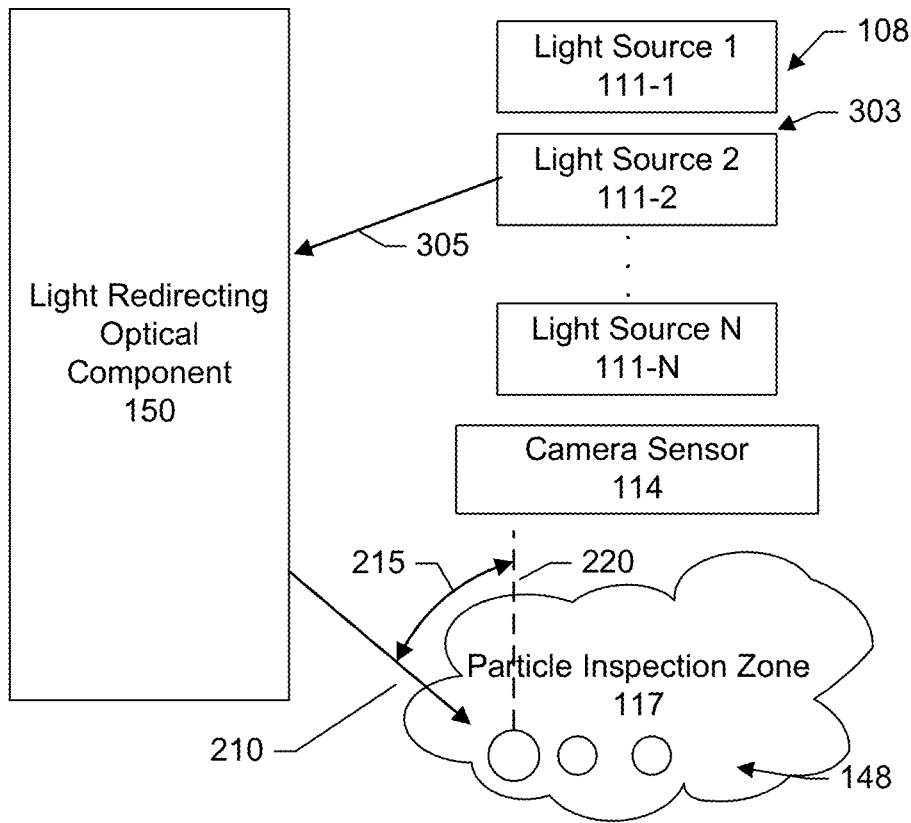
FIG. 3 shows another schematic view of an operation of a particle monitoring device, according to one or more embodiments.

FIG. 3 shows another operation of the particle monitoring device shown in FIG. 1 in which the particles are illuminated using light emitted from the second light source. The second light source is spaced away 303 from the first light source. The light redirecting optical component receives a second beam of light of a second color component in a second direction 305, different from first direction 205, from the second light source. The light redirecting optical component redirects the second beam of light of the second color component along the same output direction or optical path 210 towards the particles, thereby illuminating the particles using light of the second color component for the camera sensor and illuminating the particles using the same illumination angle 215 used for the first color component.

In other words, the light redirecting optical component may receive a first beam of light of a first color component in a first direction from the first light source. The light redirecting optical component can redirect the first beam of light along an optical path towards the particles so that the particles are illuminated using light of the first color component. The light redirecting optical component may receive a second beam of light of a second color component, different from the first color component, in a second direction from the second light source. The second direction is different from the first direction because the second light source is spaced apart or occupies a physical space different from the first light source. The light redirecting optical component, however, redirects the second beam of light along the same optical path towards the particles. This allows the particles to be illuminated using light of the second color component but which also comes from the same direction as the light of the first color component. In other words, an illumination angle of the particles using light of the first color component is the same as an illumination angle of the particles using light of the second color component.

In a specific embodiment, a first path of a first light beam is from a first light source to a light redirecting optical component to the particles. A second path of a second light beam is from a second light source to the light redirecting optical component to the particles. A portion of the first path between the first light source and the light redirecting optical component is different from a portion of the second path between the second light source and the light redirecting optical component. A portion of the first path between the light redirecting optical component and the particles is the same as a portion of the second path between the light redirecting optical component and the particles.

Optical path 210 may be a straight line. Alternatively, optical path 210 may include one or more curved portions in which light is guided by a wave guide such as an optical fiber. Optical path 210 may also include one or more reflections off of mirrors.

Figure 4:
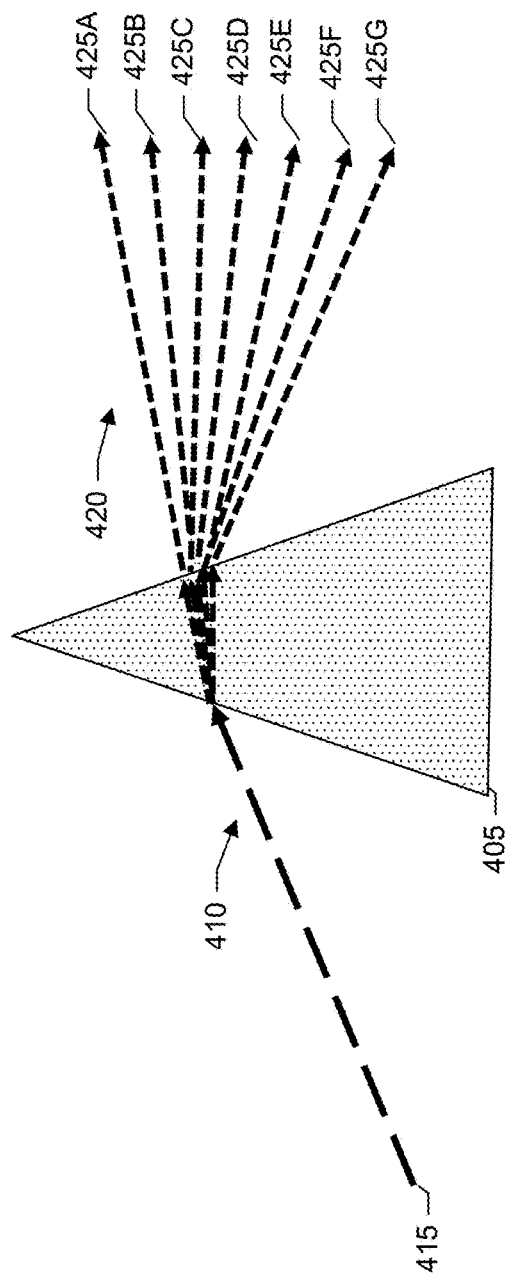
FIG. 4 shows an example of a prism.

In a specific embodiment, the light redirecting optical component is a prism. FIG. 4 shows an operation of a prism 405. Arrow 410 indicates the direction of light propagation. The prism can split or separate a beam of white light 415 into its component colors 420. For example, in FIG. 4, an arrow 425A indicates a first component color (e.g., red). An arrow 425B indicates a second component color (e.g., orange). An arrow 425C indicates a third component color (e.g., yellow). An arrow 425D indicates a fourth component color (e.g., green). An arrow 425E indicates a fifth component color (e.g., blue). An arrow 425F indicates a sixth component color (e.g., indigo). An arrow 425G indicates a seventh component color (e.g., violet).

Figure 5:
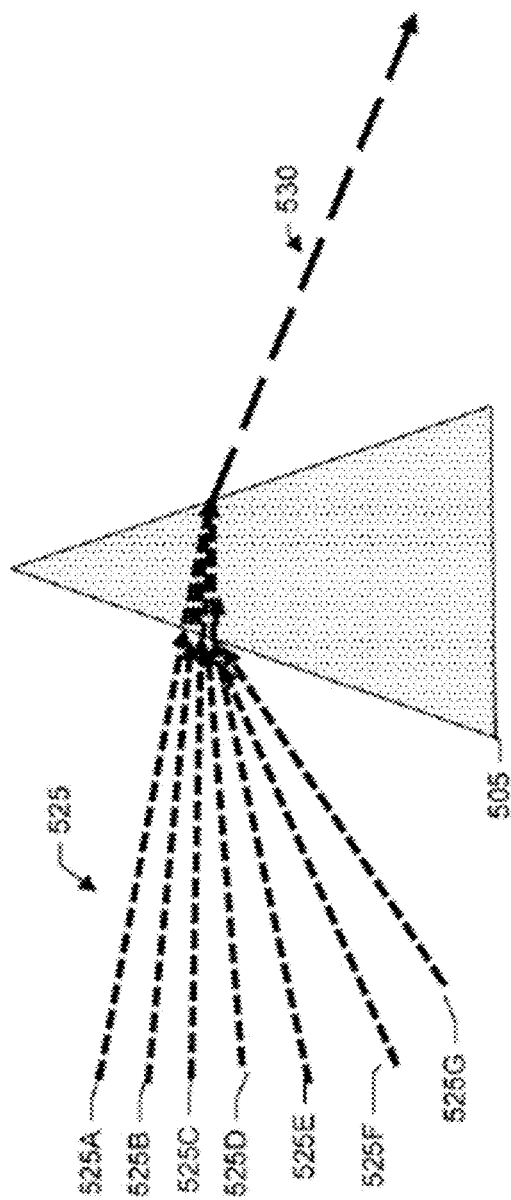
FIG. 5 shows another example of the prism.

FIG. 5 illustrates the time-reversal symmetry of light propagation showing that that such a prism (e.g., prism 505) can equally well be used to combine component colors 520 into a single beam of white light 530. For example, in FIG. 5, an arrow 525A indicates a first component color (e.g., red light) being directed towards the prism. An arrow 525B indicates a second component color (e.g., orange light) being directed towards the prism. An arrow 525C indicates a third component color (e.g., yellow light) being directed towards the prism. An arrow 525D indicates a fourth component color (e.g., green light) being directed towards the prism. An arrow 525E indicates a fifth component color (e.g., blue light) being directed towards the prism. An arrow 525F indicates a sixth component color (e.g., indigo light) being directed towards the prism. An arrow 525G indicates a seventh component color (e.g., violet light) being directed towards the prism. The prism combines component colors red, orange, yellow, green, blue, indigo, and violet into the single beam of white light exiting the prism.

Figure 6:
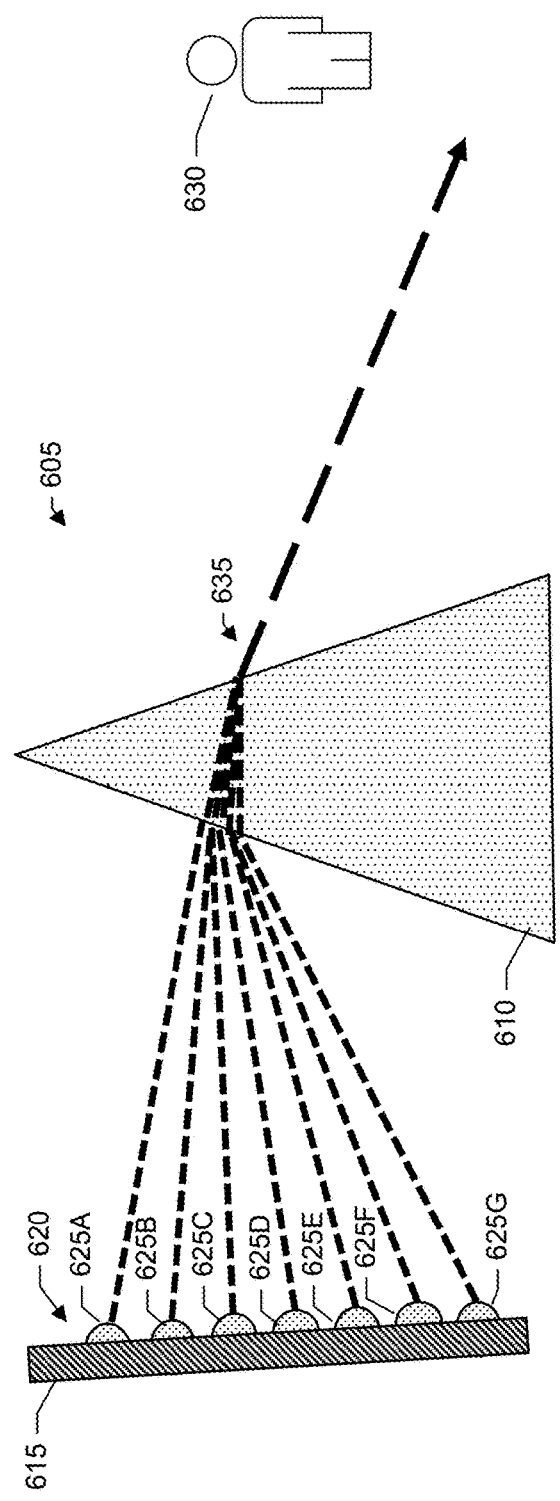
FIG. 6 shows a schematic view of a prism that may be included in a particle monitoring device, according to one or more embodiments.

FIG. 6 shows a schematic view for a particle monitoring device 605 according to one or more embodiments. In this specific embodiment, the particle monitoring device includes a prism 610 and a circuit board 615 having quasi-monochromatic light sources 620 including a quasi-monochromatic light source 625A emitting a first component color (e.g., red light) towards the prism, a quasi-monochromatic light source 625B emitting a second component color (e.g., orange light) towards the prism, a quasi-monochromatic light source 625C emitting a third component color (e.g., yellow light) towards the prism, a quasi-monochromatic light source 625D emitting a fourth component color (e.g., green light) towards the prism, a quasi-monochromatic light source 625E emitting a fifth component color (e.g., blue light) towards the prism, a quasi-monochromatic light source 625F emitting a sixth component color (e.g., indigo light) towards the prism, and a quasi-monochromatic light source 625G emitting a seventh component color (e.g., violet light) towards the prism. In some embodiments, quasi-monochromatic light sources 620 are quantum-dot light sources.

As shown in the example of FIG. 6, after light has passed through the prism, to a downstream observer 630, all color components appear to come from a same direction 635. This is true even if the different color components are activated sequentially rather than simultaneously. The color combining ability of a prism allows multiple quantum-dot light sources to illuminate particles of interest from the same illumination angle.

In some embodiments, the quasi-monochromatic light sources are quantum-dot light sources. In a specific embodiment the light sources use quantum-dot light emitting diodes (LEDs) in which quantum-dots directly generate light from electricity. In another specific embodiment, quantum-dots convert blue light from blue LEDs into the desired colors. In both cases, for good efficiency, it is desired that light emitted from the quantum-dots be focused in the forward direction rather radiated randomly in all directions. For a quantum-dot LED, this may be accomplished by including an LED lens structure over the LED light source. For quantum-dot wavelength conversion, one option is to separate the lens from the blue LED light source and then sandwich a quantum-dot film between the LED light source and a focusing lens.

Figure 7:
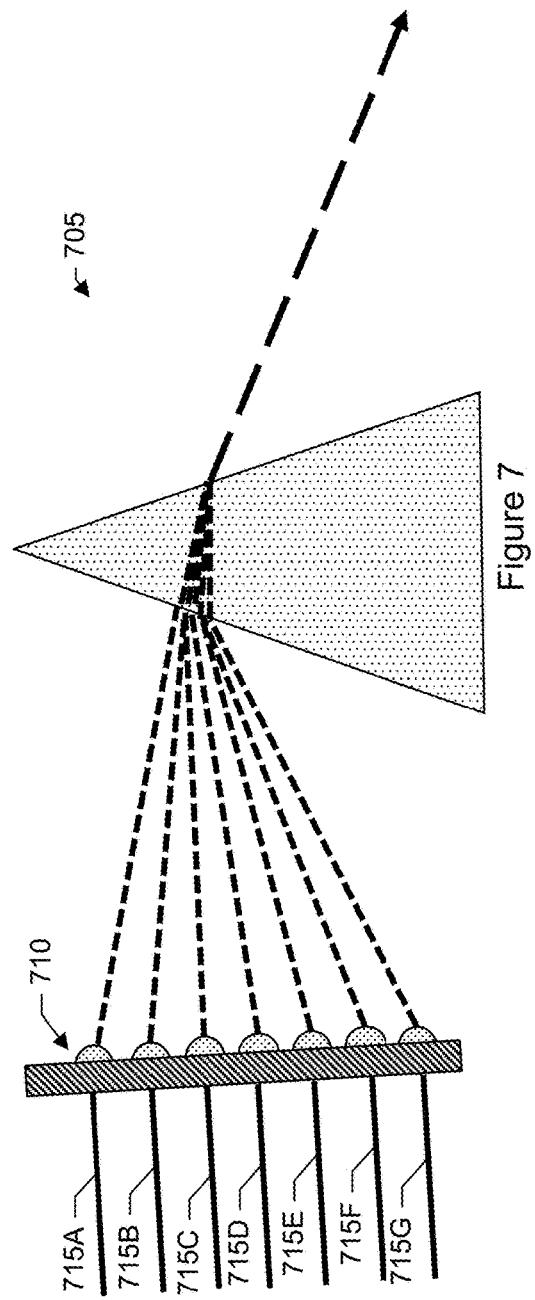
FIG. 7 shows a schematic view of blue light sources connected to quantum-dots that may be included in a particle monitoring device, according to one or more embodiments.

FIG. 7 shows a schematic view for a particle monitoring device 705 according to one or more embodiments. The schematic shown in FIG. 7 is similar to the schematic shown in FIG. 6. In this specific embodiment, however, there are quantum-dots 710 behind lenses that are excited by optical fibers including optical fibers 715A-G. These optical fibers deliver blue light from remote blue LEDs or other source of shorter wavelength light.

In a specific embodiment, if it is desired to simultaneously illuminate the particles of interest with from two or three directions, as is often the case where much of the light reflection is specular, the above scheme discussed in connection with FIG. 6, or the above scheme discussed in connection with FIG. 7, may be repeated two or three times at different azimuthal angles with respect to the optical axis. As an analogy here, portrait photographers sometimes prefer diffuse lighting without strong shadows, and in a particle monitor simultaneously lightly from multiple angles provides an approximation to diffuse lighting. The two or three repetitions may each have their own circuit board with blue LEDs, or alternatively there could be only one circuit board with blue LEDs connected via optical fibers to three non-electronic quantum-dot illumination assemblies.

Figure 8:
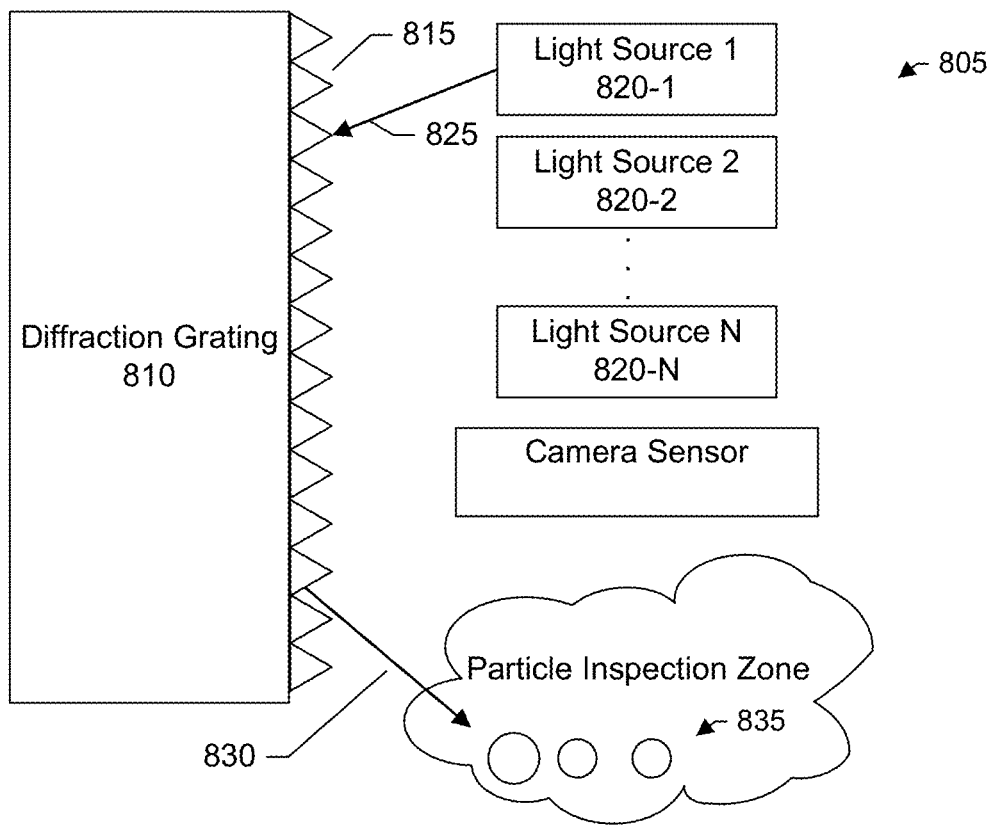
FIG. 8 shows a schematic view of a diffraction grating that may be included in a particle monitoring device, according to one or more embodiments.

FIG. 8 shows a schematic view for a particle monitoring device 805 according to one or more embodiments. In this specific embodiment, a light redirecting optical component of the particle monitoring device is a diffraction grating 810. A diffraction grating can provide the same or similar spectral spreading and spectrum combining capabilities as a prism. A diffraction grating is an optical component with a periodic structure that splits and diffracts light into several beams travelling in different directions. The directions of these beams depend on the spacing of the grating and the wavelength of the light so that the grating acts as the dispersive element.

More particularly, a diffraction grating can include a surface ruled with close, equidistant, and parallel lines that can resolve light into spectra. A grating may be a transmission or reflection grating according to whether it is transparent or mirrored. A diffraction grating is able to disperse a beam of various wavelengths into a spectrum of associated lines because of the principle of diffraction: in any particular direction, only those waves of a given wavelength will be conserved, all the rest being destroyed because of interference with one another. Gratings can provide exceptionally high resolutions of spectral lines. The resolving power (R) of an optical instrument represents the ability to separate closely spaced lines in a spectrum and is equal to the wavelength λ divided by the smallest difference (Δλ) in two wavelengths that can be detected; i.e., R=λ/Δλ.

As discussed, in a specific embodiment, a particle monitoring device includes a diffraction grating to receive beams of particular wavelengths in different directions and redirect each beam of a particular wavelength along a same output direction or optical path. Specifically, in the example shown in FIG. 8, diffraction grating 810 includes a grating surface 815 which faces light sources 820-1, 820-2 . . . 820N. Each light source is configured to emit light of a particular color component or having a particular single or predominate wavelength.

First light source 820-1 emits a first light beam 825 of a first color component. The first light beam enters into the diffraction grating and leaves the diffraction grating as a redirected first light beam 830 of the first color component. A first path of the first light beam is from the first light source to the diffraction grating to particles 835.

Figure 9:
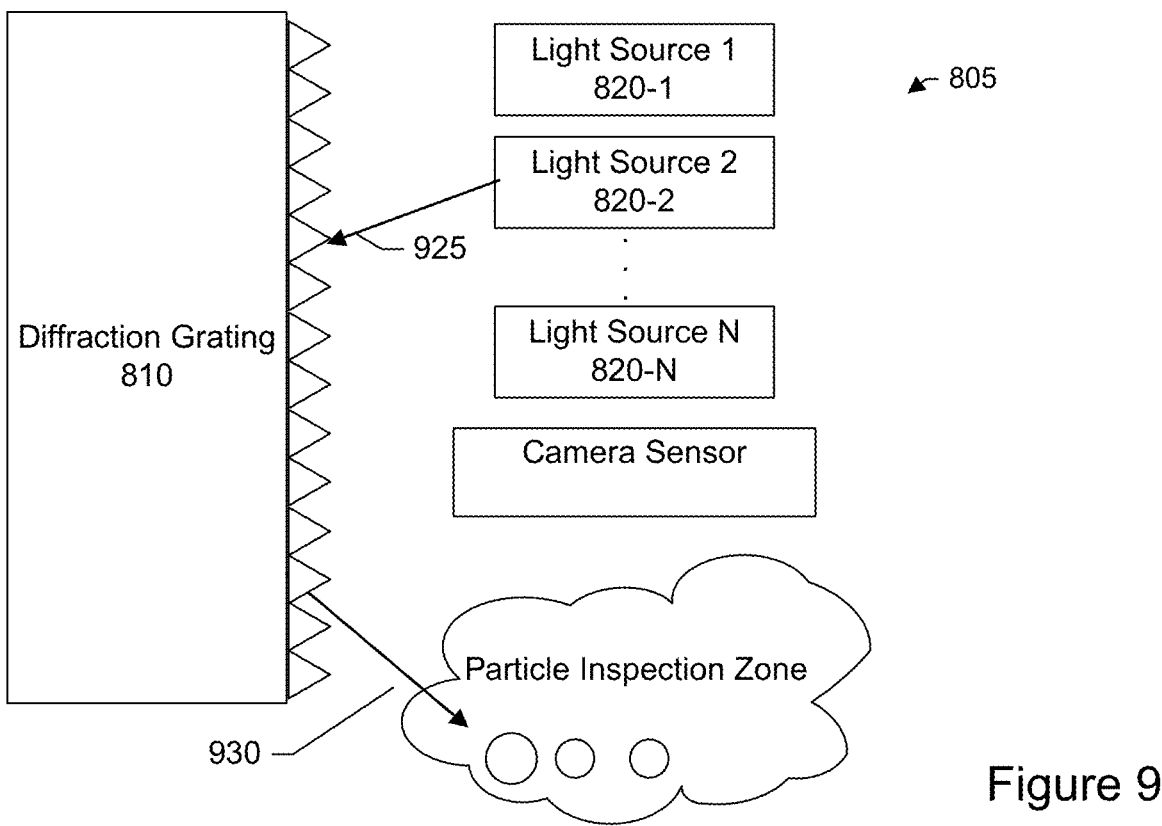
FIG. 9 shows another schematic view of a diffraction grating that may be included in a particle monitoring device, according to one or more embodiments.

FIG. 9 shows another schematic view for the particle device shown in FIG. 8. Second light source 820-2 emits a second light beam 925 of a second color component, different from the first color component. The second light beam enters into the diffraction grating and leaves the diffraction grating as a redirected second light beam 930 of the second color component. A second path of the second light beam is from the second light source to the diffraction grating to the particles. A portion of the first path between the first light source and the diffraction grating is different from a portion of the second path between the second light source and the diffraction grating. A portion of the first path between the diffraction grating and the particles is the same as a portion of the second path between the diffraction grating and the particles. In other words, redirected first light beam 830 (FIG. 8) and redirected second light beam 930 (FIG. 9) approach the particle inspection zone from the same direction or along the same path. The paths of light beams 830 and 930 may be straight lines. Alternatively, the paths of light beams 830 or 930 may include one or more curved portions in which light is guided by a wave guide such as an optical fiber. The paths of light beams 830 or 930 may also include one or more reflections off of mirrors.

As discussed above, in a specific embodiment, one or more light sources may include quantum-dots. Quantum-dots are very small particles of semiconductor materials that are only a few nanometers in diameter. This small size affects the band gap energy, and hence light emission wavelength, of the quantum-dot. By adjusting the quantum-dot diameter during its manufacture, the wavelength of its emitted light may be tuned. A quantum-dot (QD) is a nanocrystal made of semiconductor materials that is small enough to exhibit quantum mechanical properties. Different sized quantum-dots emit different color light due to quantum confinement.

In other words, electronic characteristics of a quantum-dot are closely related to its size and shape. For example, the band gap in a quantum-dot which determines the frequency range of emitted light is inversely related to its size. In fluorescent dye applications the frequency of emitted light increases as the size of the quantum-dot decreases. Consequently, the color of emitted light shifts from red to blue when the size of the quantum-dot is made smaller. This allows the excitation and emission of quantum-dots to be highly tunable. Since the size of a quantum-dot may be set when it is made, its electronic and optical properties may be carefully controlled. Quantum-dot assemblies having many different sizes, such as gradient multi-layer nanofilms, can be made to exhibit a range of desirable emission properties.

Figure 10:
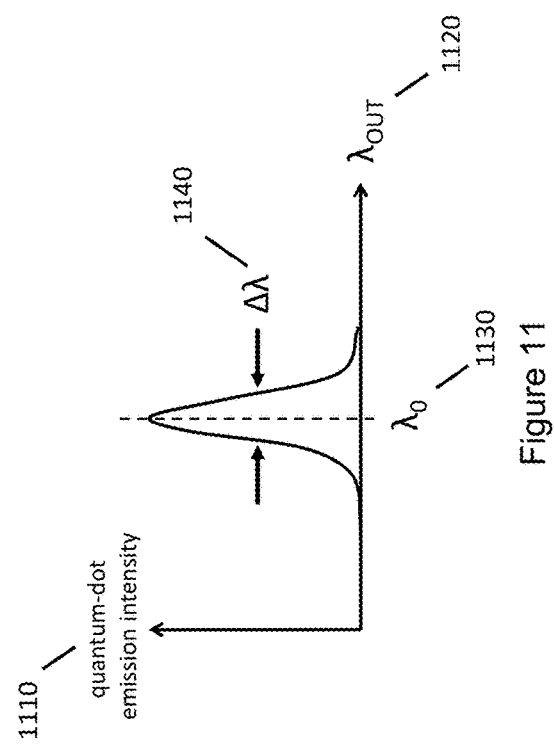
FIG. 10 shows an example of the operation of quantum-dots.

Specifically, as schematically illustrated in FIG. 10, its small dimensions affect its band gap. FIG. 10 shows quantum-dots 1030, 1032, and 1034 in varying sizes. There are incoming photons of light 1040 into the quantum-dots and outgoing photons of light 1050 from the quantum-dots. A vertical direction 1010 in FIG. 10 represents electron energy (e.g., a vertical electron energy axis). Horizontal dotted, dashed and solid lines 1024a-b, 1022a-b, and 1020a-b, respectively, represent the band gap limits of quantum-dots of small, smaller and even smaller diameters respectively.

The lower sets of horizontal lines represent the top of the valence band and the upper sets of horizontal lines represent the bottom of the conduction band. A photon of light may be absorbed if its energy exceeds the band gap energy, that is, if its wavelength $\lambda_{IN}$ is sufficiently short. When such a photon is absorbed, an electron e− previously in the valence band is excited into the conduction band, leaving a hole h+ in the valence band. This is illustrated to the left of FIG. 10.

The resulting electron e− and hole h+ quickly loose energy until they are at the bottom of the conduction band and at the top of the valence band, and then the electron e− at the bottom of the conduction band will emit a photon of wavelength $\lambda_{OUT}$ loosing sufficient energy to occupy the hole+ in the valance band. This is illustrated to the right of FIG. 10 for the case of the smallest of the three quantum-dot diameters considered in the figure. The wavelength $\lambda_{OUT}$ of the lower energy re-emitted photon is longer than the wavelength of the higher energy absorbed photon $\lambda_{IN}$.

Such a process of photon absorption at a shorter wavelength followed by the emission of a photon at a longer wavelength is an example of fluorescence. The mechanisms illustrated in FIG. 10 may be summarized by saying quantum-dots fluoresce at wavelength $\lambda_{OUT}$ when excited by light of a shorter wavelength $\lambda_{IN}$. A key observation is that while quantum-dots may absorb photons of a broad range of wavelengths corresponding to any photon energy exceeding the band gap, the emitted or fluorescent photons are approximately monochromatic with a wavelength corresponding to the band gap energy. A desired emitted wavelength $\lambda_{OUT}$ may be provided by appropriately tuning the diameter of the quantum-dots during their manufacture.

Quantum-dots corresponding to any desired color or wavelength can be fabricated. In a specific embodiment, a particle monitor includes "size-tuned quantum-dots." In this specific embodiment, the emission wavelength is mainly tuned via manufacturing control of particle size.

In another specific embodiment, a particle monitor includes "composition-tuned quantum-dots." In this specific embodiment, the emission wavelength is mainly tuned via manufacturing control of the particle composition (e.g., adjusting the material composition in order to control the quantum-dot emission wavelength). Composition-tuned quantum-dots may be composed of a mixture of $CsPbI_3$, $CsPbCl_3$ and $CsPbBr_3$ where (referring to the periodic table) Cs is cesium, Pb is lead, I is iodine, Cl is chlorine and Br is bromine. By mixing these three compounds in different proportions, the nanoparticle's band gap energy and hence emission wavelength may be tuned.

In some cases, "composition-tuned" quantum-dots can provide a narrow spectral width ("<25 nm FWHM" or less than 25 nm full width half maximum) because there is no requirement to precisely control the size of the quantum-dot particles (as their emission wavelength is controlled more by composition than size), but instead by precisely controlling the composition of the quantum-dots. Quantum-dots may be provided for visible, UV, or infrared wavelengths. Particle sizes (e.g., diameter) of composition-tuned quantum-dots may range from about 5 nm to about 50 nm. The size may be greater than 50 nm or less than 5 nm.

Figure 11:
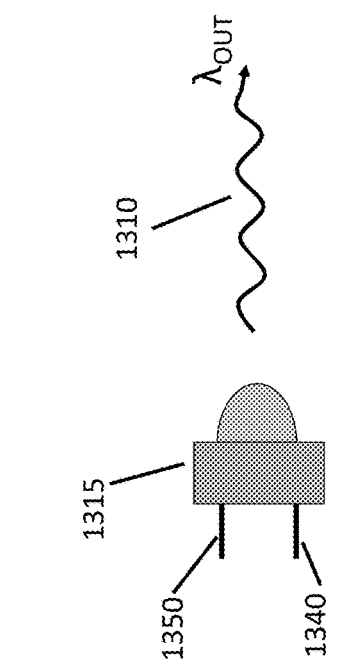
FIG. 11 shows a spectral distribution.
Figure 12:
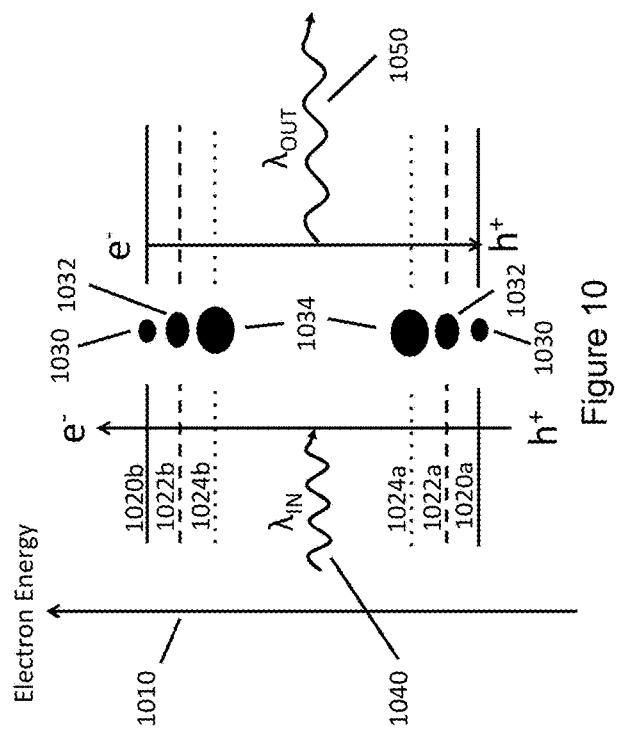
FIG. 12 shows a light emitting diode (LED) paired with a film containing quantum-dots, according to one or more embodiments.
Figure 13:
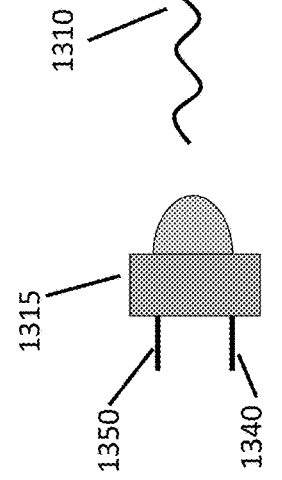
FIG. 13 shows a quantum-dot LED, according to one or more embodiments.

Quantum-dots may be defined as nano-scale particles (<1 um in largest dimension) of semi-conductor material with a band gap controlled peak emission wavelength. In embodiments where an approximately monochromatic illumination is desired quantum-dots with a narrow distribution of sizes may be used. A corresponding spectral distribution is schematically shown in FIG. 11. FIG. 11 shows a vertical axis 1110 and a horizontal axis 1120. The vertical axis indicates light intensity. The horizontal axis indicates a wavelength of emitted light. The spectrum has a peak wavelength 1130 and a wavelength spread 1140. The peak wavelength can be tuned by adjusting the band gap which in turn is controlled by adjusting the quantum-dot size. A narrow wavelength spectrum helps to identify particles such as pollen based on color.

Full-width-at-half-maximum (FWHM) spectral widths of $\Delta\lambda$=50 nm, and even 25 nm, are presently achieved by commercial quantum-dot suppliers. Narrower spectral widths may well be possible. For many purposes, such as interferometry measurements, a spectral widths of $\Delta\lambda$=25 nm is far from monochromatic and the much narrower spectral widths of lasers are required. However, as is discussed below in connection with FIG. 22A, for the purpose of spectral analysis of biological particles, such spectra with spectral widths in the 10 nm to 100 nm range are monochromatic for practical engineering purposes. It is in this sense that we may refer to such spectra of quantum-dot light sources as being "quasi-monochromatic." For monitors of airborne biological particles, quantum-dots have the advantage of providing quasi-monochromatic light sources.

In some embodiments, light sources 111-1, 111-2, 111-3, 111-4 and 111-N of FIG. 1 are quasi-monochromatic light sources other than quantum-dot light sources. Traditional semi-conductor LEDs in the marketplace are often narrow enough in wavelength spread to be considered quasi-monochromatic in the context of airborne biological particles. However, the choice of colors (wavelengths) of such traditional LEDs has historically been limited. Nevertheless, a number of different LED colors is technically feasible. For example, semi-conductor LEDs based on indium gallium nitride of the chemical formula $In_xGa_{1-x}N$ may be designed for a number of colors in the green to blue range depending on the ratio of indium to gallium atoms (X=number of indium atoms divided by sum of indium and gallium atoms). Furthermore, the recent commercialization of organic LEDs or "OLEDs" may increase LED color choices. Another option, for less price sensitive applications, is to use a set of tunable dye lasers to provide a set of mono-chromatic light sources of differing wavelengths. As illustrated by the Laser-Light SMD™ products of the company SLD Laser of Goleta, Calif., even lasers can come in convenient surface-mount packages, for at least some wavelengths. There may well be new quasi-monochromatic light sources invented in the future. While quantum dots create exciting new options for quasi-monochromatic light sources, there are other options.

Returning to the topic of quantum-dots, they may be made of binary compounds (e.g., lead sulfide, lead selenide, cadmium selenide, cadmium sulfide, indium arsenide, and indium phosphide) or ternary compounds (e.g., cadmium selenide sulfide). Quantum-dots can contain as few as 100 to 100,000 atoms within the quantum-dot volume, with a diameter of 10 to 50 atoms. This corresponds to about 2 to 10 nanometers.

Quantum-dots absorb photons (perhaps with a broad range of wavelengths) from a light source such as an LED, and then emit photons (of a longer wavelength) with a narrow spectral spread. Alternatively, quantum-dots may be excited electronically and serve as the original source of photons. For example LEDs (more specifically organic light emitting diodes or OLEDs) may be modified so that its light originates from electron-hole recombination within quantum-dots. Whether quantum-dots are used to create light, or to modify light, the result is light with narrow spectral peaks.

In a specific embodiment, a method includes identifying an absorption peak of a particle of interest, and providing a quantum-dot containing product having a set of quantum-dots configured to correspond to the absorption peak of the particle of interest. The quantum-dot containing product may be a film, LED, tape, adhesive, backing material for an adhesive, or disk. The quantum-dot containing product may be installed within a particle monitoring device.

FIG. 12 shows a conventional LED 1210 and a film 1230 containing quantum-dots. The film includes a matrix of transparent material in which the quantum-dots have been dispersed throughout. The material may include a clear or transparent polymer, plastic, glass, acrylic, silicone, adhesive, epoxy, or resin.

FIG. 12 illustrates the film intercepting photons of wavelength $\lambda_{IN}$ 1220 from the conventional light emitting diode (LED). Photons from the LED are absorbed by quantum-dots that then fluoresce at a longer wavelength $\lambda_{IN}$ 1240. The same principles may be applied to any fluorescent material not necessarily quantum dots, that shifts wavelengths as desired.

In a specific embodiment, the LED includes a blue LED, but can be any light emitting element that emits a wavelength shorter than the desired output wavelength. The film or other transparent medium containing quantum-dots converts between input and output wavelengths via the mechanisms shown in FIG. 10. A blue LED is desirable because a quantum-dot can absorb a higher energy photon (of shorter wavelength) and convert it to a photon of lower energy (of longer wavelength). For example, a quantum-dot of a particular diameter can convert blue light to red light because the blue light is of a higher energy than the red light. As another example, a quantum-dot of another different diameter can convert blue light to green light because the blue light is of a higher energy than the green light. Thus, starting with a high energy light (e.g., a blue LED), increases the range of colors that can be produced using quantum-dots.

In another specific embodiment, quantum-dots convert electrical energy to light energy within the LED itself. More particularly, FIG. 13 illustrates a direct generation of photons of wavelength $\lambda_{OUT}$ 1310 from a quantum-dot LED

1315. Within such an LED, the electron e− and hole h+ to the right of FIG. 10 are provided by associated electronic circuitry and are not the result of photon absorption. In particular electrical current goes from lead 1340 through quantum-dots and to lead 1350. When an electrical current passes through quantum-dots, electrons combine with holes generating photons.

Figure 14:
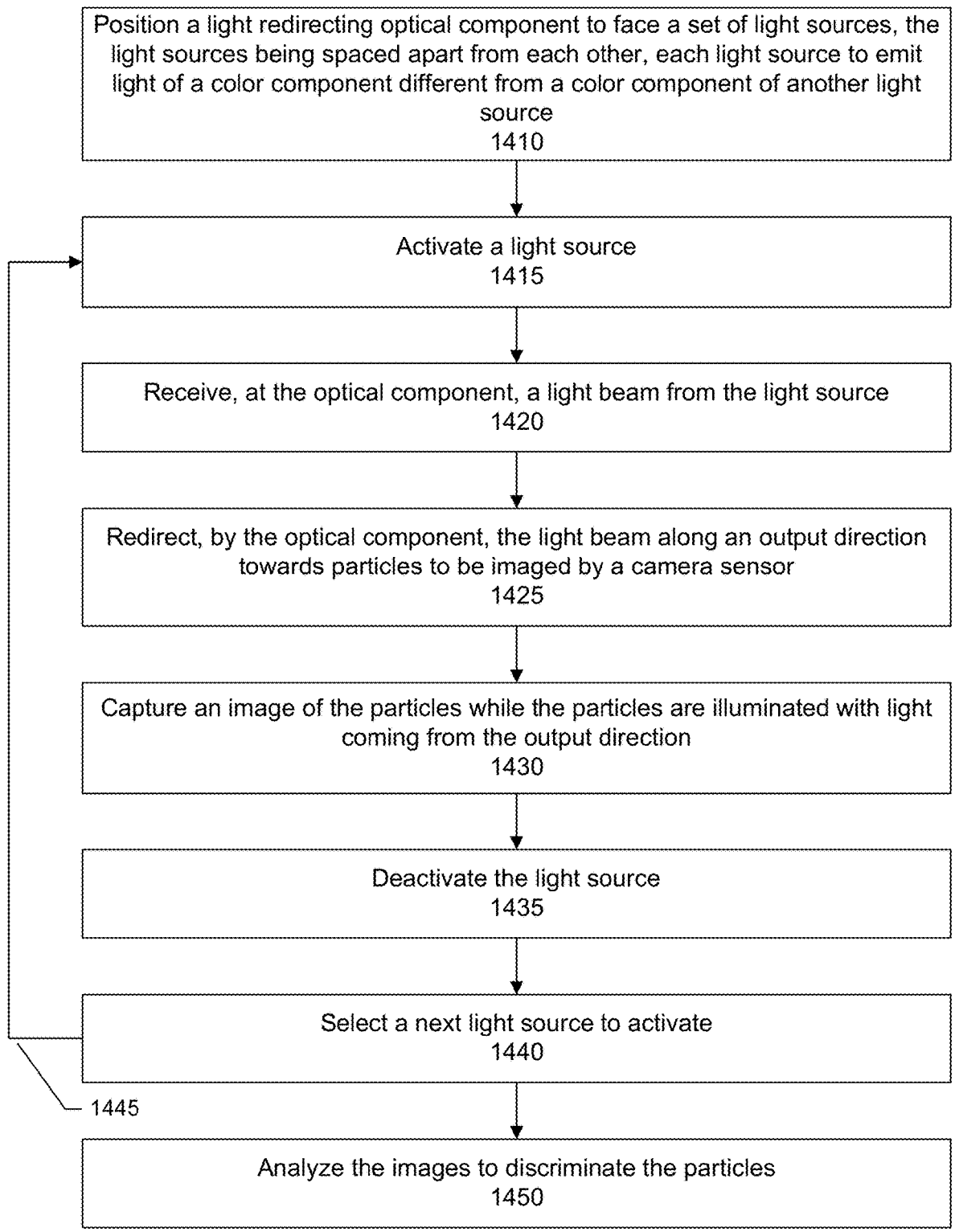
FIG. 14 shows an overall flow of a particle monitoring device, according to one or more embodiments.

FIG. 14 shows an overall flow of a particle monitoring device to discriminate particles. Some specific flows are presented in this application, but it should be understood that the process is not limited to the specific flows and steps presented. For example, a flow may have additional steps (not necessarily described in this application), different steps which replace some of the steps presented, fewer steps or a subset of the steps presented, or steps in a different order than presented, or any combination of these. Further, the steps in other embodiments may not be exactly the same as the steps presented and may be modified or altered as appropriate for a particular process, application or based on the data.

In a step 1410, a light redirecting optical component (e.g., diffraction grating or prism) is positioned to face a set of light sources. The light sources are spaced apart from each other. Each light source emits light of a color component different from a color component of another light source. For example, a first light source may emit light having a first predominate wavelength of about 550 nm. A second light source may emit light having a second predominate wavelength of about 600 nm. And so forth.

In a step 1415, a light source is activated. In a step 1420, a light beam from light source is received at the optical component. In a step 1425, the optical component redirects the light beam along an output direction or optical path towards particles to be imaged by a camera sensor. The optical path may be straight line or alternatively include one or more mirror reflections and/or wave-guided segments. In a step 1430, the camera sensor captures an image of the particles while the particles are illuminated with the light coming from the output direction. In a step 1435, the light source is deactivated. In a step 1440, a next light source is selected to be activated and the process loops back 1445 to step 1415. Alternatively, if the illumination of the particles under different lighting conditions is complete, the process can advance to analyzing the images to discriminate the particles (step 1450).

In some cases, depending upon the spectral signature of the type of particle of interest, it may not be necessary to image the particles under each of the different lighting conditions. For example, a particle monitoring device may include ten light sources of different colors. An image analysis may proceed with having captured images under just a subset of the ten light sources or, in other words, without having captured images under each of the ten light sources. The illumination and analysis may be iterative. For example, a first image may be acquired while the particles are illuminated by light of a first color component. The first image may be analyzed to discriminate the particles. If the analysis is inconclusive or more spectral information is desired, a second image may then be acquired while the particles are illuminated by light of a second color component, different from the first color component.

The flow in FIG. 14 shows a process of sequentially activating the light sources. That is, the light sources (which may include quantum-dots) are activated sequentially one at a time and a separate camera image is taken when each light source is activated.

Figure 15:
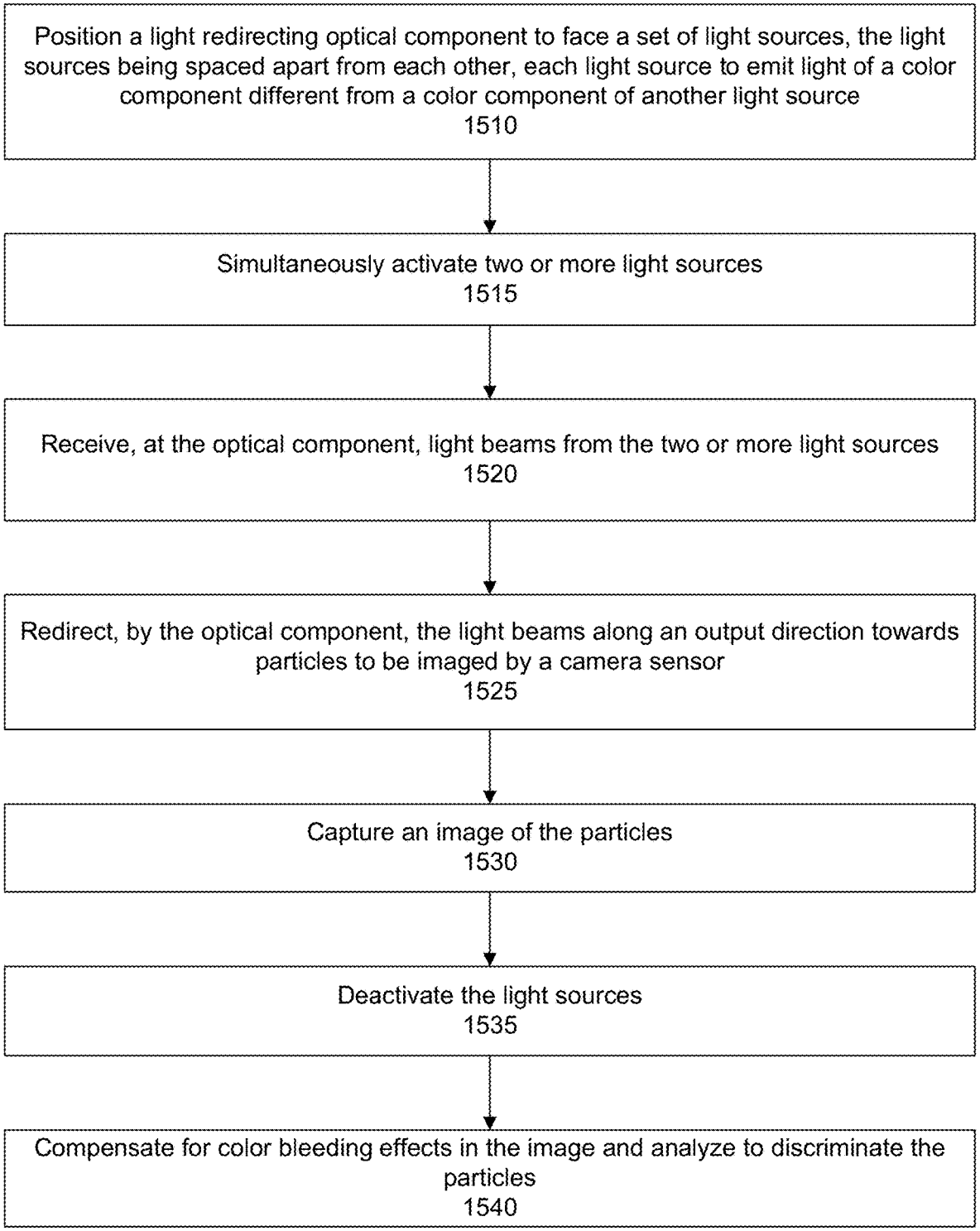
FIG. 15 shows a flow for simultaneously activating two or more light sources of a particle monitoring device, according to one or more embodiments.

FIG. 15 shows a flow for simultaneously activating two or more light sources. In brief, in a step 1510, a light redirecting optical component is positioned to face a set of light sources, the light sources being spaced apart from each other, each light source to emit light of a color component different from a color component of another light source.

In a step 1515, two or more light sources are simultaneously activated. In a step 1520, light beams from the light sources are received at the optical component. In a step 1525, the optical component redirects the light beams along an output direction towards particles to be imaged by the camera sensor. The optical path may be straight line or alternatively include one or more mirror reflections and/or wave-guided segments. In a step 1530, an image is captured while the particles are illuminated with light from the two light sources. It should be appreciated that activation of the two or more light sources may occur sequentially so long as the particles are imaged while being illuminated with light from the two or more light sources. In a step 1535, the light sources are deactivated. In a step 1540, a processing is performed to compensate for color bleeding effects in the image and the image is analyzed to identify the particles.

Figure 16:
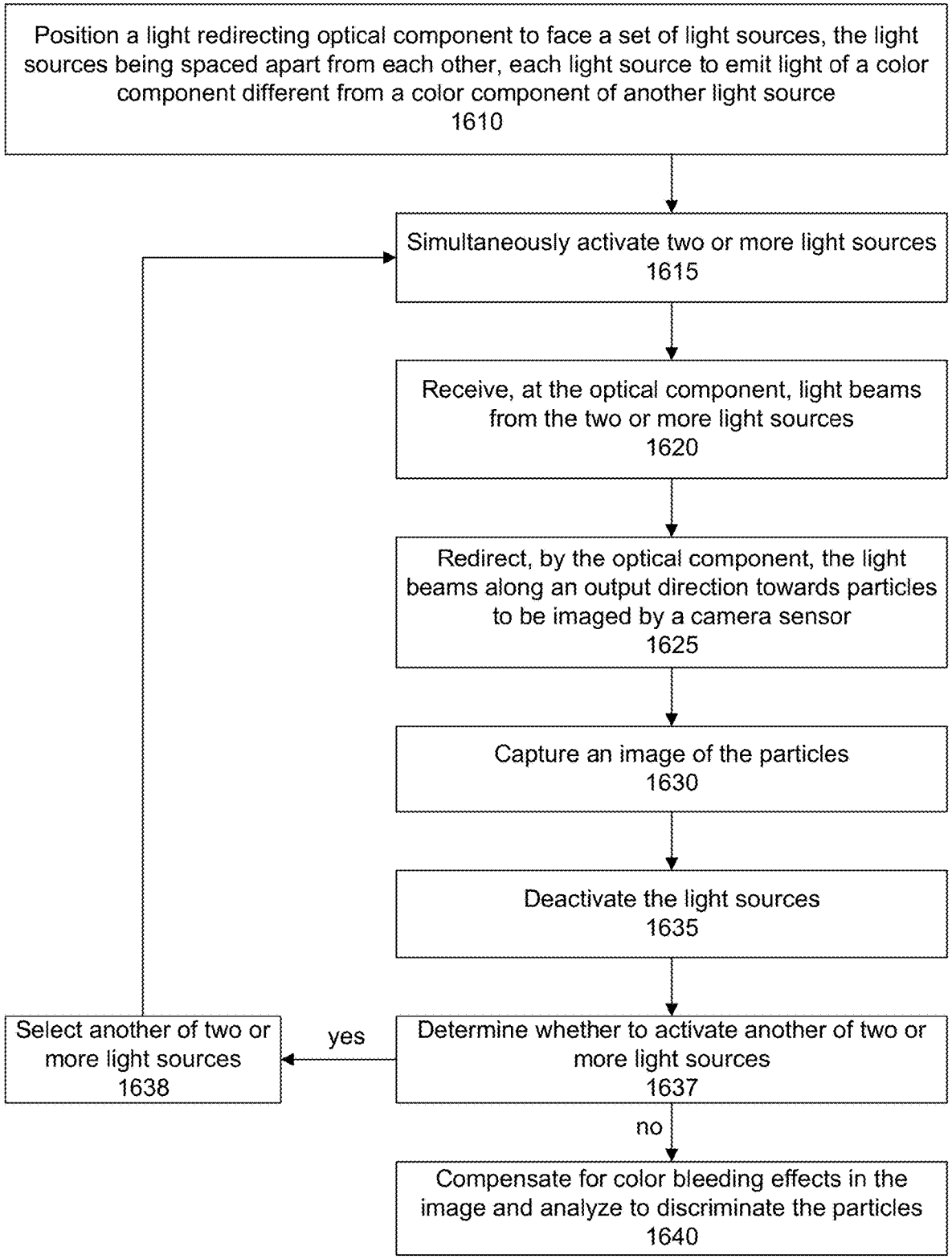
FIG. 16 shows another flow for simultaneously activating two or more light sources of a particle monitoring device, according to one or more embodiments.

FIG. 16 shows a flow for simultaneously activating two or more light sources according to another specific embodiment. The flow in FIG. 16 is similar to the flow shown in FIG. 15. For example, in a step 1610, a light redirecting optical component is positioned to face a set of light sources, the light sources being spaced apart from each other, each light source to emit light of a color component different from a color component of another light source.

In a step 1615, two or more light sources are simultaneously activated. In a step 1620, light beams from the light sources are received at the optical component. In a step 1625, the optical component redirects the light beams along an output direction towards particles to be imaged by the camera sensor. The optical path may be straight line or alternatively include one or more mirror reflections and/or wave-guided segments. In a step 1630, an image is captured while the particles are illuminated with light from the two light sources. It should be appreciated that activation of the two or more light sources may occur sequentially so long as the particles are imaged while being illuminated with light from the two or more light sources. In a step 1635, the light sources are deactivated. In a step 1640, a processing is performed to compensate for color bleeding effects in the image and the image is analyzed to identify the particles. FIG. 16, however, shows that after step 1635 (deactivate the light sources), the flow may return to step 1615 to simultaneously activate another set of two or more light sources, until all desired illumination combinations have been completed.

More specifically, in a step 1637, a determination is made as to whether to activate another of two or more light sources. If the determination is that another of two or more light sources are to be activated, another of two or more light sources are selected (step 1638) and simultaneously activated (step 1615).

Figure 17:
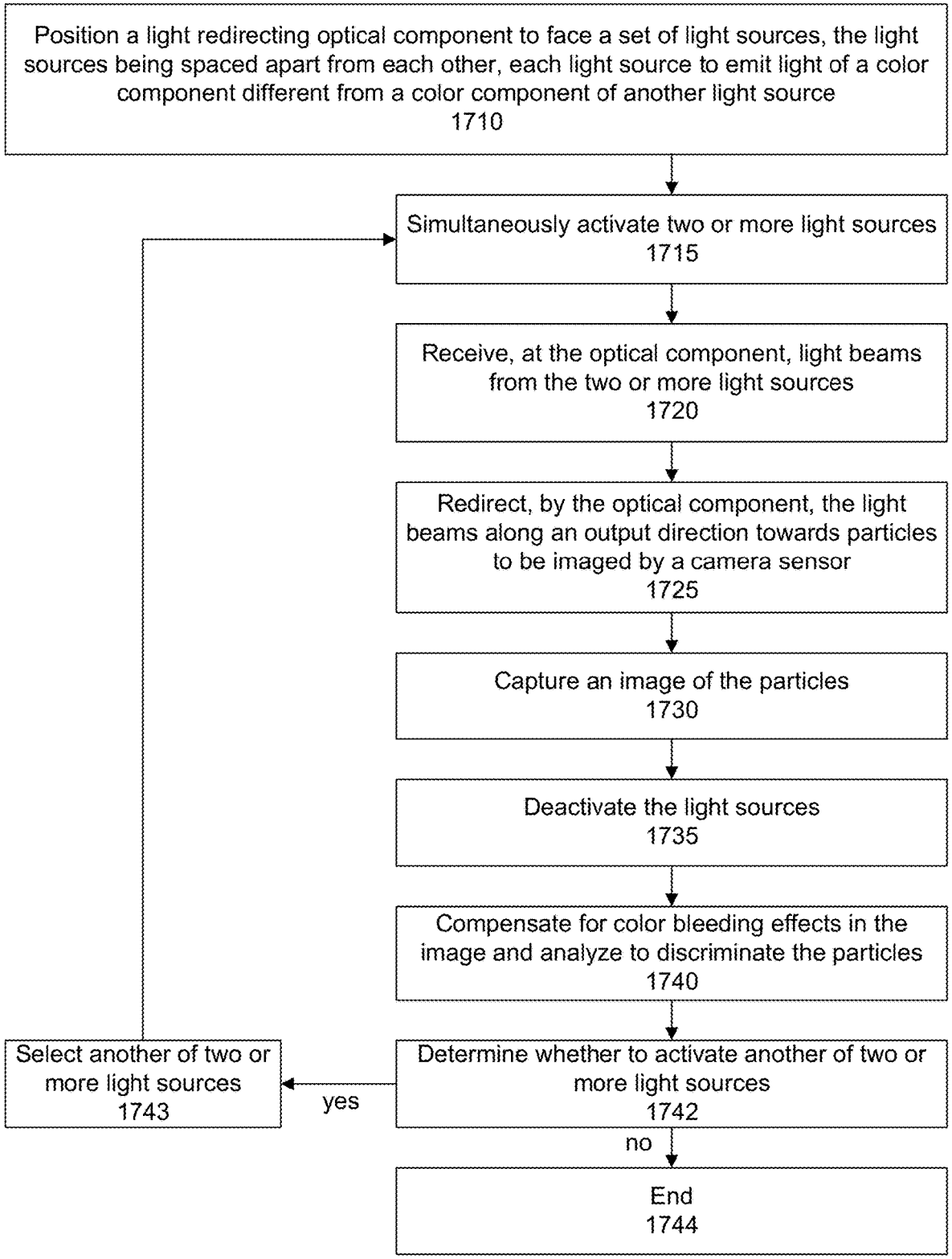
FIG. 17 shows another flow for simultaneously activating two or more light sources of a particle monitoring device, according to one or more embodiments.

FIG. 17 shows a flow for simultaneously activating two or more light sources according to another specific embodiment. The flow in FIG. 17 is similar to the flow shown in FIG. 15. For example, in a step 1710, a light redirecting optical component is positioned to face a set of light sources, the light sources being spaced apart from each other, each light source to emit light of a color component different from a color component of another light source.

In a step 1715, two or more light sources are simultaneously activated. In a step 1720, light beams from the light sources are received at the optical component. In a step 1725, the optical component redirects the light beams along an output direction towards particles to be imaged by the camera sensor. The optical path may be straight line or alternatively include one or more mirror reflections and/or wave-guided segments. In a step 1730, an image is captured while the particles are illuminated with light from the two light sources. It should be appreciated that activation of the two or more light sources may occur sequentially so long as the particles are imaged while being illuminated with light from the two or more light sources. In a step 1735, the light sources are deactivated. In a step 1740, a processing is performed to compensate for color bleeding effects in the image and the image is analyzed to identify the particles. FIG. 17, however, shows that after step 1740 (compensate for color bleeding effects in the image and analyze to discriminate the particles), the flow may return to step 1715 to simultaneously activate another set of two or more light sources, until all desired illumination combinations have been completed.

More specifically, in a step 1742, a determination is made as to whether to activate another of two or more light sources. If the determination is that another of two or more light sources are to be activated, another of two or more light sources are selected (step 1743) and simultaneously activated (step 1715). Alternatively, if there are no further desired combination of illumination conditions remaining, the process ends (step 1744).

Figure 18:
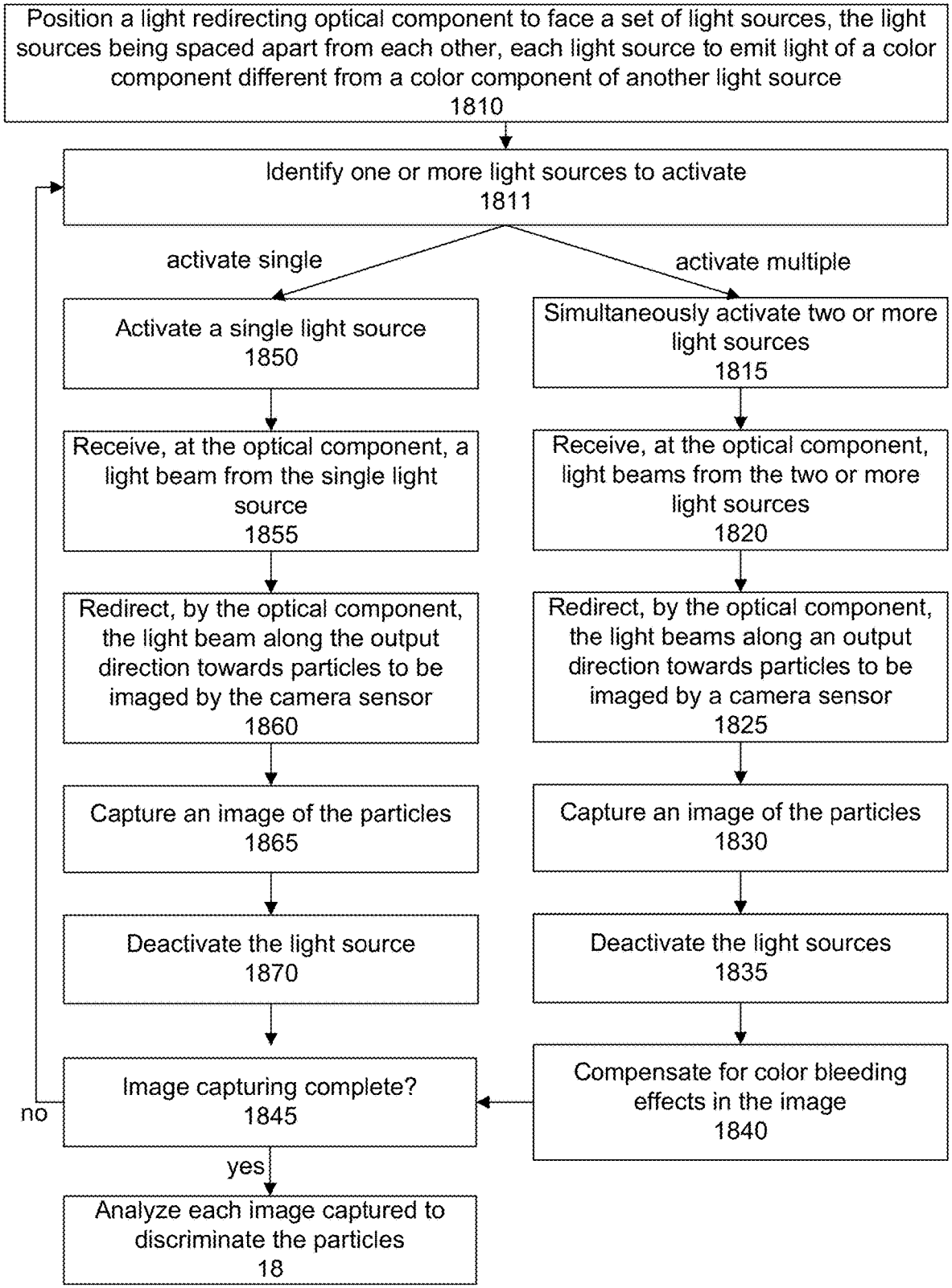
FIG. 18 shows a flow for activating a single light source for an image and simultaneously activating two or more light sources for another image, according to one or more embodiments.

FIG. 18 shows a flow for acquiring images under both single and multiple illumination conditions. FIG. 18 can be considered a hybrid of the flows of FIGS. 14 and 15 in which some images are captured with illumination from only one light source and other images are captured with simultaneous illumination from two or more light sources.

More specifically, in a step 1810, a light redirecting optical component is positioned to face a set of light sources, the light sources being spaced apart from each other, each light source to emit light of a color component different from a color component of another light source. In a step 1811, an identification is made of one or more light sources to activate. If a determination is to activate multiple light sources, in a step 1815, two or more light sources are simultaneously activated. In a step 1820, the optical component receives light beams from the two or more light sources.

In a step 1825, the optical component redirects the light beams along an output direction towards particles to be imaged by the camera sensor. The optical path may be straight line or alternatively include one or more mirror reflections and/or wave-guided segments. In a step 1830, an image is captured while the particles are illuminated with light from the two light sources. It should be appreciated that activation of the two or more light sources may occur sequentially so long as the particles are imaged while being illuminated with light from the two or more light sources. In a step 1835, the light sources are deactivated. In a step 1840, a processing is performed to compensate for color bleeding effects in the image.

Referring back now to step 1811, if a determination is to activate a single light source, in a step 1850, a single light source is activated. In a step 1855, the optical component receives the light beam from the single light source. In a step 1860, the optical component redirects the light beam along the output direction toward the particles to be imaged by the camera sensor. The optical path may be straight line or alternatively include one or more mirror reflections and/or wave-guided segments. In a step 1865, an image is captured while the particles are illuminated with light from the single light source. In a step 1870, the light source is deactivated. In a step 1845, a determination is made as to whether image capturing is complete. If image capturing is not complete, the process loops back to step 1811 (identifying one or more light sources to activate). Alternatively, if image capturing is complete, each image captured is analyzed to discriminate the particles.

More particularly, in a specific embodiment, only one quantum-dot wavelength is activated at a time. In another specific embodiment, data acquisition may be speed up by simultaneously activating two, or even three, wavelengths at a time. If red, green and blue quantum-dots are simultaneously activated in the illumination system, the camera's red sub-pixels will capture the image due to the red quantum-dots, green sub-pixels will capture the signal from green-quantum-dot illumination, and likewise for blue. In RGB camera sensors, there is significant bleeding between color channels, for example red sub-pixels do respond weakly to blue illumination light.

FIGS. 19-20 show formulas that may be applied to compensate for such color bleeding effects, thus enabling fast data acquisition via simultaneous activation of two or three illumination wavelengths. One may solve the simultaneous equations of FIG. 20, for each pixel location (x,y) for the spectral components $S_1$, $S_2$ and $S_3$ as a function of measured RGB values RED, GREEN and BLUE. If there are only two simultaneously activated light sources, then the last term in each equation of FIG. 20 is dropped.

FIG. 21 shows a flow for determining a number of light sources for a particle monitoring device and wavelengths to be emitted by the light sources. In brief, in a step 2110, spectral signatures of particles to discriminate are obtained. In a step 2115, a number and wavelength of light sources for the particle monitoring device is adjusted based on corresponding changes in the spectral signatures.

More specifically, classification of particles may be based in part on the shapes and sizes, i.e. morphology, of imaged particles. Such morphology information becomes more limited when the sizes of small particles approach the limits of resolution of optical microscopy. For example, given that the wavelength of visible light is about a half of a micron, images of, say, one or two micron-diameter particles lack morphological detail.

Classification of particles may also be based in part on particle color. When morphology information is limited, such as when particles of interest are in the micron size range, there is a need to make good use of particle color characteristics. This motivates increasing the amount of color or spectral information captured by the optical system. In a specific embodiment, hyper-spectral imaging maximizes the amount of captured color or spectral information.

Individual bacteria are commercially important examples of small particles of interest that motivate use of hyper-spectral imaging.

An approximation of full spectral analysis of objects viewed with a camera sensor is possible with a sufficient number of illumination sources such as quantum-dot illumination sources. While not providing the same fine color resolution of a scientific grade spectrometer, a device with between 10 and 100 quasi-monochromatic illumination sources, such as quantum-dot illumination sources, can provide an approximation of a full spectral analysis at each camera-sensor pixel location that provides useful information at relatively low cost. In many cases for cost-effective hyperspectral imaging of biological particles, the number of quasi-monochromatic illumination sources may preferably be no more than 50, more preferably no more than 30, even more preferably no more than 20, and most preferably no more than 15. The discussion below regarding FIG. 22A explains why such modest spectral sampling may well be sufficient for classification of biological particles. On the other hand, the benefits of hyperspectral imaging will be lost with too little spectral sampling, so the number of quasi-monochromatic illumination sources is preferably no less than 4, more preferably no less than 7 and most preferably no less than 10. In a specific embodiment, a number of illumination sources, such as quasi-monochromatic illumination sources, is between 10 and 15. This includes, for example, 10, 11, 12, 13, 14, and 15. The number of illumination sources may be less than 10. The number of illumination sources may be greater than 15.

An ideal a hyper-spectral imager captures image intensity I(x, y, λ) as a continuous function of spatial coordinates x and y and also as a continuous function of light wavelength λ. In practice, image intensity is never digitized as a continuous function of (x,y) position but rather sampled at discrete pixel locations. Likewise, in practical engineering of hyper-spectral systems, image intensity will be measured at a finite discrete set of wavelengths and not the mathematical ideal of an infinitely fine continuum of wavelengths. It is of interest to know how many wavelengths need be sampled in order to well approximate ideal hyper-spectral imaging.

Figure 22A:
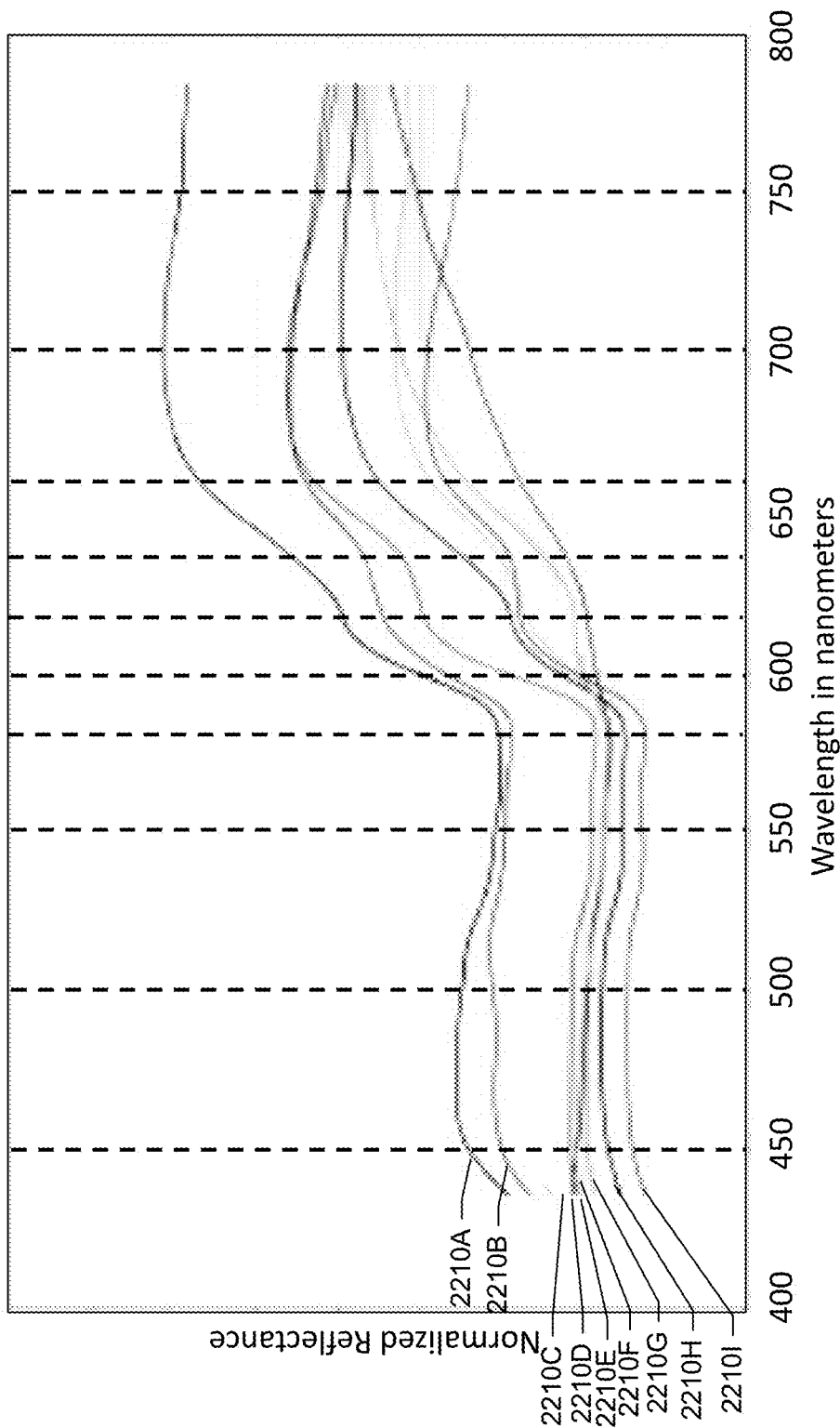
FIG. 22A shows spectral signatures for several pathogens.

FIG. 22A (which makes use to data from FIG. 2 of "Hyperspectral Image Acquisition and Analysis for the Discrimination of Bacterial Colonies on Blood Agar Plates" by Simone Arrigoni, Giovanni and Ablerto Signoroni) shows the spectral characteristics of a number of types of bacteria including *Escherichia coli* 2210A, *Enterococcus faecalis* 2210B, *Staphylococcus aureus* 2210C, *Proteus mirabilis* 2210D, *Proteus vulgaris* 2210E, *Klebsilla pneumonia* 2210F, *Pseudomonas aeruginosa* 2210G, *Streptococcus agalatiae* 2210H, and *Proteus mirabilis* smear 2210I. An x-axis of the graph indicates wavelength (nm) and y-axis of the graph indicates normalized reflectance.

Ten vertical black dashed lines are superimposed on the graph. These vertical lines correspond to the following ten light wavelengths: 450 nm, 500 nm, 550 nm, 580 nm, 600 nm, 620 nm, 640 nm, 660 nm, 700 nm, and 750 nm. The spectra shown in the figure vary sufficiently smoothly so that sampling spectral values at these ten wavelengths would provide essentially the same information for classification purposes as the complete spectra. Thus for distinguishing between such bacteria species, a sampling of ten wavelengths may be expected to provide an excellent approximation to ideal hyper-spectral imaging. There may be much loss of useful color information with a sampling of three colors, such as provided by RBG camera sensor images with white light illumination. In a specific embodiment, "hyperspectral" may be interpreted as sampling of 10 or more wavelengths. In other embodiments "hyper-spectral" may be interpreted as sampling of 4 or more wavelengths.

Note that the example in FIG. 22A of sampling wavelengths of 450 nm 500 nm, 550 nm, 580 nm, 600 nm, 620 nm, 640 nm, 660 nm, 700 nm, and 750 nm takes full advantage the flexibility to tune quantum-dot wavelengths during their manufacture. In this example, the selected wavelengths are not uniformly spaced; the spacing is reduced where the spectra vary the most. Depending on application, both the number and the wavelengths of the quantum-dot light sources may be adjusted as desired. The wavelength spacing between color components may not necessarily be uniformly spaced. For example, a wavelength spacing between the 450 nm and 500 nm wavelengths is different from a wavelength spacing between the 620 nm and 640 nm wavelengths. Some wavelengths may be equally spaced. For example, a wavelength spacing between the 450 nm and 500 nm wavelengths is equal to a wavelength spacing between the 500 nm and 550 nm wavelengths.

The relatively sparse sampling of wavelengths in FIG. 22A is closely connected to the concept of "quasi-monochromatic" light sources for hyperspectral imaging of biological particles. For example, in FIG. 22A, consider the sampling at nominal wavelengths of 450 nm 500 nm, and 550 nm. Even if light sources for these three nominal wavelengths had full-width-at-half-maximum (FWHM) wavelength spreads of 100 nm, or half widths at half maximum of 50 nm, there would still be only moderate overlap between the spectra of the light sources. Generalizing these comments, if $\lambda_N$ and $\Delta\lambda_N$ are the nominal wavelength and FWHM wavelength spread of light source N, and $\lambda_{N-1}$ and $\lambda_{N+1}$ are the nominal wavelengths of light sources neighboring in color, the light source N may be considered to be quasi-monochromatic if the half-width at half-maximum, $\Delta\lambda_N/2$, is less than or equal to the smaller of $|\lambda_N-\lambda_{N-1}|$ and $|\lambda_N-\lambda_{N+1}|$. With this in mind, even $\Delta\lambda_N=100$ nm is not too broad to be considered "quasi-monochromatic" in the context of FIG. 22A.

Figure 22B:
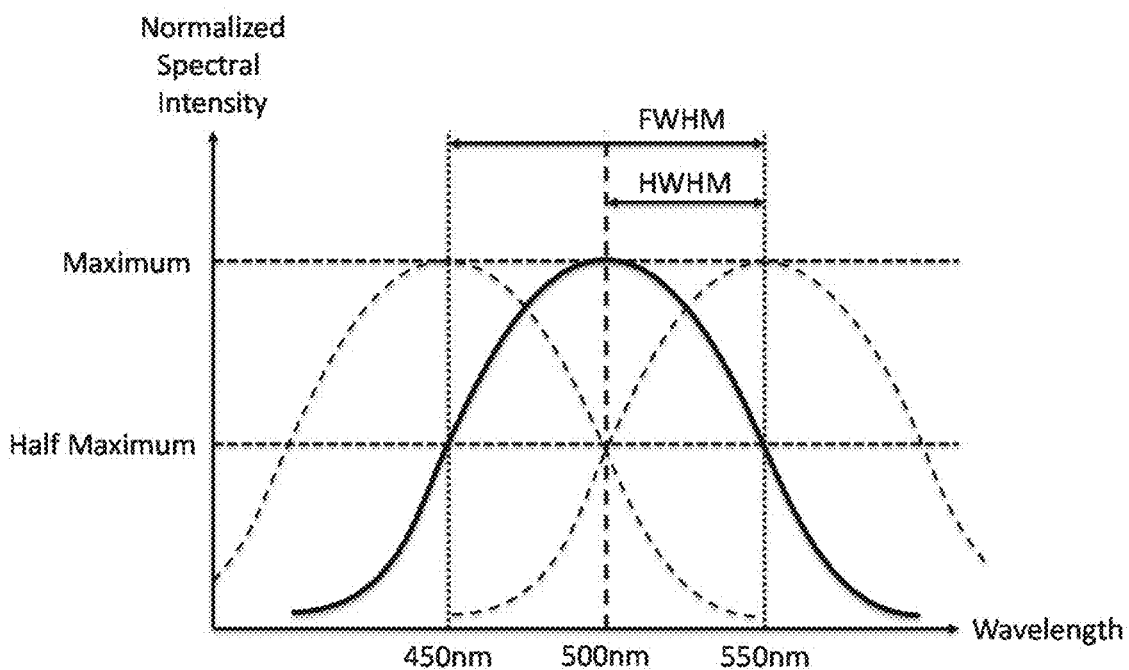
FIG. 22B shows an example of an acceptable level of spectral overlap between light sources.

As a concrete example, FIG. 22B illustrates a specific case where $\lambda_N$ is 500 nm, $\lambda_{N-1}$ is 450 nm and $\lambda_{N+1}$ is 550 nm so that the values of both $|\lambda_N-\lambda_{N-1}|$ and $|\lambda_N-\lambda_{N+1}|$ are 50 nm. As shown in the solid curve, the full-width-at-half-maximum (FWHM) wavelength spread of the light source of nominal wavelength 500 nm, $\Delta\lambda_N$, is 100 nm. This is the limiting case of the quasi-monochromatic condition that "the half-width at half-maximum $\Delta\lambda_N/2$ is less than or equal to the smaller of $|\lambda_N-\lambda_{N-1}|$ and $|\lambda_N-\lambda_{N+1}|$. As shown in the dashed curves, the spectral spread is assumed to be the same for the 450 nm and 550 nm light sources. In this example, the spectrum of the 500 nm light source overlaps with the spectra of the 450 nm and 550 nm light sources, but still not so much as to prevent the three light sources from probing distinct spectral properties of biological particles of interest.

Figure 22C:
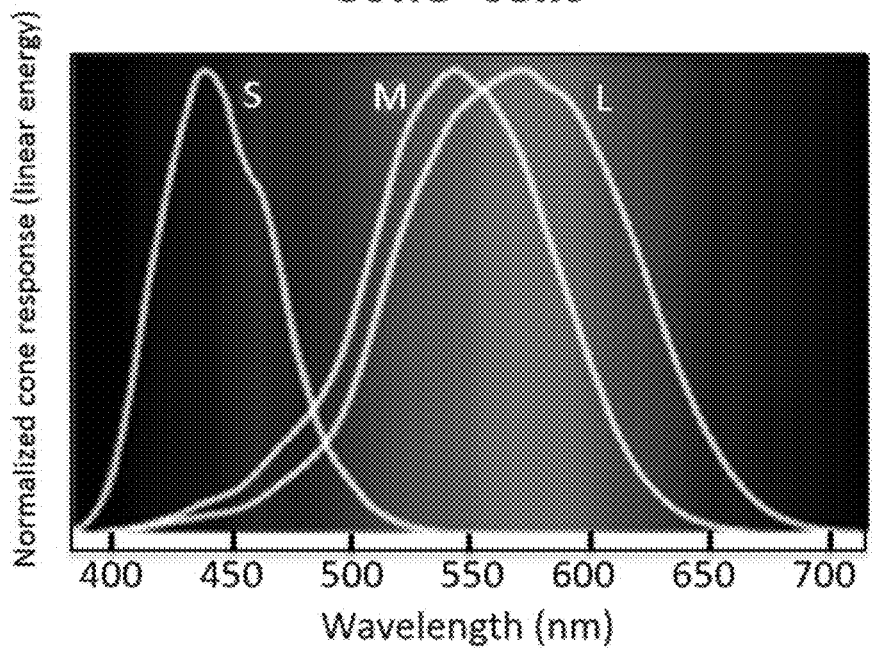
FIG. 22C shows a graph of spectral characteristics of the three types of cones in the human eye retina.

Repeating the same analysis for the nominal wavelengths 580 nm, 600 nm, 620 nm tells us that the nominal 600 nm light source may be considered mono-chromatic if its full-width-half-maximum wavelength spread is 40 nm or less. The condition that the half-width at half-maximum $\Delta\lambda_N/2$ is less than or equal to the smaller of $|\Delta\lambda_N-\lambda_{N-1}|$ and $|\Delta\lambda_N-\lambda_{N+1}|$ is not a hard requirement, but rather an indication of whether light-source spectral overlap is mild or strong. FIG. 22C shows a graph of the spectral characteristics of the three types of cones in the human eye retina. Note the high degree of overlap between the M and L cones. As shown in the example of FIG. 22C, the human eye, despite a much greater overlap in the spectral sensitivities of two of the three types of cones, is able to well perceive three-dimensional color palette (e.g. the RGB color palette of an LCD). This suggests useful spectral information could still be collected with light sources of even larger wavelength spreads. Nevertheless, meeting the above condition is preferred in order to reduce demands on measurement systems and data analysis.

A conventional approach to hyper-spectral imaging is to use white light illumination and detect light with a sensor with powerful spectrum analyzing capabilities, such as binning detected light into hundreds of separate wavelength bins. However, such spectrum analyzing light sensors are very expensive and thus out of reach for many customers.

Systems and techniques, however, allow light sensors to be low-cost mass-produced RGB camera sensors. To obtain good results (and unlike conventional hyperspectral technology), spectrum analyzing is conducted not so much with the light sensor, but rather with the illumination source. At first glance, it would appear that there is then a need for hundreds of different monochromatic light sources, i.e. lasers, corresponding to the wavelength bins of a light sensor of conventional hyperspectral technology. However, by itself, this is a step backwards. It would increase, not decrease, cost to have an illumination system with hundreds of lasers of different wavelengths.

Applicant has appreciated, however, that the spectral properties of airborne biological particles are such that hundreds of lasers of different wavelengths are not needed and give little more information than, say, 10 well selected wavelengths. This is in the right direction, but still an illumination system of 10 lasers of non-standard wavelengths is still an expensive proposition.

Applicant has discovered that good results regarding identifying airborne particles of interest can be obtained by conducting sampling at relatively few wavelengths (e.g., 10 wavelengths) within the visible spectrum, rather than hundreds. Thus, there is no need for expensive monochromatic light sources such as lasers. Instead, quasi-monochromatic light sources can be sufficient. Inexpensive quasi-monochromatic light sources, as discussed herein, are relatively easy to source and inexpensive. In a specific embodiment, a particle monitor includes a set of light sources, where each light source, unlike a laser, includes a full-width-at-half-maximum (FWHM) wavelength spread that is greater than or equal to 10 nm. In another specific embodiment, each light source includes a full-width-at-half-maximum (FWHM) wavelength spread that is greater than or equal to 25 nm.

Some examples of quasi-monochromatic light sources (that are not monochromatic) include LEDs without quantum dots, LEDs with quantum dots, and films with quantum dots that are illuminated by blue light LEDs. At first glance one would think the wavelength spread of LEDs and quantum dots is too broad to define wavelength bins for hyperspectral imaging, and indeed this is generally the case, but a careful analysis of the specific needs of hyper-spectral imaging of airborne biological particles of interest reveals that quasi-monochromatic lights sources are sufficient permitting the use of LEDs and quantum dots to define wavelength bins.

FIG. 23A shows a side view of a schematic illustrating an operation of a prism in a particle monitoring device 2305 according to one or more embodiments. In the example show in FIG. 23A, the particle monitoring device includes an illumination support plate 2310, a particle inspection zone 2315, below the illumination support plate, at which particles 2320 are to be imaged, a prism 2325, quantum-dot light sources 2330, and another light source 2335. The illumination support plate may be referred to as an inspection platform. Depending on the needs of the applications, the choice of the exact type of the other light source 2335 may vary. Light source 2335 may be a white light source, or an ultra-violet (UV) light source, or even another set of quantum-dot light sources similar to light sources 2330. The illumination support plate includes a first hole 2340, a second hole 2345, and a third hole 2350.

The third hole defines a viewfinder through which the particles may be imaged by a camera sensor above the third hole. Light source 2335 is mounted in the second hole. The prism is positioned to receive beams of light of different wavelengths or color components in different directions 2355 from the quantum-dot light sources and redirect each beam of light along a common output direction or optical path 2360 through first hole and towards the particles.

In an embodiment, there can be a small board containing the quantum-dot light sources illuminating the prism which then redirects all color components along the same optical path to the particle inspection zone. FIG. 23A shows three quantum-dot light sources. It should be appreciated that the number of quantum-dot light sources shown is merely for purposes of example. Other embodiments include a greater number of quantum-dot light sources. In a specific embodiment, there are at least ten quantum-dot light sources.

In a specific embodiment, the particle monitoring device further provides for white light illumination. For white-light illumination, it can be advantageous to illuminate from more than one direction at once in order to get more complete images of particles. In a specific embodiment, light source 2335 is configured to emit a first beam of white light. While not shown in FIG. 23A, additional white light sources illuminating from different directions may also be provided to better approximate diffuse white lighting. Quantum-dot light sources 2330 may be activated simultaneously so that the prism outputs a second beam of white light. The particles may be illuminated by the first beam of white light coming from a first direction and by the second beam of white light coming from a second direction, different from the first direction. An image of the particles may be captured while the particles are illuminated by the first and second beams of white light.

FIGS. 23B and 23C show schematics of a specific embodiment of a particle monitor in which particles 2362 captured on media 2363 and advanced to a particle inspection zone 2369 are illuminated from four different directions. FIG. 23B illustrates four illumination directions in plan view and FIG. 23C provides a side view of the same illumination directions shown in FIG. 23B. More specifically, arrows 2372A-D indicate first, second, third, and fourth illumination directions, respectively. An illumination from any one of the four illumination directions may be provided by set of quasi-monochromatic light sources such as discussed in connection with FIG. 7. Alternatively, two or more of the directions illustrated in FIGS. 23B and 23C may be provided with sets of quasi-monochromatic light sources. For example, first, second, and third directions 2372A-C may be provided with quasi-monochromatic light sources while fourth direction 2372D may be provided with a UV LED illumination system in order to provide fluorescence images. In another embodiment, first and third directions 2372A,C are provided with white-light LEDs, second direction 2372B with a set of quasi-monochromatic light sources, and fourth direction 2372D with UV LED light source. Many other combinations are also possible. In a specific embodiment, white-light LEDs illuminate from the first and second directions while a UV LED illuminates from the fourth direction.

FIG. 24 shows a side view of a schematic illustrating an operation of a diffraction grating in a particle monitoring device 2405 according to one or more embodiments. The example shown in FIG. 24 is similar to the example in FIG. 23A. In FIG. 24, however, the prism has been replaced with a diffraction grating 2425. The diffraction grating is positioned to receive beams of light of different wavelengths or color components from the quantum-dot light sources and redirect all color components along the same optical path to the particle inspection zone.

In a specific embodiment, the diffraction grating forms an integral portion of the illumination support plate. For example, the diffraction grating and the illumination support plate may be formed from the same continuous block of material. The material may include glass, plastic, metal (e.g., aluminum, copper), or any other competent material. Forming the diffraction grating from the same continuous block of material as the illumination support plate can reduce the number of items on a bill of materials and reduce manufacturing costs. In another specific embodiment, the diffraction grating may be produced as a component separate from the illumination support plate and mounted next to the illumination support plate.

Depending upon the application, a diffraction grating may be selected over a prism. In other cases, a prism may be selected over the diffraction grating. A benefit of the diffraction grating is that a diffraction grating can be manufactured with very high tolerances regarding mechanical properties such as the gradient spacing. This allows for consistent, repeatable, and precise performance. The performance of a prism is very dependent on the material properties of the prism (e.g., glass) and can be challenging to control. A prism tends to spread out or separate light on the blue side of the spectrum more than light on the red side of the spectrum. This uneven spreading, however, may be desirable in cases where changes in spectral signatures of the particles of interest occur towards the blue side of the spectrum rather than the red side of the spectrum.

As discussed, in a specific embodiment, quantum-dot technology provides light sources with properties desirable for the above-described schemes for hyper-spectral illumination from a consistent illumination angle.

FIGS. 25A-27 show schematic views of other specific embodiments of a particle monitor capable of providing similar hyper-spectral illumination schemes, e.g., providing a consistent illumination angle of different color components.

Figure 23A:
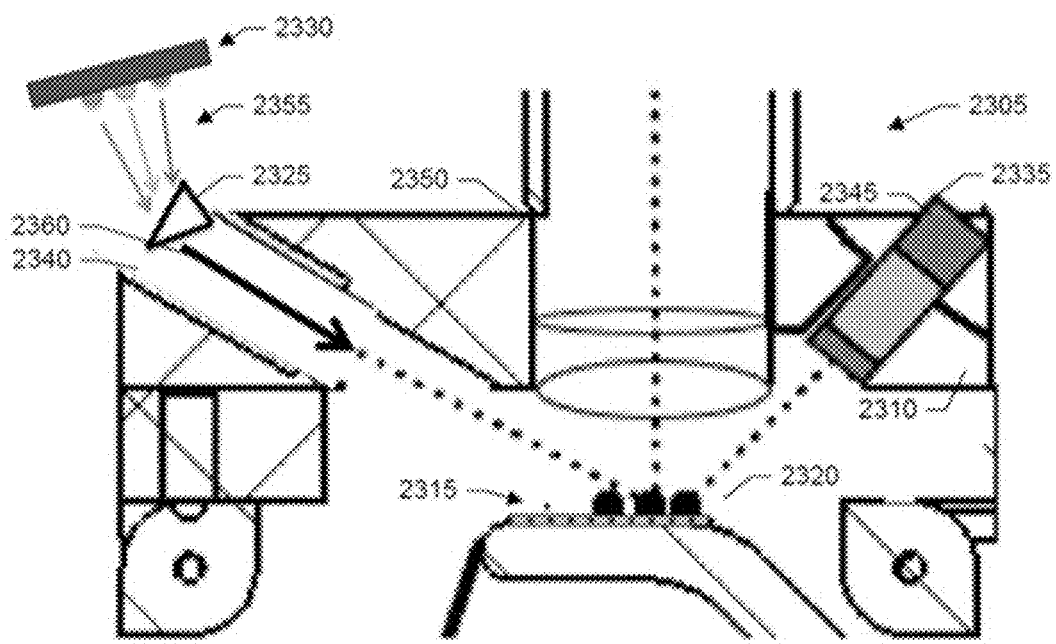
FIG. 23A shows a schematic view of a particle monitoring device having a prism, according to one or more embodiments.
Figure 23B:
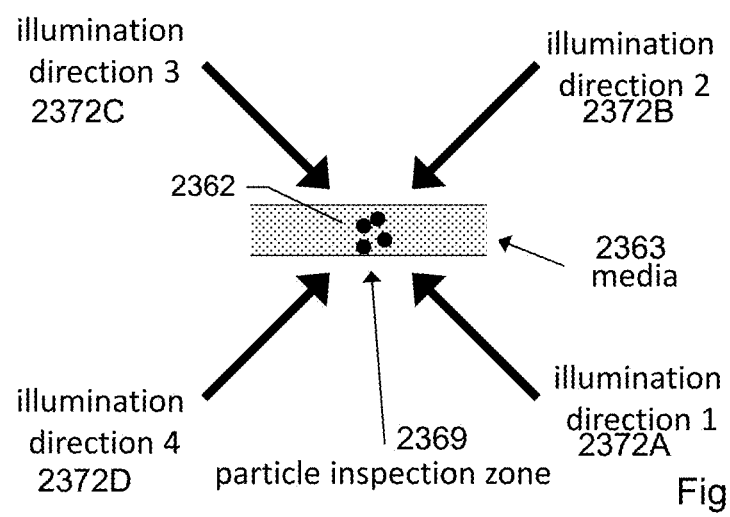
FIG. 23B shows a schematic plan view of a particle monitoring device capable of illuminating particles from four different directions, according to one or more embodiments.
Figure 23C:
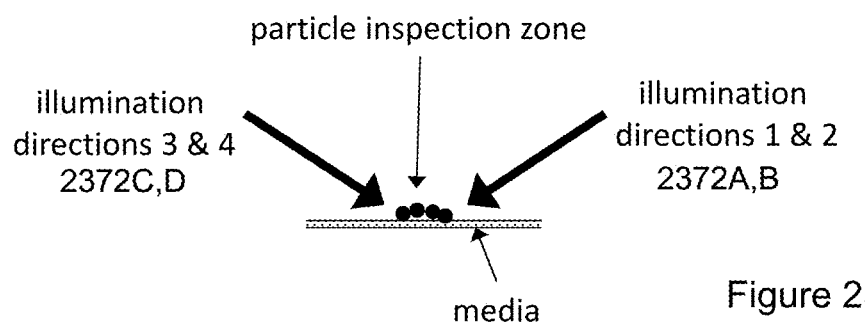
FIG. 23C shows a schematic side view of the particle monitoring device shown in FIG. 23B.
Figure 25A:
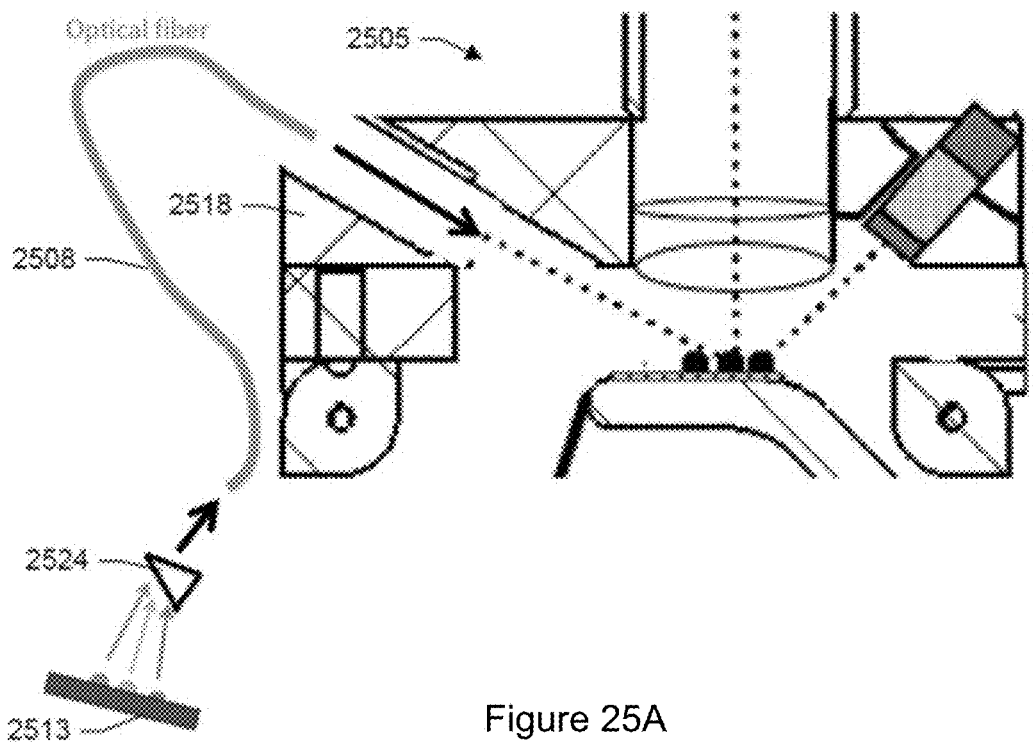
FIG. 25A shows a schematic view of a particle monitoring device having remote light sources, according to one or more embodiments.

More specifically, FIG. 25A shows a schematic side view of a particle monitoring device 2505 according to one or more embodiments. The particle monitoring device shown in FIG. 25A is similar to the particle monitoring device shown in FIG. 23A. In FIG. 25A, however, a length of optical fiber 2508 has been inserted between an illumination source 2513 and an illumination support plate 2518, or, more particularly, between a prism 2524 and the illumination support plate. In this manner, it is possible to free the color-combing illumination source from the mechanical design constrains present in the immediate proximity of the illumination source plate. Leaving prism 2524, the color combined light may be split and propagated down two or more optical fibers to illuminate the particle inspection zone from multiple angles. Such splitting may be done with partially silvered mirrors, to, for example, reflect one-third of the color combined light to a first optical fiber while transmitting two-thirds of the light, half of which is reflected to a second optical fiber and the other half is transmitted to a third optical fiber. Alternatively, optics may be designed so that the beam area of the color combined light is sufficiently large to simultaneously illuminate the inputs of two or more optical fibers. These comments also apply if a diffraction grating is used instead of prism 2524.

Figure 25B:
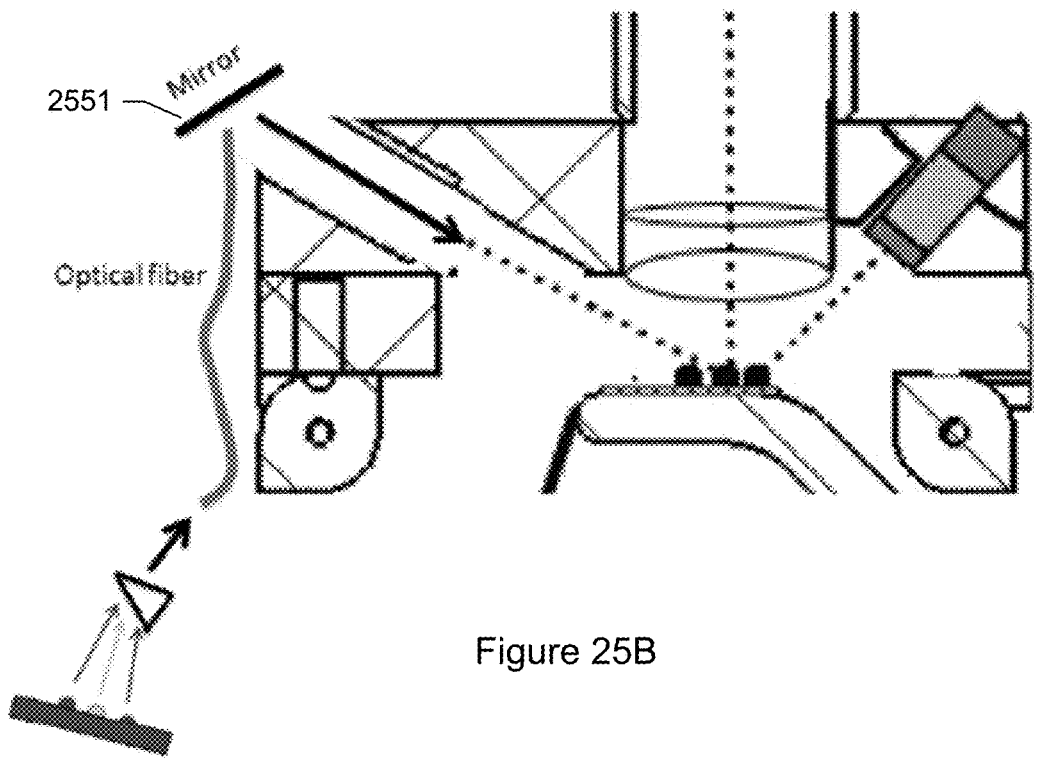
FIG. 25B shows a schematic view of a particle monitoring device having remote light sources and mirror, according to one or more embodiments.

FIG. 25B shows an embodiment similar to that of FIG. 25A, but with the addition of a mirror 2551 to reduce the amount of the optical fiber needs to be bent. In general, the option to include one or more mirrors in the optical path, with or without an optical fiber, provides additional mechanical design flexibility in the placement of the color-combining illumination source. Like optical fibers, reflections with mirrors may also increase mechanical design flexibility for locating the prism or grating "light redirecting optical component."

For efficient light capture and transport, the optical fiber may be a relatively large diameter optical fiber functioning as a multi-mode fiber. The core of the fiber may include a liquid with only the cladding shell made of solid material; this fiber design enables good flexibility (small bending radii) to larger optical fiber diameters.

Figure 26:
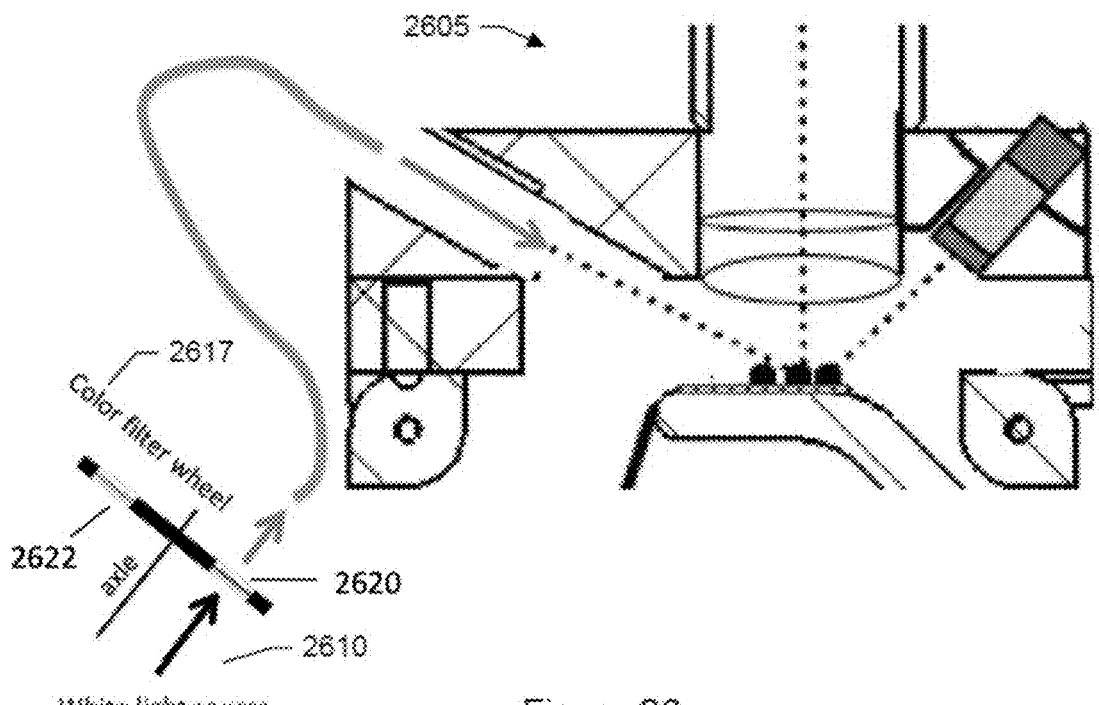
FIG. 26 shows a schematic view of a particle monitoring device having a color filter wheel, according to one or more embodiments.

In another specific embodiment, one or more illumination sources begin with a white light source followed by a mechanism to select desired illumination colors. For example, FIG. 26 shows a schematic side view of a particle monitoring device 2605 according to one or more embodiments. The particle monitoring device shown in FIG. 26 is similar to the particle monitoring device shown in FIG. 25A. In FIG. 26, however, rather than a prism or diffraction grating, white light 2610 is passed through color filters in a color wheel 2617.

As shown in the example of FIG. 26, light from a white source passes through a green filter 2620 so that green light reaches the particle inspection zone. Other colors are selected by rotating the color filter wheel so that another filter of a different color, such as red color filter 2622, intercepts the white light.

Figure 27:
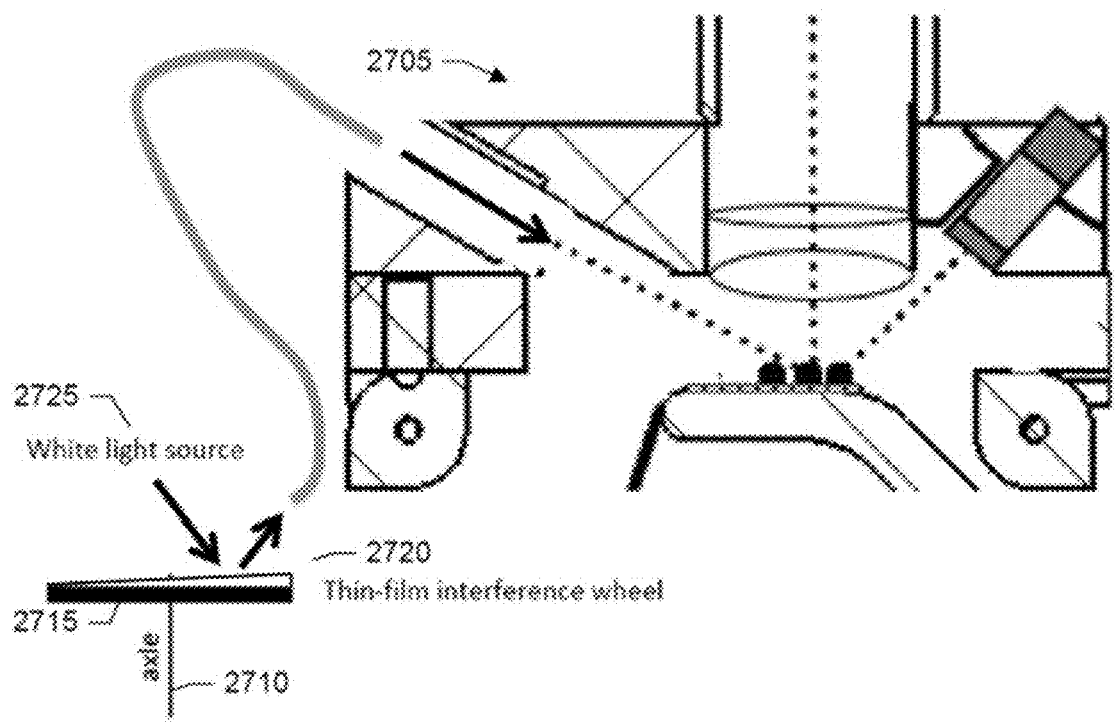
FIG. 27 shows a schematic view of a particle monitoring device having a thin-film interference wheel, according to one or more embodiments.

FIG. 27 shows a schematic side view of a particle monitoring device 2705. The particle monitoring device shown in FIG. 27 is similar to the particle monitoring device shown in FIG. 25A. In FIG. 27, however, rather than a prism, via an axle 2710, a motor controls the rotation angle of a reflective disk 2715 (illustrated edge-on in black). Upon the reflective disc is formed a thin layer of transparent material 2720 (white in illustration). A white light beam 2725 is directed at the disc. Light reflections from the exposed surface of the transparent material interfere with reflections off the reflective disc material, giving rise to color-dependent constructive and destructive interference effects analogous to those seen in a thin oil slick. The layer of transparent material is thin, being in the range from a few to dozens of optical wavelengths thick. There is a gradient in the thickness of the transparent material so that the thickness seen by the white light may be varied by rotating the thin-film interference wheel.

Figure 28:
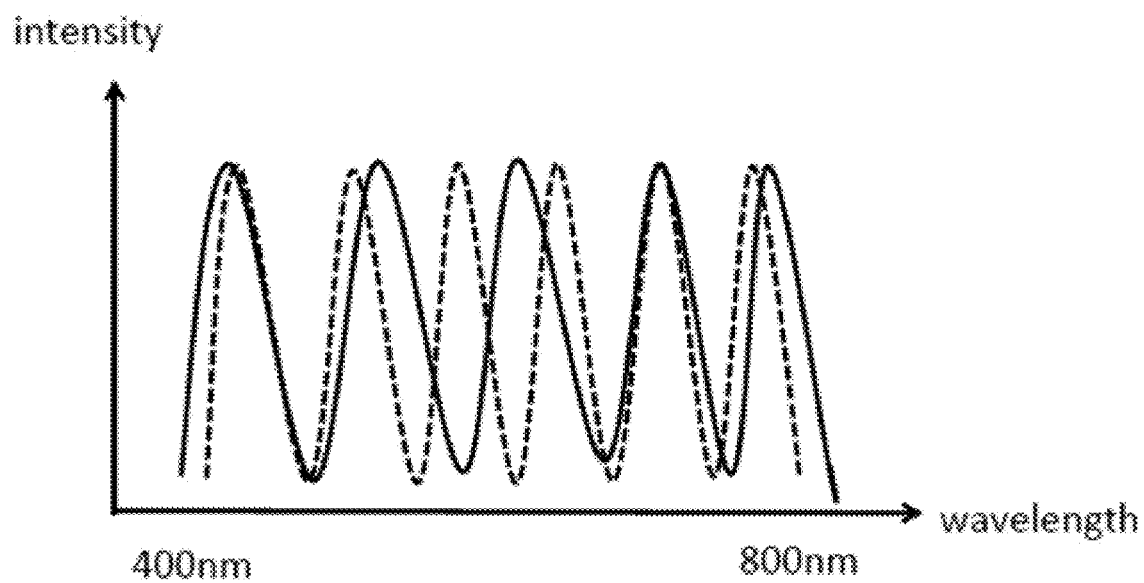
FIG. 28 shows spectral curves associated with the particle monitoring device shown in FIG. 27.

The resulting spectrum of light illuminating the particle inspection zone is oscillatory as illustrated by the dashed curve shown in FIG. 28. The number of oscillations is proportional to the transparent layer thickness in units of wavelengths. When the thin-film interference wheel is rotated so that the white light source is reflected off a thinner part of the transparent film, then the number of oscillations in the spectrum will decrease, such as illustrated by the solid curve shown in FIG. 28. When the thin-film interference wheel is rotated so that the white light source is reflected off a thicker part of the transparent film, then the number of oscillations in the spectrum will increase, such as illustrated by the dashed curve shown in FIG. 28. With appropriate mathematical analysis, such as Fourier transform techniques, hyper-spectral image intensity $I(x, y, \lambda)$ may be determined from camera sensor data for many such illumination spectra. The reflective disc might be made of silicon and the transparent layer out of silicon-dioxide.

Disclosed herein are systems and techniques to acquire "hyper-spectral" color information in order to better discriminate between particle types. Such systems and techniques can be especially advantageous when particles of interest are small and have dimensions on the order of one micron. In this case particle morphology information is limited due to resolution limits of optical microscopy. A key example is where the particles of interest are individual bacteria.

The systems and techniques described herein enable collection of hyper-spectral information with a standard RGB camera sensor, thus avoiding the need for an expensive hyper-spectral camera. For each pixel in an image, a hyper-spectral camera acquires the light intensity (radiance) for a large number (typically a few tens to several hundred) of contiguous spectral bands. Every pixel in the image thus contains a continuous spectrum (in radiance or reflectance) and can be used to characterize the objects in the scene with great precision and detail. Such cameras, however, are extremely expensive. In a specific embodiment, however, the system and techniques described herein allow for hyper-spectral imaging or an approximation of hyperspectral imaging using an RGB camera sensor, which only acquires three different spectral channels corresponding to the visual primary colors red, green and blue.

The systems and techniques described herein provide for maintaining a consistent illumination angle with illumination wavelength changes. The consistent illumination angle helps to facilitate the analysis of the resulting hyper-spectral images. In a specific embodiment, the systems and techniques described herein may be applied to upgrade existing particle monitors to capture hyper-spectral images without dramatically increasing cost.

Figure 24:
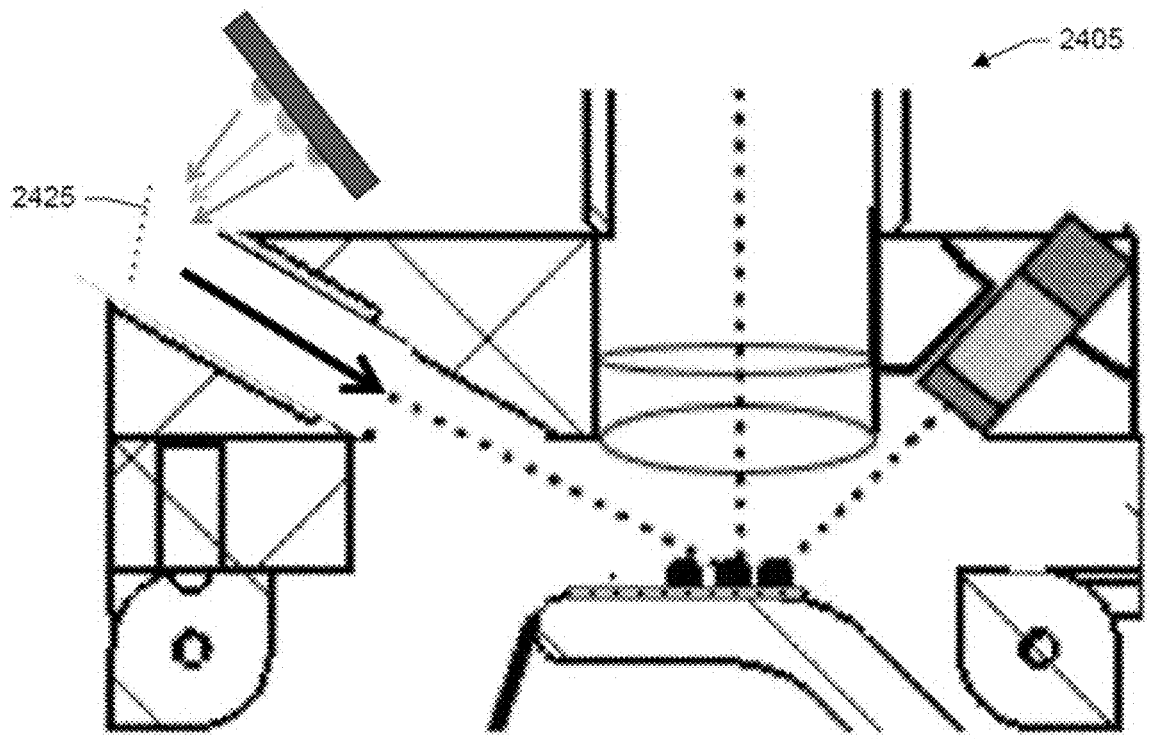
FIG. 24 shows a schematic view of a particle monitoring device having a diffraction grating, according to one or more embodiments.

The various features and principles presented in this application may be combined, in any combination, with other features and principles presented in this application. For example, the discussion accompanying FIG. 25A on locating the illumination sources remote from the particle inspection zone and using optical fiber to deliver the light to the particle inspection zone is applicable to the implementation shown in FIG. 24 in which a diffraction grating is used. As another example, the discussion accompanying FIG. 7 on blue LEDs being used with quantum-dots is applicable to the implementation shown in FIG. 24 in which a diffraction grating is used.

Figure 29:
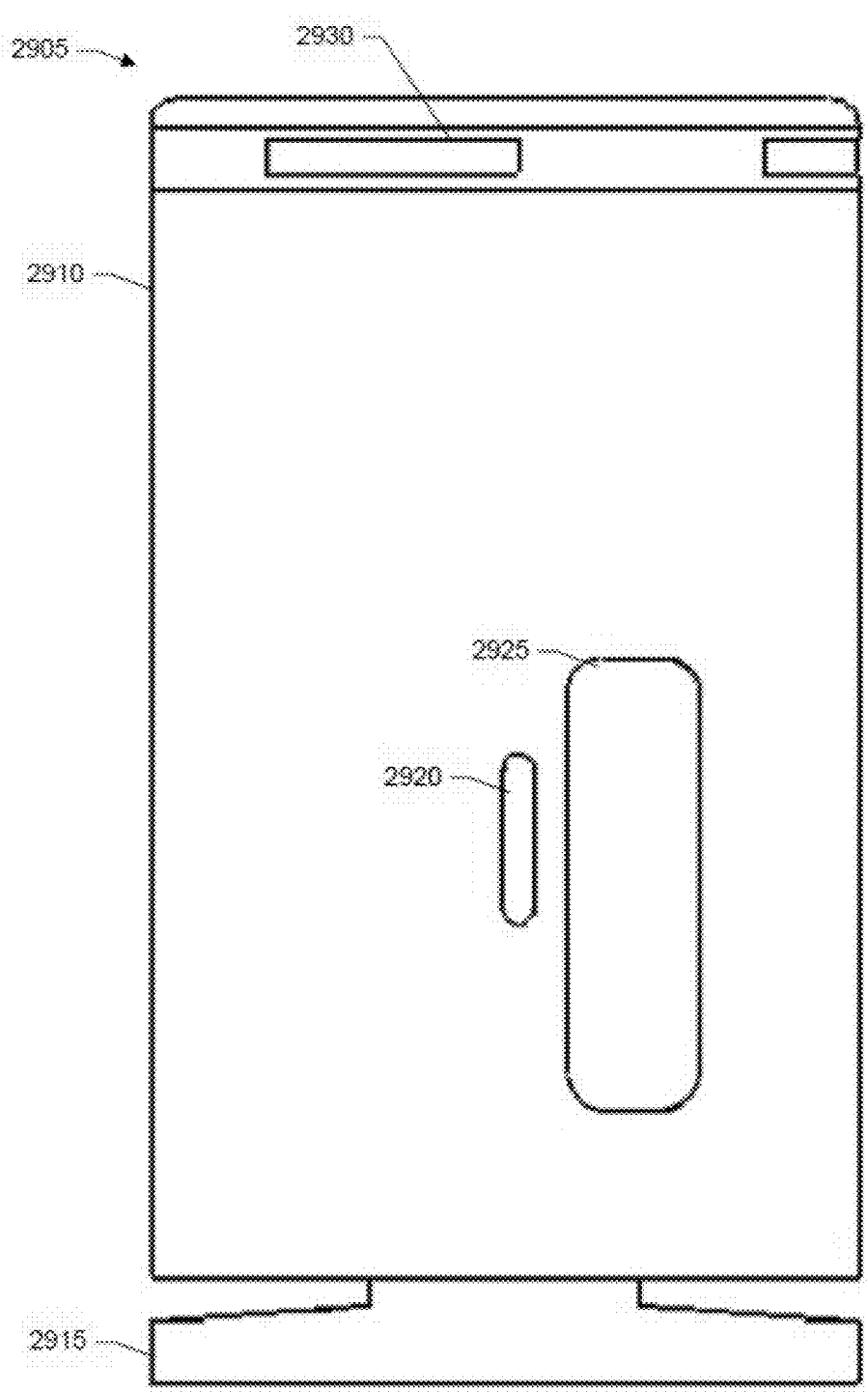
FIG. 29 shows an exterior side view of a particle monitoring device in which a diffraction grating may be included, according to one or more embodiments.

FIG. 29 shows an exterior view of a particle monitoring device 2905 in which a light redirecting optical component and, more particularly, a diffraction grating may be included according to one or more embodiments. In a specific embodiment, the diffraction grating is implemented in an existing particle monitoring device as provided by Scanit Technologies, Inc. of Fremont, Calif. U.S. Pat. No. 9,933,351, assigned to Scanit Technologies, Inc., provides a detailed discussion of the monitoring device and is incorporated by reference along with all other references cited. In this specific embodiment, the diffraction grating and associated light sources are designed to fit entirely within the existing housing of the existing particle monitoring device, thus not requiring any increase in size of the monitor package. Some embodiments are described in conjunction with a particle monitoring device as provided by Scanit Technologies. It should be appreciated, however, that features, aspects, and principles of such embodiments can be applied to other particle monitoring devices by other manufacturers.

In the example shown in FIG. 29, the particle monitoring device includes a cylindrical housing 2910 and a base 2915. The housing contains components of the device and includes an air intake slot 2920, a cartridge door 2925, and one or more wind-detector recesses 2930.

The cylindrical housing and its contents may rotate about its cylindrical axis with respect to the base in order to orient the air-intake slot in a desired direction. In some cases, it may be desired to systematically vary the orientation of the air-intake slot in order to average over all directions. Alternatively, the particle monitoring device may orient itself so that the air-intake slot faces upwind to any breeze or other flow of ambient air.

In this latter case, it is advantageous for the particle monitoring device to include wind or airflow sensors. Visible in FIG. 29 are two of four wind-detector recesses 2930 in which may be mounted airflow sensors in such a way that they are both exposed to ambient airflow and mechanically protected from accidental impact or contact. In a specific embodiment, a wind-detector recess includes a cantilever deflection detector. Wind detectors of many types, including hot-wire airflow detectors, cantilever deflection detectors, or both may be placed in the wind-detector recesses.

The cartridge door provides an opening into which a removable particle collection cartridge may be loaded or inserted into the monitoring device and removed.

Figure 30:
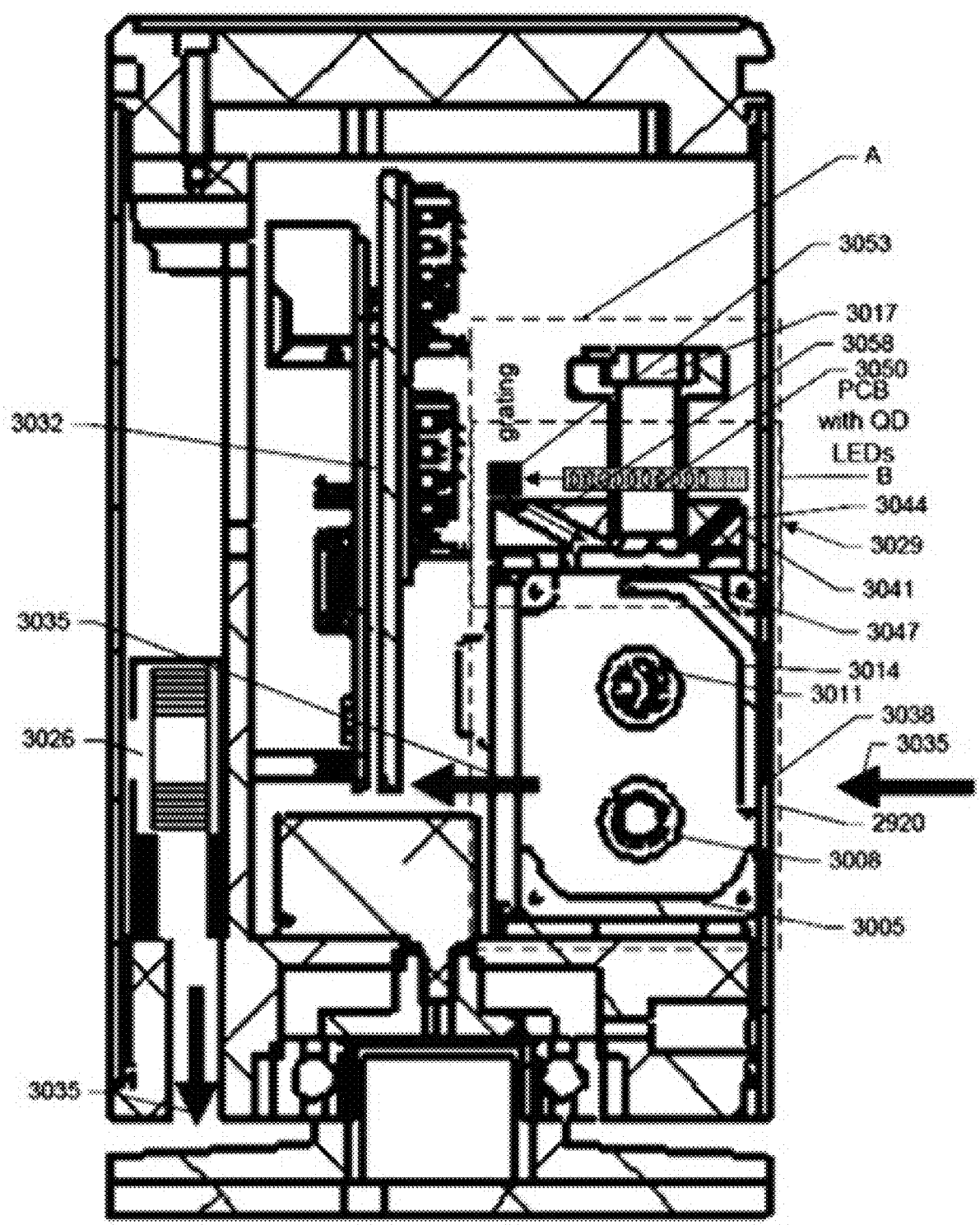
FIG. 30 shows an inside side view of the particle monitoring device shown in FIG. 29, according to one or more embodiments.

FIG. 30 shows an inside side view of the monitoring device shown in FIG. 29. A particle collection cartridge 3005 has been loaded into the monitoring device via the cartridge door. In a specific embodiment, the particle collection cartridge includes an adhesive coated tape to trap airborne particles that pass into the monitoring device via the air intake slot. In this specific embodiment, the collection cartridge includes a supply reel 3008, an uptake reel 3011, and a tape guide structure 3014. The tape (not shown) is wound about the supply reel and extends from the supply reel across the tape guide structure to the uptake reel.

The monitoring device includes a camera sensor 3017, lens 3020 (see FIG. 31), an optical column 3023 (see FIG. 31), coupled between the camera sensor and lens, a blower 3026, a set of illumination sources 3029, and a motherboard 3032 to control the operation of the various components of the monitoring device.

The blower generates a vacuum that pulls air into the monitoring device. Arrows 3035 indicate a flow path of the air. The air is directed past the collection cartridge. A side 3038 of the collection cartridge is exposed to the air flow so that particles in the air can become trapped by the adhesive on the cartridge tape. Side 3038 may be referred to as a particle intake zone.

An end of the optical column is coupled to an inspection platform 3041. The inspection platform includes one or more illumination channels 3044 that direct light from an end of an illumination channel to an opposite end of the illumination channel and towards particles that have been collected onto the collection cartridge. The inspection platform may be referred to as an optical platform.

The collection cartridge includes a side 3047 that is exposed to the illumination channels in the inspection platform and the camera sensor. Side 3047 may be referred to as a particle inspection zone. The inspection platform, camera sensor and lens are positioned above the particle inspection zone. The particle inspection zone corresponds to a field of view of the camera sensor.

In a specific embodiment, an illumination system of the particle monitor includes a printed circuit board (PCB) having an array of quantum dot (QD) light emitting diodes (LEDs) 3050 and a diffraction grating 3053. The diffraction grating is at an end of an illumination channel 3058 and is positioned to face the PCB with QD LEDs. To image the trapped particles, a motor of the particle monitor advances the tape containing the trapped particles from the particle intake zone to the particle inspection zone. The illumination system can illuminate the particles with any number of different lighting conditions while the camera sensor captures one or more images of the particles trapped within the cartridge.

Figure 31:
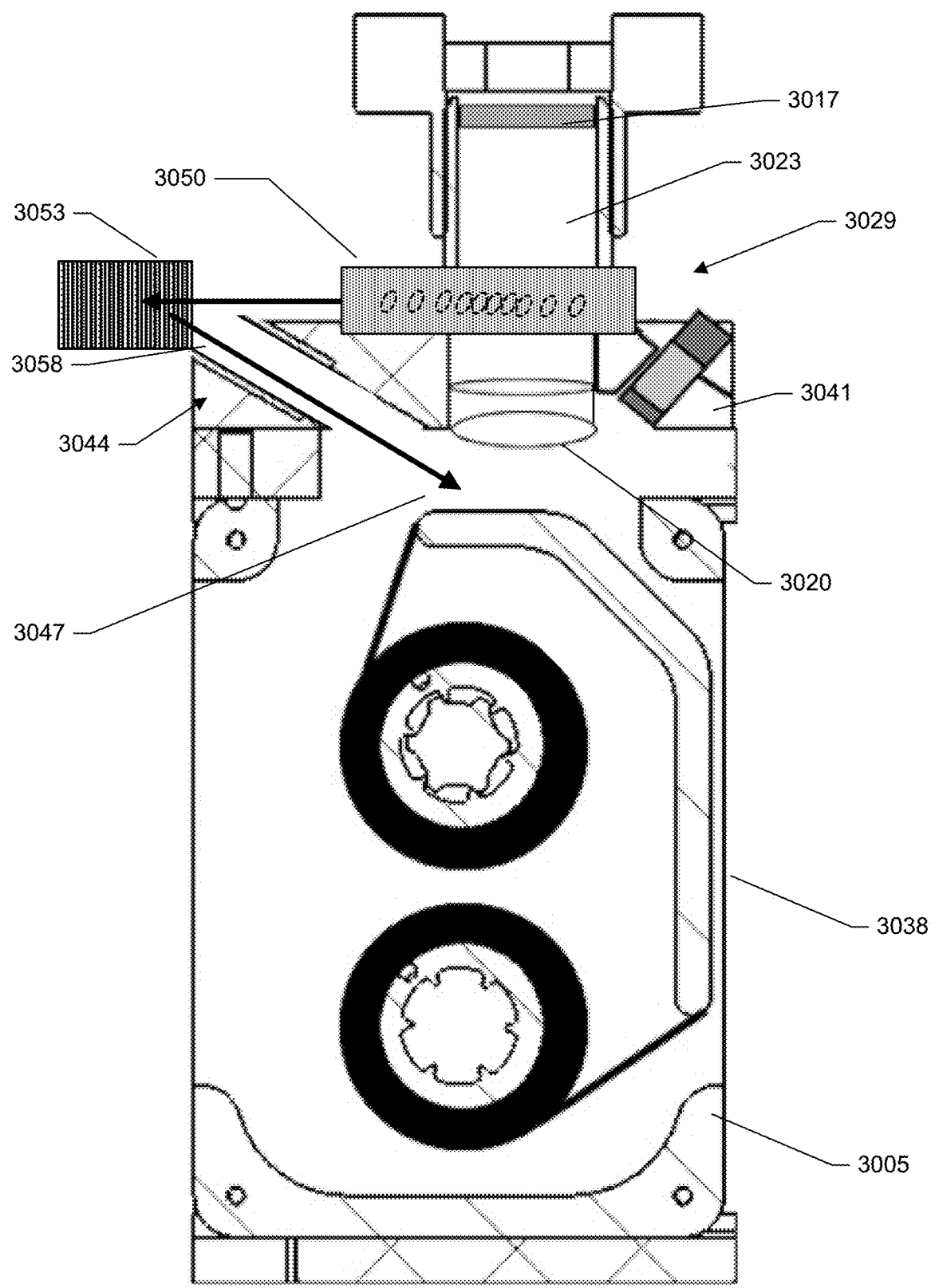
FIG. 31 shows an enlarged view of a section of the particle monitoring device shown in FIG. 30, according to one or more embodiments.
Figure 32:
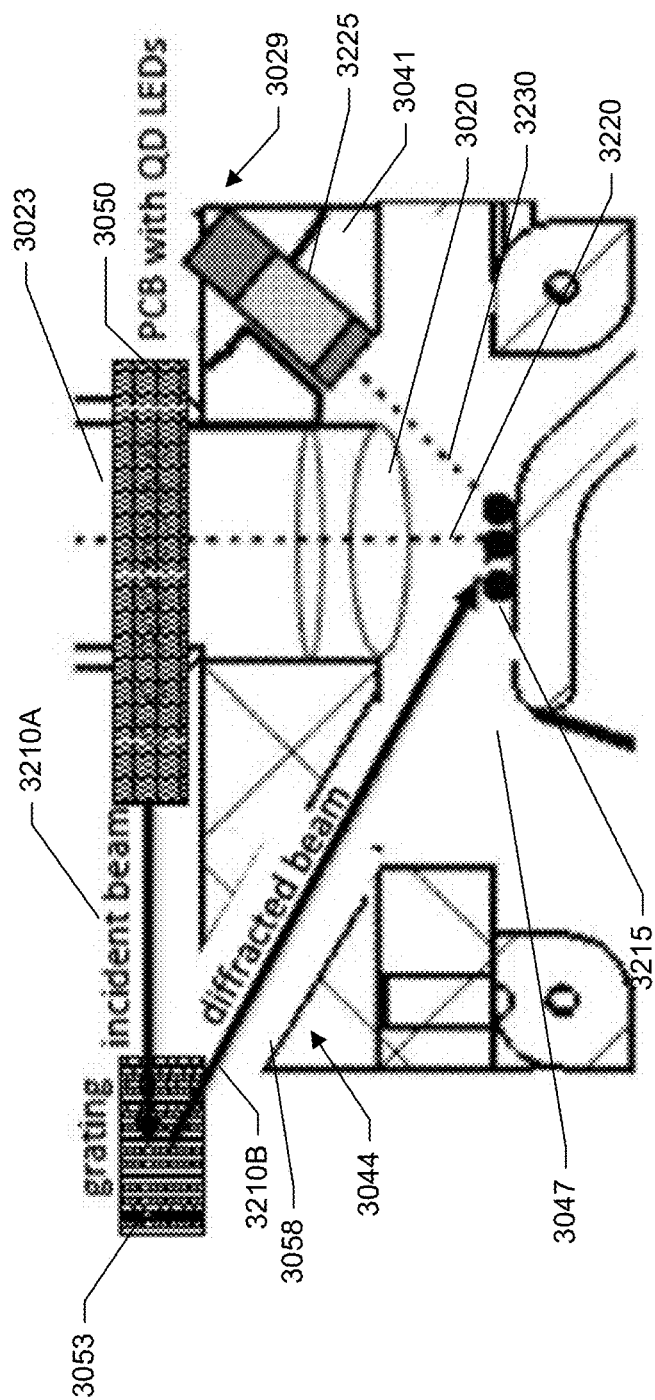
FIG. 32 shows another enlarged view of another section of the particle monitoring device shown in FIG. 30, according to one or more embodiments.

FIG. 31 shows an enlarged side view for a detail section A of the particle monitoring device shown in FIG. 30. FIG. 32 shows an enlarged side view for a detail section B of the particle monitoring device shown in FIG. 30. Referring now to FIG. 32, in a specific embodiment, PCB with QD LEDs 3050 and grating 3053 may be mounted to a top side of inspection platform 3041. The grating is at the end of illumination channel 3058. The grating is positioned to face the PCB with QD LEDs and oriented to receive an incident beam 3210A from the PCB with QD LEDs and redirect the incident beam as a diffracted beam 3210B into the end of illumination channel 3058, out an opposite end of illumination channel 3058 and towards trapped particles 3215 that have been advanced to the particle inspection zone and within a field of view of the camera sensor.

A broken line 3220 indicates capturing an image of the particles by the camera sensor.

In a specific embodiment, the particle monitor includes one or more illumination sources emitting light beams that are not redirected by the diffraction grating. For example, the particle monitor shown in FIG. 32 includes another illumination channel 3225. Illumination channel 3225 is a different and separate illumination channel from illumination channel 3058. For example, illumination channel 3225 may be associated with an illumination source different from PCB with QD LEDs 3050. The illumination source associated with illumination channel 3225 may include another PCB with a single (or multiple) LED. The LED may or may not be a quantum dot LED. For example, there can be an LED positioned at an end of illumination channel 3225 which directs a beam 3230 through illumination channel 3225, out an opposite end of illumination channel 3225 and towards the trapped particles. The beam may be white light, visible light, UV light, or any wavelength of light desired.

Illumination channel 3225 may be positioned to direct a light beam from a position or angle different from illumination channel 3058. Illumination channel 3225 allows for illuminating the particles from directions and angles different from illumination channel 3058.

Figure 33:
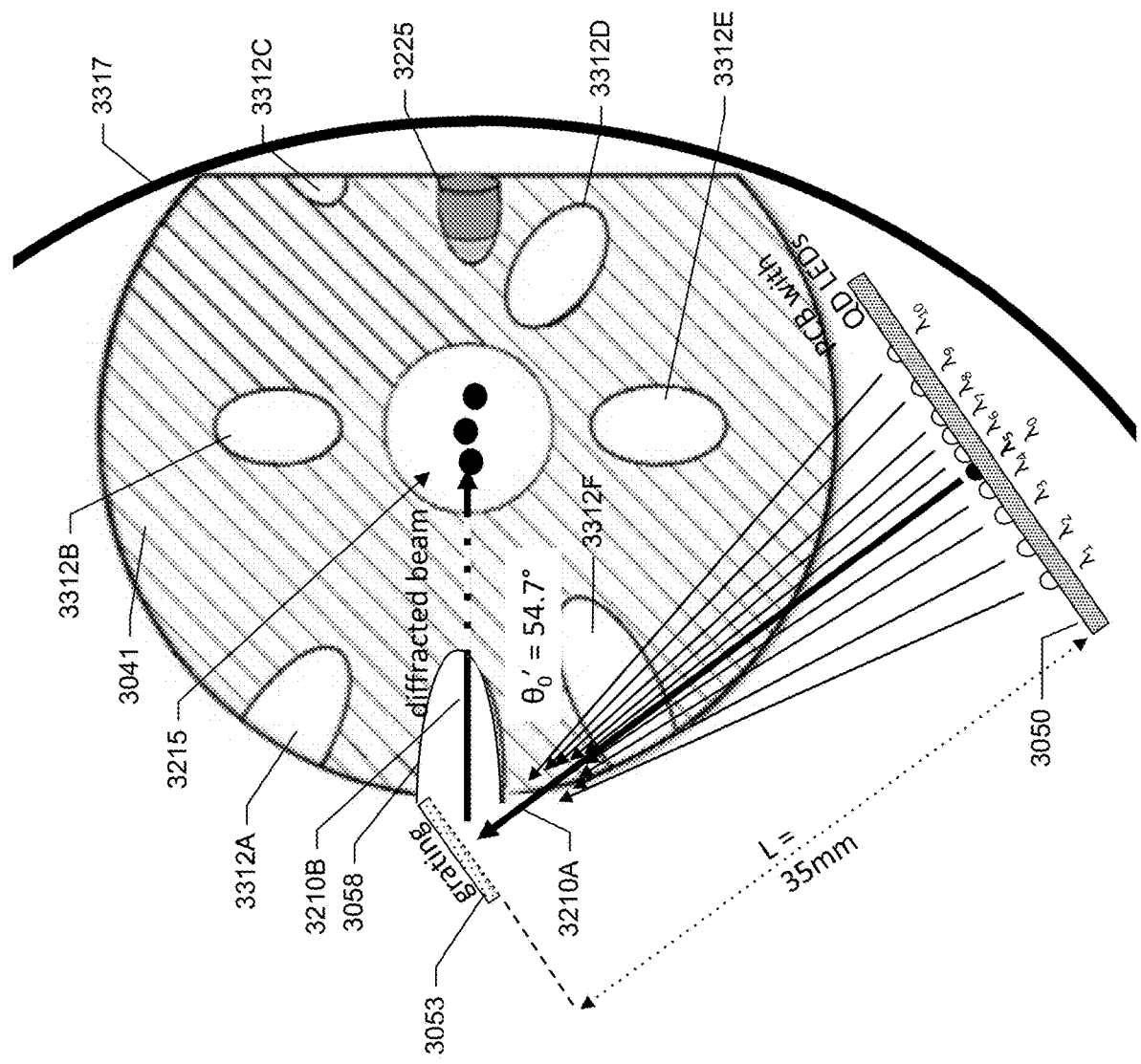
FIG. 33 shows a top plan view of an inspection platform of the particle monitoring device shown in FIG. 30, according to one or more embodiments.

There can be any number of additional illumination channels and associated light sources. For example, FIG. 33 shows a top plan view of inspection platform 3041. As shown in the example of FIG. 33, there are particles 3215 at the particle inspection zone and within a field of view of the camera sensor, diffraction grating 3053 at illumination channel 3058, PCB with QD LEDs 3050, and illumination channel 3225. There can be other illumination channels such as illumination channels 3312A-F.

The illumination channels have been drawn in FIG. 33 with varying shapes to represent different azimuthal angles. One or more illumination channels may include a light emitting element. An illumination source may or may not include quantum dots. An illumination source may emit visible light (e.g., wavelengths ranging from about 390 nm to about 700 nm), UV light (e.g., wavelengths ranging from about 10 nm to about 380 nm), or infrared light (e.g., wavelengths ranging from about 700 nm to about 1 mm).

In a specific embodiment, each illumination source has an illumination axis that intersects the particle inspection zone. Illumination axes corresponding to different illumination sources may vary in azimuthal angle as well as angle with respect to an optical axis passing through the particle inspection zone, through the lens assembly, and to the camera sensor of the particle monitor. Having may different illumination axes further provides for other dimensions of analysis. For example, the lengths of different shadows resulting from shining light at different angles can indicate the height of a particle.

In a specific embodiment, illumination channel 3058 is used to transmit diffracted beam 3210B to the particle inspection zone. In this plan-view sketch, the diffracted beam not only propagates to the right, but also propagates downward making an angle φ with respect to the horizontal plane. In a preferred embodiment φ=30°. If the angle $\theta_0$ between incident beam 3210A and diffracted beam 3210B is 60°, then in this plan view, the angle $\theta_0$ appears reduced to an angle $\theta_0' = \arccos\{\cos(\theta_0)/\cos(\varphi)\} = 54.7°$. The sketch shown in FIG. 33 is drawn approximately to scale and shows that the illumination system of FIG. 33 can fit within the existing particle monitor housing provided by Scanit Technologies as indicated by heavy black line 3317.

FIG. 34 shows a schematic top view of an arrangement of diffraction grating 3053 and associated PCB with QD LEDs 3050. As discussed, in a specific embodiment, the light sources include a printed circuit board (PCB) with an array of quantum dot (QD) light emitting diodes (LEDs). FIG. 35 shows a table of color fan-out for the QD LED array.

In particular, the QD LED array includes a QD LED 3415A emitting a beam wavelength of about 450 nm, a QD LED 3415B emitting a beam wavelength of about 500 nm, a QD LED 3415C emitting a beam wavelength of about 550 nm, a QD LED 3415D emitting a beam wavelength of about 580 nm, a QD LED 3415E emitting a beam wavelength of about 600 nm, a QD LED 3415F emitting a beam wavelength of about 620 nm, a QD LED 3415G emitting a beam wavelength of about 640 nm, a QD LED 3415H emitting a beam wavelength of about 660 nm, a QD LED 3415I emitting a beam wavelength of about 700 nm, and a QD LED 3415J emitting a beam wavelength of about 750 nm.

Referring to FIGS. 34 and 35, different wavelengths λ differing from the representative wavelength $\lambda_0$ will diffract with angles θ differing from the nominal angle $\theta_0$. Here the angle θ is defined as the angle between QD LCD light incident on the diffraction grating and the light leaving the diffraction grating. Because in direction of the incident QD LED light varies, the angle θ varies even though the direction of the outgoing diffracted beam remains fixed and aimed at the particle inspection zone. It is desired that the diffracted beam direction be independent of the incident beam wavelength λ. To make this possible with a fixed grating, the incident beam direction must vary. This is desirable as it allows physical separation between the QD LEDs. The "Offset" column of the table shown in FIG. 33 gives relative locations of the QD LEDs on a printed circuit board (PCB) placed a distance L=35 mm away from the grating. Preferably the PCB is thin and can be bent to a curvature of radius L so that beams from surface mount QD LEDs are aimed in the optimal directions. In particular, if surface mount QD LEDs are designed to emit light beams perpendicular to the PCB surface, and the PCB is bent to a radius of curvature equal to the distance from the PCB to the grating (with QD LEDs on concave bent PCB surface), it is possible to have all QD LEDs optimally aimed at the grating.

Figure 36:
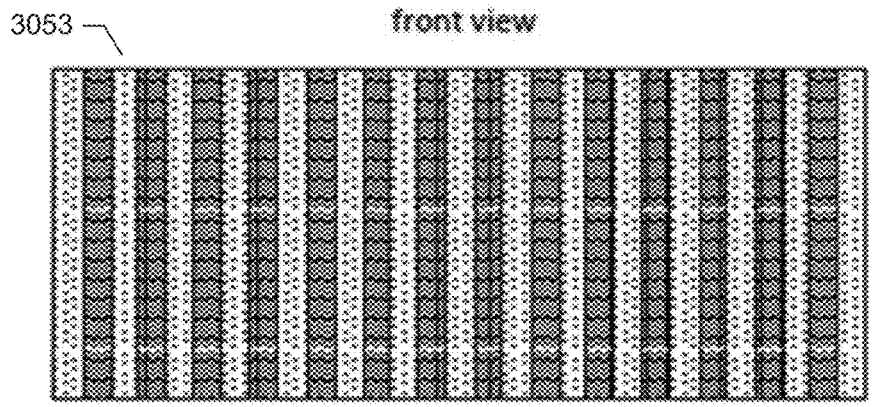
FIG. 36 shows a front view of the diffraction grating, according to one or more embodiments.
Figure 37:
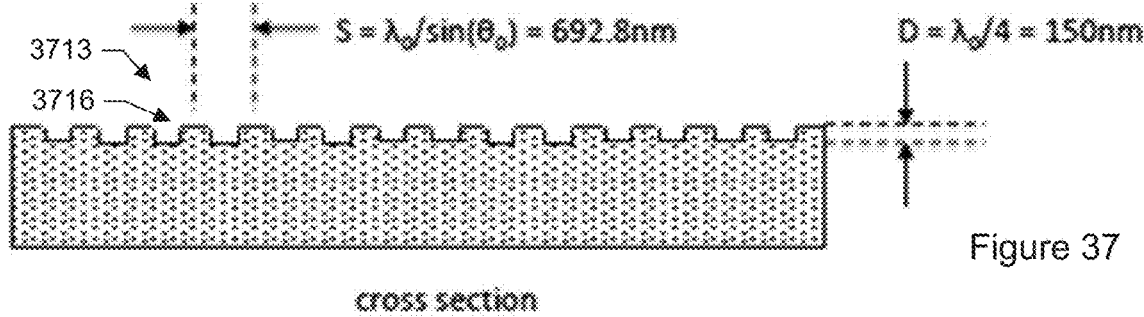
FIG. 37 shows a cross section view of the diffraction grating shown in FIG. 36, according to one or more embodiments.

FIG. 36 shows a detailed front view of diffraction grating 3053 that may be included in a particle monitoring device according to one or more embodiments. FIG. 37 shows a detailed cross section view of the diffraction grating shown in FIG. 36. In a specific embodiment, the grating is constructed from a reflective material such as a metal, e.g. aluminum or stainless steel. On its front surface 3713 is fabricated an array of "grates" 3716 with a center-to-center spacing of S. The front surface may be referred to as a grating surface. Grates may be formed by removing material to form groves of depth D between the grates. Dimensions S and D are chosen carefully and are of the order of magnitude of a wavelength of light.

Let $\lambda_0$ be a representative wavelength of light such as 600 nm. Consider a light beam of wavelength $\lambda_0$ incident on the front surface of the grating shown in FIG. 36 from a direction perpendicular to the grating surface. The diffraction grating will produce a diffracted beam at an angle $\theta_0$ with respect to the incident beam if the grating spacing S is equal to $\lambda_0/\sin(\theta_0)$.

Figure 38:
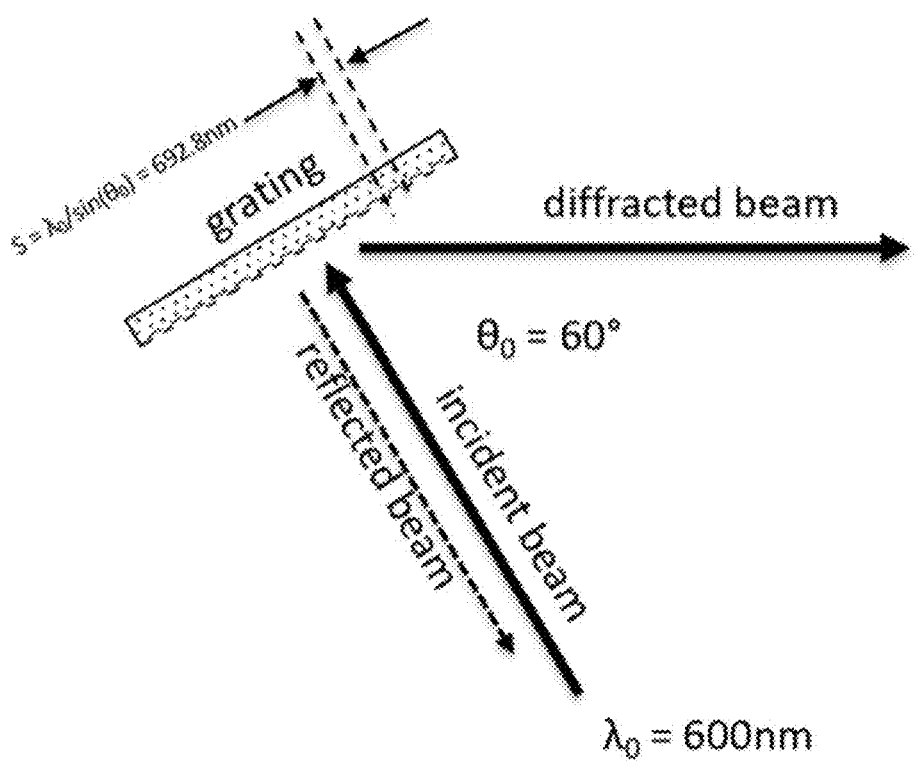
FIG. 38 shows a schematic top view of diffraction from the grating, according to one or more embodiments.

FIG. 38 shows a schematic top view of diffraction from grating. In a preferred embodiment with a diffracted beam angle of $\theta_0=60°$ the grating spacing needs to be $S=\lambda_0/\sin(\theta_0)=692.8$ nm. A primary diffracted beam angle of in the 30° to 90° range eliminates the possibility of undesired secondary diffracted beam angles of higher order. Additional diffracted beams not directed at the particle inspection zone may lead to inefficiencies as well as undesired background light. Angles between 90° and 180° require a transmissive grating made of a transparent material rather than a reflective diffraction grating made of a reflective material; may be desirable is some applications, but typically a reflective diffraction grating is simpler. The 30° to 90° range also has the advantage of limiting optical paths from the LEDs to the particle inspection zone that are not the desired diffracted beams. Finally, referring to FIG. 33, note that a diffraction angle about 60° results in a folded optical path that lends itself well to compact mechanical designs.

It is desirable to minimize the incident beam energy wasted in a 180° backscattered reflected beam. The reflected beam can be suppressed by choosing the depth D of the grooves between grates to be a quarter wavelength, i.e., $D=\lambda_0/4=150$ nm; this maximizes destructive interference between 180° backscattered light from the grates and the grooves.

In FIG. 33, the incoming LED beams and outgoing diffracted bream are all in a common tilted plan that intersects the particle inspection zone. The row of QC LEDs on the PCB also lies in the tilted plan and the grates 3716 of FIGS. 36 and 37 are perpendicular to this tilted plane. If desired, the grates of the gratings may be tilted if it is desired to keep the QD-LED PCB strip horizontal. In such an embodiment, the length of the PCB, and the set of QD LCD beams all remain within a horizontal plane above the particle inspection zone. In this scenario, the diffracted beam still has a downward tilt as needed to illuminate the particle inspection zone. This geometry may be accommodated via modifying the orientation of the diffraction grating 3053 or alternatively altering the orientation of the grates 3716 within the diffraction grating 3053. The exact orientation of the grating, or of the grates within the grating can be determined experimentally by trial and error, or computed theoretically from well known optics principles (at least in the field of holography).

The grating 3053 of FIGS. 36 and 37 is flat. Alternatively, the grating surface may be slightly curved in order to also serve as a focusing element. For example if L1 is the distance from the PCB to the grating and L2 is the distance from the grating to the particle inspection zone, the grating surface may be curved at a radius R chosen to focus QD LED light on the particle inspection zone, that is, at a radius $R=2\cdot L1 \cdot L2/(L1+L2)$. Alternatively, the grating may remain flat, but desired focusing properties provided by altering the grating pattern. For example, referring to FIG. 38, if the spacing S slightly increases going from left to right, then the scattering angle will decrease going from left to right resulting in focusing of the diffracted beam.

Figure 39:
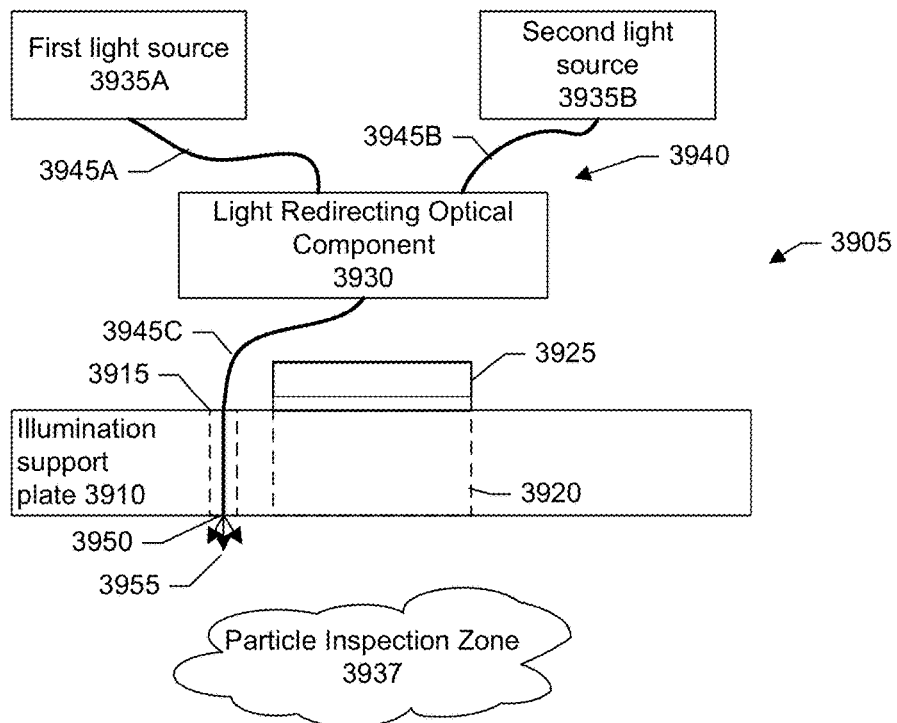
FIG. 39 shows a schematic block diagram of a particle monitoring device having optical fiber and a light redirecting optical component, according to one or more embodiments.

FIG. 39 shows a schematic block diagram of a particle monitor 3905 according to one or more embodiments. The particle monitor includes an illumination support plate 3910 having an illumination channel 3915 and an optical column 3920 with a camera sensor 3925, a light redirecting optical component 3930, a set of light sources including a first light source 3935A and second light source 3935B, and optical wave guides or optical fibers 3940 extending between or connecting the various components. The camera sensor and illumination channels are positioned to face a particle inspection zone 3937. A light source can be a structure within the particle monitor that generates light for the particle inspection zone so that the camera sensor can capture one or more images of the particles under one or more lighting conditions. A light source can include a structural component, e.g., quantum dot film, that transmits or converts light generated from an upstream source. A light source can include an end of a wave guide or optical fiber through which light exits.

In the example shown in FIG. 39, a first optical fiber 3945A extends between the first light source and the light redirecting optical component, a second optical fiber 3945B extends between the second light source and the light redirecting optical component, and a third optical fiber 3945C extends between the light redirecting optical component and the illumination support plate. The third optical fiber may be secured within the illumination channel of the illumination support plate via an adhesive such as epoxy. An end 3950 of the third optical fiber is at an end of the illumination channel and faces the particle inspection zone.

The light redirecting optical component can be any type of component or set of components having an input and output that operate to receive an optical signal in a first direction and output the optical signal in a second direction, different from the first direction. The light redirecting optical component may include a diffraction grating, prism, mirror, beam combiner, multiplexor, or combinations of these.

In a specific embodiment, the light redirecting optical component receives various wavelengths of light from the light sources and outputs the light onto the third optical fiber and out 3955 through the illumination channel of the illumination support plate and towards the particle inspection zone. The light redirecting optical component can allow different wavelengths of light arriving from different directions or locations to be output in a same direction or onto a single optical fiber, e.g., third optical fiber 3945C. For example, the third optical fiber may carry light of a first wavelength from the first light source where the light of the first wavelength is output towards the particle inspection zone from a particular location (e.g., at an end of the illumination channel). The third optical fiber may carry light of a second wavelength, different from the first wavelength, from the second light source where the light of the second wavelength is output towards the particle inspection zone from the same particular location (e.g., the end of the illumination channel). This allows the particles at the particle inspection zone to be imaged under different lighting conditions, but at the same illumination angle.

As discussed, inserting optical fiber between the light or illumination sources and the illumination support plate allows for freeing the illumination sources from the mechanical design constraints that may be present in the immediate proximity of the illumination support plate. The light sources, light redirecting optical component, or both may be located remote from the particle inspection zone. For example, a light source may be physically located to a side of the particle inspection zone, below the particle inspection zone, or away from the particle inspection zone. This allows for a very compact and space-saving design of the particle monitor device. In a specific embodiment, for efficient light capture and transport, the optical fiber is a relatively large diameter optical fiber functioning as a multi-mode fiber. A core of the fiber may include a liquid with only the cladding shell made of solid material; this fiber design enables good flexibility (small bending radii) to larger optical fiber diameters.

It should be appreciated that an optical fiber may not necessarily run continuously between the different components of the particle monitor. For example, depending upon factors such as the length of optical fiber, desired output intensity, or other factors, a run of optical fiber may be interrupted by a mirror. A mirror can change the direction of light propagation more rapidly than an optical fiber. For example, the third optical fiber may be interrupted by a mirror positioned between the light redirecting optical component and the illumination support plate. Likewise, the first optical fiber may be interrupted by a mirror positioned between the first light source and the light redirecting optical component. The second optical fiber may be interrupted by a mirror positioned between the second light source and the light redirecting optical component.

A number of illumination channels in the illumination support plate may be less than a number of light sources. For example, a single illumination channel in the illumination support plate can be used to provide light from multiple light sources (e.g., first and second light sources). This allows for different lighting conditions at the particle inspection zone without having to increase the surface area or size of the illumination support plate to support each different light source.

For example, to capture images of the particles the first light source may be activated. Light of a first wavelength from the first light source is carried by the first optical fiber to the light redirecting optical component. The light redirecting optical component receives the light of the first wavelength and outputs the light of the first wavelength onto the third optical fiber. The third optical fiber carries the light of the first wavelength through the illumination channel. The light of the first wavelength exits an end of the third optical fiber at an end of the illumination channel to illuminate the particle inspection zone with light of the first wavelength. The camera sensor can then capture a first image of the particles under illumination with light of the first wavelength.

To capture an image of the particles under illumination with light from the second light source, the second light source may be activated. Light of a second wavelength from the second light source, different from the first wavelength, is carried by the second optical fiber to the light redirecting optical component. The light redirecting optical component receives the light of the second wavelength and outputs the light of the second wavelength onto the third optical fiber. The third optical fiber carries the light of the second wavelength through the illumination channel. The light of the second wavelength exits the end of the third optical fiber at the end of the illumination channel to illuminate the particle inspection zone with light of the second wavelength. The camera sensor can then capture a second image of the particles under illumination with light of the second wavelength.

In a specific embodiment, during the first image capture the second light source may remain off or deactivated while the first light source is activated. During the second image capture the first light source may remain off or deactivated while the second light source is activated. Alternatively, the light sources may be activated simultaneously and processing may be performed to compensate for color bleeding effects (see, e.g., FIG. 15 and accompanying discussion).

In another specific embodiment, the light sources may be activated simultaneously for a first image capture and there can be a multiplexor or multiplexing operation performed to block light from the second light source from reaching the particle inspection zone while allowing light from the first light source to reach the particle inspection zone. During a second image capture, the light sources may remain activated and there can be another multiplexing operation performed to block light from the first light source from reaching the particle inspection zone while allowing light from the second light source to reach the particle inspection zone.

Figure 40:
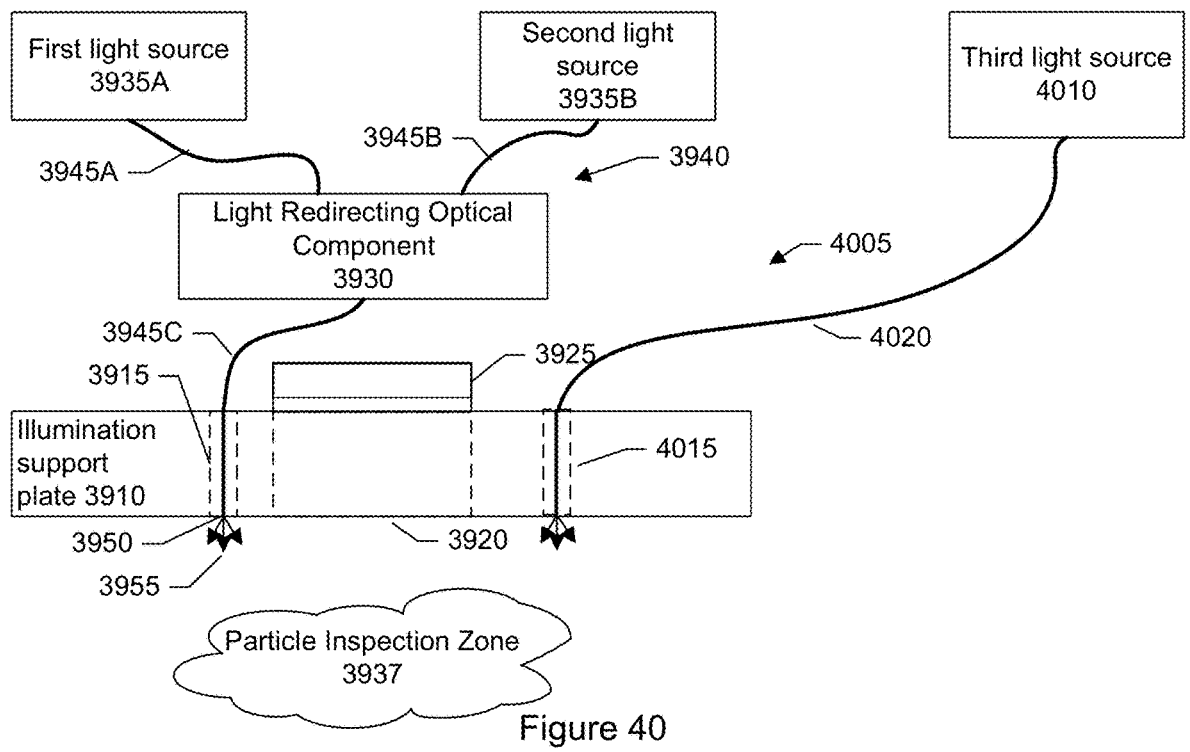
FIG. 40 shows a schematic block diagram of another particle monitoring device having optical fiber and a light redirecting optical component, according to one or more embodiments.

It can be desirable to illuminate the particle inspection zone using different illumination angles. For example, FIG. 40 shows a schematic block diagram of a particle monitor 4005 according to another specific embodiment. The particle monitor shown in FIG. 40 is similar to the particle monitor shown in FIG. 39. For example, particle monitor 4005 includes an illumination support plate 3910 having an illumination channel 3915 (first illumination channel) and an optical column 3920 with a camera sensor 3925, a light redirecting optical component 3930, a set of light sources including first light source 3935A and second light source 3935B, and optical wave guides or optical fibers 3940 extending between or connecting the various components. The particle monitor shown in FIG. 40, however, further includes a third light source 4010, a second illumination channel 4015, and a fourth optical fiber 4020 extending between the third light source and illumination support plate. In some embodiments, third light source 4010 is an ultraviolet light source. An end of the fourth optical fiber is secured within the second illumination channel.

The first and second illumination channels are at different locations or positions on the illumination support plate. That is, the first illumination channel may be located at a first position on the illumination support plate. The second illumination channel may be located at a second position on the illumination support plate. This allows for illuminating the particle inspection zone using different illumination angles, directions, or originations. The third light source may emit light of wavelength that is the same as or different from light emitted by the first light source, second light source, or both. In the example shown in FIG. 40, the fourth optical fiber bypasses the light redirecting optical component and does not connect the third light source to the light redirecting optical component.

In another specific embodiment, the fourth optical fiber may connect the third light source to the light redirecting optical component, a fifth optical fiber may then extend from the light redirecting optical component to the second illumination channel, and a multiplexor or multiplexing operation can be used select whether light should be provided through the first illumination channel, the second illumination channel, or both.

The light redirecting optical components shown in FIGS. 39 and 40 have two inputs and one output. It should be appreciated, however, that a light redirecting optical component may have any number of inputs and any number of outputs. For example, a light redirecting component may have 3 inputs and 1 output, 4 inputs and 2 outputs, and so forth. A particle monitor may include a single light redirecting optical component or multiple light redirecting components (e.g., two or more). Design considerations include cost of the light redirecting component, size of the light redirecting component, type of light redirecting component, number of desired illumination angles, and other factors.

In a specific embodiment, a particle monitor includes four illumination channels occupying different positions in an illumination support plate. This allows for illuminating with white light from several different directions. More particularly, in this specific embodiment, three of the illumination channels provide white light and the remaining illumination channel provides UV light. In a specific embodiment, the white light is provided by three white-light LEDs and the UV light is provided by a UV LED. In other specific embodiments, systems and techniques as described herein can be used to reduce the number of white LEDs while maintaining the same number of illumination directions.

Light scattering is more sensitive to illumination direction as compared to UV-fluorescence. So, in a specific embodiment, a number of illumination channels (or directions) provided for white light, e.g., 3, is greater than a number of illumination channels provided for the UV light, e.g., 1.

As one of skill in the art will recognize, in our daily life when we look at objects, with rare exceptions, we are looking at scattered light. Exceptions include things that glow like fires and bioluminescence. Photons of scattered light bounce off of objects without changing their wavelength. Objects with color scatter different wavelengths with different intensities. Even under white light illumination such as home white-light LED lighting, a red apple looks red because it strongly scatters red light wavelengths while tending to absorb blue light wavelengths.

In a specific embodiment, an algorithm of the particle monitor device looks for any color in objects of interest. In this specific embodiment, this is accomplished with white-light LEDs for illumination and with an RGB camera sensor replacing the human eye. Thus, in this specific embodiment, the particle monitor device perceives color much the same way we do. When we refer to the color of objects, we are generally referring to how objects scatter the various wavelengths of visible light.

Scattered light of wavelengths that our eyes perceive is referred to as "visible" light. As scattering does not change the wavelength, the illuminating light leading to the perceived scattered light is also "visible" light. This is very different from UV fluorescence imaging in which illumination is invisible UV light that is absorbed by a few special types of molecules and is re-emitted at longer wavelengths as visible light. UV fluorescence imaging does not use scattered light and hence does not reveal an objects "color" in the ordinary sense of the word. For example, a red apple would not look red in a UV fluorescence image. A UV fluorescence image does not reveal the "color" of a red apple. Instead, a UV fluorescence image of an apple may reveal the presence of certain biomolecules and hence something about the apple's biochemistry. In a specific embodiment, the particle monitoring device looks at both the color (via scattering) and biochemistry (via fluorescence) of particles of interest. Having both types of information helps with particle classification. In this sense color information and biochemistry information is complementary.

A typical human eye, and an RBG camera sensor, perceive three distinct colors and many combinations thereof. Some of us are partially color blind (e.g., perceive only two distinct colors) or are totally color blind. Birds perceive four distinct colors, so compared to birds, all humans are at least partially color blind. Even birds lack full color perception. Technology provides means to build sensors that make birds quite color blind by comparison. "Hyper-spectral imaging" fits this description. Hyper-spectral images provide much more color information than the human eye can perceive. Nevertheless, hyper-spectral imaging (as generally interpreted and as used herein) is still based on visible light scattering. It is still looking at the "color" of objects, but with a color palette much vaster than a human eye can perceive. The complementarity of visible-light color information and UV-fluorescence biochemistry information remains even when the limited color information of an RGB camera sensor images under white-light LED illumination is replaced by the hyper-spectral imaging methods as described herein.

Figure 41:
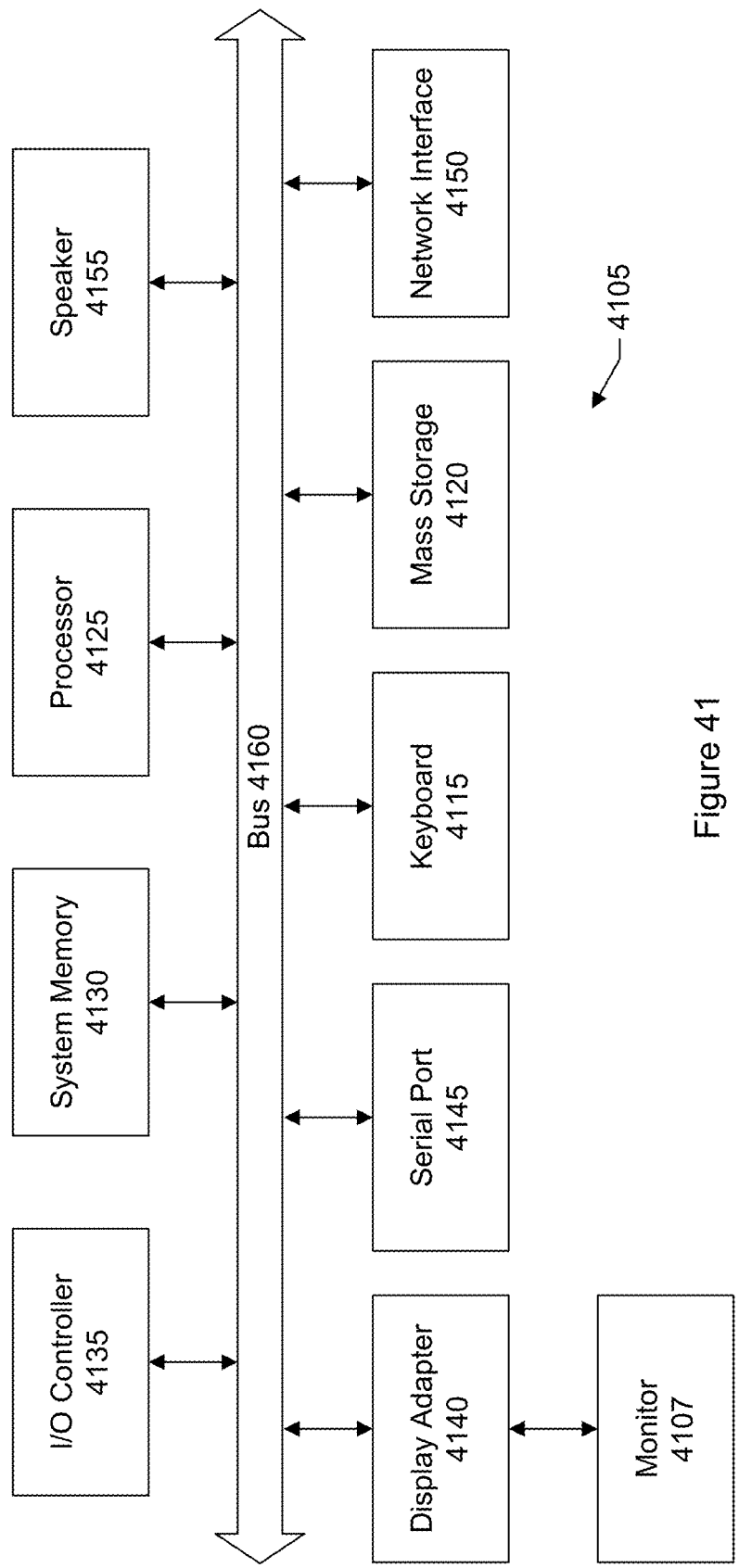
FIG. 41 shows a system block diagram of a client computer system.

FIG. 41 shows a system block diagram of a computer system 4105 used to execute the software of the present system described herein. The computer system includes a monitor 4107, keyboard 4115, and mass storage devices 4120. Computer system 4105 further includes subsystems such as central processor 4125, system memory 4130, input/output (I/O) controller 4135, display adapter 4140, serial or universal serial bus (USB) port 4145, network interface 4150, and speaker 4155. The system may also be used with computer systems with additional or fewer subsystems. For example, a computer system could include more than one processor 4125 (i.e., a multiprocessor system) or a system may include a cache memory.

Arrows such as 4160 represent the system bus architecture of computer system 4105. However, these arrows are illustrative of any interconnection scheme serving to link the subsystems. For example, speaker 4155 could be connected to the other subsystems through a port or have an internal direct connection to central processor 4125. The processor may include multiple processors or a multicore processor, which may permit parallel processing of information. Computer system 4105 shown in FIG. 41 is but an example of a computer system suitable for use with the present system. Other configurations of subsystems suitable for use with the present invention will be readily apparent to one of ordinary skill in the art.

Computer software products may be written in any of various suitable programming languages. The computer software product may be an independent application with data input and data display modules. Alternatively, the computer software products may be classes that may be instantiated as distributed objects. The computer software products may also be component software.

An operating system for the system may be one of the Microsoft Windows®. family of systems (e.g., Windows Server), Linux, Mac OS X®, IRIX32, or IRIX64. Other operating systems may be used. Microsoft Windows is a trademark of Microsoft Corporation.

Furthermore, the computer may be connected to a network and may interface to other computers using this network. The network may be an intranet, internet, or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system of the invention using a wireless network using a protocol such as Wi-Fi (IEEE standards 802.11, 802.11a, 802.11b, 802.11e, 802.11g, 802.11i, 802.11n, 802.11ac, and 802.11ad, just to name a few examples), near field communication (NFC), radio-frequency identification (RFID), mobile or cellular wireless. For example, signals from a computer may be transferred, at least in part, wirelessly to components or other computers.

In a specific embodiment, a particle monitoring device comprises: a camera sensor for imaging particles; at least first and second quantum-dot light sources, the first quantum-dot light source emits a first beam of light of a first color component, and the second quantum-dot light source emits a second beam of light of a second color component, different from the first color component; and a diffracting grating facing the first and second quantum-dot light sources, wherein the diffraction grating receives the first beam of light in a first direction, and redirects the first beam of light along an output direction towards the particles to illuminate the particles for the camera sensor using the light of the first color component, and wherein the diffraction grating receives the second beam of light in a second direction, different from the first direction, and redirects the second beam of light along the same output direction towards the particles to illuminate the particles for the camera sensor using the light of the second color component.

In an embodiment, the light of the first color component thereby falls on the particles at a particular illumination angle, and the light of the second color component thereby falls on the particles at the same particular illumination angle. In an embodiment, the at least first and second light sources are spaced apart from each other.

In a specific embodiment, at least the first quantum-dot light source comprises a quantum-dot light emitting diode (LED). In another specific embodiment, the particle monitoring device comprises: first and second light emitting diodes (LEDs) that emit blue light; a first optical fiber having an end coupled to the first LED and an opposite end coupled to the first quantum-dot light source; and a second optical fiber having an end coupled to the second LED and an opposite end coupled to the second quantum-dot light source, wherein the first quantum-dot light source receives the blue light via the first optical fiber and outputs light of a first wavelength towards the diffraction grating, the first wavelength being greater than a wavelength of the blue light and corresponding to the first color component, and wherein the second quantum-dot light source receives the blue light via the second optical fiber and outputs light of a second wavelength towards the diffraction grating, the second wavelength being greater than the wavelength of the blue light, different from the first wavelength, and corresponding to the second color component.

In an embodiment, there is a particle inspection zone at which the particles are imaged by the camera sensor, wherein the first and second quantum-dot light sources are blocked from facing the particle inspection zone to prevent light from the first and second quantum-dot light sources from illuminating the particles without having been redirected by the diffraction grating.

In an embodiment, the first beam of the light and the redirected first beam of light are of the first color component, and the second beam of light and the redirected second beam of light are of the second color component.

In an embodiment, a first path of the first beam of light is from the first quantum-dot light source to the diffraction grating to the particles, a second path of the second beam of light is from the second quantum-dot light source to the diffraction grating to the particles, a portion of the first path between the first quantum-dot light source and the diffraction grating is different from a portion of the second path between the second quantum-dot light source and the diffraction grating, and a portion of the first path between the diffraction grating and the particles is the same as a portion of the second path between the diffraction grating and the particles.

In another specific embodiment, there is a particle monitoring device comprising: a camera sensor for imaging particles; at least first and second quantum-dot light sources, the first quantum-dot light source emits a first beam of light having a first predominate wavelength, and the second quantum-dot light source emits a second beam of light having a second predominate wavelength, different from the first predominate wavelength; and a prism positioned to receive and redirect the first beam of light in a direction towards the particles, and to receive and redirect the second beam of light in a same direction towards the particles.

In an embodiment, the light of the first predominate wavelength falls on the particles at a particular illumination angle, and the light of the second predominate wavelength falls on the particles at the same particular illumination angle.

In an embodiment, the at least first and second quantum-dot light sources are spaced apart from each other.

In a specific embodiment, the at least first quantum-dot light source comprises a quantum-dot light emitting diode (LED). In another specific embodiment, there are first and second light emitting diodes (LEDs) that emit light having a predominate wavelength of about 470 nanometers (nm); a first optical fiber having an end coupled to the first LED and an opposite end coupled to the first quantum-dot light source; and a second optical fiber having an end coupled to the second LED and an opposite end coupled to the second quantum-dot light source. The first quantum-dot light source receives the light having the predominate wavelength of about 470 nm via the first optical fiber and outputs light of the first predominate wavelength towards the prism, the first wavelength being greater than the predominate wavelength of about 470 nm. The second quantum-dot light source receives the light having the predominate wavelength of about 470 nm via the second optical fiber and outputs light of the second predominate wavelength towards the prism, the second predominate wavelength being greater than the predominate wavelength of about 470 nm.

In another specific embodiment, there is a particle monitoring device comprising: a camera sensor for imaging particles; at least first and second quasi-monochromatic light sources, the first quasi-monochromatic light source to emit light of a first color component, and the second quasi-monochromatic light source to emit light of a second color component, different from the first color component; and an optical component facing the first and second quasi-monochromatic light sources, wherein the optical component receives a first beam of light in a first direction from the first quasi-monochromatic light source, and redirects the first beam of light in an output direction towards the particles to illuminate the particles with light of the first color component for imaging by the camera sensor, and wherein the optical component receives a second beam of light in a second direction, different from the first direction, from the second quasi-monochromatic light source, and redirects the second beam of light in the output direction towards the particles to illuminate the particles with light of the second color component for imaging by the camera sensor, and wherein the output direction of the redirected first beam of light is the same as the output direction of the redirected second beam of light.

In a specific embodiment, the optical component comprises a diffraction grating. In another specific embodiment, the optical component comprises a prism.

In a specific embodiment, the first and second quasi-monochromatic light sources are activated sequentially to generate a first image of the particles under light of the first color component, and a second image of the particles under light of the second color component. In another specific embodiment, the first and second quasi-monochromatic light sources are activated simultaneously to generate a single image of the particles while illuminated under light of the first and second color components.

In a specific embodiment, there is a third quasi-monochromatic light source facing the optical component, the third quasi-monochromatic light source to emit light of a third color component, different from the first and second color components, wherein a wavelength spacing between the light of the first and second color components is different from a wavelength spacing between the light of the second and third color components.

In a specific embodiment, a first path of the first beam of light is from the first quasi-monochromatic light source to the optical component to the particles. A second path of the second beam of light is from the second quasi-monochromatic light source to the optical component to the particles. A portion of the first path between the first quasi-monochromatic light source and the optical component is different from a portion of the second path between the second quasi-monochromatic light source and the optical component. A portion of the first path between the optical component and the particles is the same as a portion of the second path between the optical component and the particles.

In a specific embodiment, there is a particle monitoring device comprising: an illumination support plate comprising one or more illumination channels, and an optical column having a camera sensor, the one or more illumination channels and the camera sensor facing an inspection zone at which captured airborne particles are to be imaged; a plurality of light sources comprising a first light source, and a second light source, the first light source emits light of a first wavelength, and the second light source emits light of a second wavelength, different from the first wavelength; an optical component coupled between a first illumination channel and the first and second light sources; and a first optical wave guide extending between the first illumination channel and the optical component, wherein the optical component receives light of the first wavelength from the first light source and outputs the light of the first wavelength onto the first optical wave guide, out the first illumination channel, and towards the inspection zone, and wherein the optical component receives light of the second wavelength from the second light source and outputs the light of the second wavelength onto the first optical wave guide, out the first illumination channel, and towards the inspection zone.

The particle monitoring device may include a third light source; a second illumination channel extending through the illumination support plate; and a second optical wave guide extending between the second illumination channel and the third light source. A number of the plurality of light sources is greater than a number of the one or more illumination channels.

The particle monitoring device may include a second optical wave guide extending between the first light source and the optical component; and a third optical wave guide extending between the second light source and the optical component. The first optical wave guide may include a multi-mode optical fiber. The multi-mode optical fiber may include a liquid core. The optical component may include at least one of a diffraction grating or a prism.

In an embodiment, the first light source comprises a first quantum dot, the second light source comprises a second quantum dot, and the particle monitoring device further comprises: first and second light emitting diodes (LEDs) that emit blue light; and second and third optical wave guides, wherein the second optical wave guide is coupled between the first LED and the first quantum dot, and the third optical wave guide is coupled between the second LED and the second quantum dot. In an embodiment, a number of the plurality of light sources is between 10 and 15.

In the description above and throughout, numerous specific details are set forth in order to provide a thorough understanding of an embodiment of this disclosure. It will be evident, however, to one of ordinary skill in the art, that an embodiment may be practiced without these specific details. In other instances, well-known structures and devices are shown in block diagram form to facilitate explanation. The description of the preferred embodiments is not intended to limit the scope of the claims appended hereto. Further, in the methods disclosed herein, various steps are disclosed illustrating some of the functions of an embodiment. These steps are merely examples, and are not meant to be limiting in any way. Other steps and functions may be contemplated without departing from this disclosure or the scope of an embodiment. Other embodiments include systems and non-volatile media products that execute, embody or store processes that implement the methods described above.

What is claimed is:

1. A particle monitoring device comprising:
   a camera sensor for imaging particles;
   a plurality of light sources comprising a first light source, and a second light source, the first light source emits a first beam of light of a first color component, and the second light source emits a second beam of light of a second color component, different from the first color component; and
   a diffraction grating, wherein the diffraction grating receives the first beam of light in a first direction, and redirects the first beam of light along an output direction towards the particles to illuminate the particles for the camera sensor using the light of the first color component, the particles thereby being illuminated at a particular illumination angle with the light of the first color component, and
   wherein the diffraction grating receives the second beam of light in a second direction, different from the first direction, and redirects the second beam of light along the same output direction towards the particles to illuminate the particles for the camera sensor using the light of the second color component, the particles thereby being illuminated at the same particular illumination angle, but with the light of the second color component.

2. The particle monitoring device of claim 1 comprising an optical fiber, and an inspection platform having an illumination channel, wherein the optical fiber extends from the diffraction grating to the illumination channel,
   wherein the diffraction grating outputs the first beam of light onto the optical fiber and out through the illumination channel, and
   wherein the diffraction grating outputs the second beam of light onto the optical fiber and out through the illumination channel.

3. The particle monitoring device of claim 1 comprising an optical fiber, an inspection platform having an illumination channel, and a mirror positioned at an end of the illumination channel, wherein the optical fiber extends from the diffraction grating and terminates at the mirror,
- wherein the diffraction grating outputs the first beam of light onto the optical fiber and out through an end of the optical fiber towards the mirror,
- wherein the diffraction grating outputs the second beam of light onto the optical fiber and out through the end of the optical fiber towards the mirror,
- wherein the mirror reflects the first beam of light into the end of the illumination channel and out an opposite end of the illumination channel, and
- wherein the mirror reflects the second beam of light into the end of the illumination channel and out the opposite end of the illumination channel.

4. The particle monitoring device of claim 1 wherein the first light source comprises a quantum-dot light source.

5. The particle monitoring device of claim 4 wherein the quantum-dot light source comprises a quantum-dot light emitting diode (LED).

6. The particle monitoring device of claim 1 comprising:
- first and second light emitting diodes (LEDs) that emit blue light;
- a first optical fiber coupled between the first LED and a first quantum dot; and
- a second optical fiber coupled between the second LED and a second quantum dot,
- wherein the first quantum dot receives the blue light via the first optical fiber and outputs light of a first wavelength towards the diffraction grating, the first wavelength being greater than a wavelength of the blue light and corresponding to the first color component, and
- wherein the second quantum dot receives the blue light via the second optical fiber and outputs light of a second wavelength towards the diffraction grating, the second wavelength being greater than the wavelength of the blue light and corresponding to the second color component.

7. A particle monitoring device comprising:
- a camera sensor for imaging particles;
- a plurality of light sources comprising a first light source, and a second light source, the first light source emits a first beam of light of a first color component, and the second light source emits a second beam of light of a second color component, different from the first color component; and
- a prism, wherein the prism receives the first beam of light in a first direction and redirects the first beam of light in a direction towards the particles, and
- wherein the prism receives the second beam of light in a second direction, different from the first direction, and redirects the second beam of light in a same direction towards the particles, and
- wherein a first illumination angle is between an optical axis passing through the camera sensor and the redirected first beam of light,
- a second illumination angle is between the optical axis and the redirected second beam of light, and
- the second illumination angle is the same as the first illumination angle.

8. The particle monitoring device of claim 7 comprising an optical fiber, and an inspection platform having an illumination channel, wherein the optical fiber extends from the prism to the illumination channel,
- wherein the prism outputs the first beam of light onto the optical fiber and out through the illumination channel, and
- wherein the prism outputs the second beam of light onto the optical fiber and out through the illumination channel.

9. The particle monitoring device of claim 7 comprising an optical fiber, an inspection platform having an illumination channel, and a mirror positioned at an end of the illumination channel, wherein the optical fiber extends from the prism and terminates at the mirror,
- wherein the prism outputs the first beam of light onto the optical fiber and out through an end of the optical fiber towards the mirror,
- wherein the prism outputs the second beam of light onto the optical fiber and out through the end of the optical fiber towards the mirror,
- wherein the mirror reflects the first beam of light into the end of the illumination channel and out an opposite end of the illumination channel, and
- wherein the mirror reflects the second beam of light into the end of the illumination channel and out the opposite end of the illumination channel.

10. The particle monitoring device of claim 7 wherein the first light source comprises a quantum-dot light source.

11. The particle monitoring device of claim 7 comprising:
- first and second light emitting diodes (LEDs) that emit blue light;
- a first optical fiber coupled between the first LED and a first quantum dot; and
- a second optical fiber coupled between the second LED and a second quantum dot,
- wherein the first quantum dot receives the blue light via the first optical fiber and outputs light of a first wavelength towards the prism, the first wavelength being greater than a wavelength of the blue light and corresponding to the first color component, and
- wherein the second quantum dot receives the blue light via the second optical fiber and outputs light of a second wavelength towards the prism, the second wavelength being greater than the wavelength of the blue light and corresponding to the second color component.

12. A particle monitoring device comprising:
- an illumination support plate comprising one or more illumination channels, and an optical column having a camera sensor, the one or more illumination channels and the camera sensor facing an inspection zone at which captured airborne particles are to be imaged;
- a plurality of light sources comprising a first light source, and a second light source, the first light source emits light of a first wavelength, and the second light source emits light of a second wavelength, different from the first wavelength;
- an optical component coupled between a first illumination channel and the first and second light sources; and
- a first optical wave guide extending between the first illumination channel and the optical component, wherein the optical component receives light of the first wavelength from the first light source and outputs the light of the first wavelength onto the first optical wave guide, out the first illumination channel, and towards the inspection zone, and
- wherein the optical component receives light of the second wavelength from the second light source and outputs the light of the second wavelength onto the first optical wave guide, out the first illumination channel, and towards the inspection zone, and
- wherein a first illumination angle is between output light of the first wavelength from the first illumination channel and an optical axis of the optical column that is normal to the inspection zone, a second illumination angle is between output light of the second wavelength from the first illumination channel and the optical axis, and the second illumination angle is the same as the first illumination angle.

13. The particle monitoring device of claim 12 comprising:
    a third light source;
    a second illumination channel extending through the illumination support plate; and
    a second optical wave guide extending between the second illumination channel and the third light source.

14. The particle monitoring device of claim 12 wherein a number of the plurality of light sources is greater than a number of the one or more illumination channels.

15. The particle monitoring device of claim 12 comprising:
    a second optical wave guide extending between the first light source and the optical component; and
    a third optical wave guide extending between the second light source and the optical component.

16. The particle monitoring device of claim 12 wherein the first optical wave guide comprises a multi-mode optical fiber.

17. The particle monitoring device of claim 12 wherein each light source comprises a full-width-at-half-maximum (FWHM) wavelength spread greater than or equal to 10 nanometers (nm).

18. The particle monitoring device of claim 12 wherein the optical component comprises at least one of a diffraction grating or a prism.

19. The particle monitoring device of claim 12 wherein the first light source comprises a first quantum dot, the second light source comprises a second quantum dot, and the particle monitoring device further comprises:
    first and second light emitting diodes (LEDs) that emit blue light; and
    second and third optical wave guides, wherein the second optical wave guide is coupled between the first LED and the first quantum dot, and the third optical wave guide is coupled between the second LED and the second quantum dot.

20. The particle monitoring device of claim 12 wherein a number of the plurality of light sources is between 10 and 15.

* * * * *